US011018787B2

(12) United States Patent
Islam et al.

(10) Patent No.: US 11,018,787 B2
(45) Date of Patent: May 25, 2021

(54) TIME DIVISION MULTIPLEXING OF SYNCHRONIZATION CHANNELS

(71) Applicant: QUALCOMM Incorporated, San Diego, CA (US)

(72) Inventors: Muhammad Nazmul Islam, Edison, NJ (US); Navid Abedini, Raritan, NJ (US); Tao Luo, San Diego, CA (US); Sundar Subramanian, Bridgewater, NJ (US); Juergen Cezanne, Ocean Township, NJ (US); Ashwin Sampath, Skillman, NJ (US); Alexei Yurievitch Gorokhov, San Diego, CA (US); Junyi Li, Chester, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/608,851

(22) Filed: May 30, 2017

(65) Prior Publication Data
US 2017/0353255 A1    Dec. 7, 2017

Related U.S. Application Data

(60) Provisional application No. 62/344,381, filed on Jun. 1, 2016, provisional application No. 62/350,171, filed
(Continued)

(51) Int. Cl.
  *H04J 4/00*    (2006.01)
  *H04J 1/06*    (2006.01)
  (Continued)

(52) U.S. Cl.
  CPC .......... *H04J 1/065* (2013.01); *H01Q 3/2605* (2013.01); *H04B 7/0617* (2013.01); *H04B 7/216* (2013.01);
  (Continued)

(58) Field of Classification Search
  None
  See application file for complete search history.

(56) References Cited

U.S. PATENT DOCUMENTS

| 5,327,575 A | 7/1994 | Menich et al. |
| 5,686,926 A | 11/1997 | Kijima et al. |
| (Continued) | | |

FOREIGN PATENT DOCUMENTS

| CN | 101527595 A | 9/2009 |
| CN | 101940024 A | 1/2011 |
| (Continued) | | |

OTHER PUBLICATIONS

Ericsson LM., et al., "Narrowband LTE—Concept Description," 3GPP TSG RAN WG 1 Meeting #82, Draft; R1-154659, 3rd Generation Partnership Project (3GPP), Mobile Competence Centre ; 650, Route Des Lucioles ; F-06921 Sophia-Antipolis Cedex ; France vol. RAN WG1, No. Beijing, China; Aug. 24, 2015-Aug/ 28, 2015, Aug. 23, 2015 (Aug. 23, 2015), 9 Pages, XP051001893, Retrieved from the Internet: URL: http://www.3gpp.org/ftp/tsg_ran/WG1_RL1/TSGR1_82/Docs/ [retrieved on Aug. 23, 2015], Section 3.3 and 4.4.
(Continued)

*Primary Examiner* — Phirin Sam
*Assistant Examiner* — Sori A Aga
(74) *Attorney, Agent, or Firm* — Procopio, Cory, Hargreaves & Savitch LLP

(57) ABSTRACT

The apparatus may be a base station. The apparatus processes a first group of synchronization signals. The apparatus processes a second group of synchronization signals. The apparatus performs a first transmission by transmitting the processed first group of the synchronization signals in a first synchronization subframe. The apparatus performs a second transmission by transmitting the processed second group of
(Continued)

the synchronization signals in a second synchronization subframe.

79 Claims, 40 Drawing Sheets

Related U.S. Application Data on Jun. 14, 2016, provisional application No. 62/401,801, filed on Sep. 29, 2016, provisional application No. 62/410,073, filed on Oct. 19, 2016.

(51) Int. Cl.

| | | |
|---|---|---|
| *H04L 27/26* | (2006.01) | |
| *H04B 7/26* | (2006.01) | |
| *H04L 1/08* | (2006.01) | |
| *H01Q 3/26* | (2006.01) | |
| *H04B 7/06* | (2006.01) | |
| *H04B 7/216* | (2006.01) | |
| *H04J 11/00* | (2006.01) | |
| *H04L 5/00* | (2006.01) | |
| *H04L 25/02* | (2006.01) | |
| *H04L 1/00* | (2006.01) | |

(52) U.S. Cl.
CPC .......... *H04B 7/2615* (2013.01); *H04J 11/003* (2013.01); *H04L 1/08* (2013.01); *H04L 5/0007* (2013.01); *H04L 5/0023* (2013.01); *H04L 25/022* (2013.01); *H04L 27/2613* (2013.01); *H04L 27/2662* (2013.01); *H04L 27/2692* (2013.01); *H04J 2011/0003* (2013.01); *H04J 2203/0091* (2013.01); *H04L 1/0003* (2013.01); *H04L 1/0009* (2013.01); *H04L 1/0026* (2013.01); *H04L 5/005* (2013.01); *H04L 5/0051* (2013.01); *H04L 27/2614* (2013.01)

(56) References Cited

U.S. PATENT DOCUMENTS

| | | | |
|---|---|---|---|
| 7,969,964 B2 | 6/2011 | Kim | |
| 8,638,775 B2 | 1/2014 | Hall | |
| 8,665,799 B2 | 3/2014 | Malladi et al. | |
| 8,897,725 B2 | 11/2014 | Prasad et al. | |
| 8,913,672 B2 | 12/2014 | Luo et al. | |
| 8,964,689 B2 | 2/2015 | Ji et al. | |
| 8,982,848 B2 | 3/2015 | Ko et al. | |
| 2006/0052114 A1 | 3/2006 | Cuffaro | |
| 2006/0250937 A1 | 11/2006 | Wang et al. | |
| 2007/0004465 A1 | 1/2007 | Papasakellariou et al. | |
| 2007/0201398 A1 | 8/2007 | Yang et al. | |
| 2008/0205351 A1 | 8/2008 | Lindoff et al. | |
| 2008/0274742 A1 | 11/2008 | Bi | |
| 2009/0097447 A1 | 4/2009 | Han et al. | |
| 2010/0296429 A1 | 11/2010 | Han et al. | |
| 2013/0044695 A1 | 2/2013 | Xu et al. | |
| 2013/0084879 A1 | 4/2013 | Abe et al. | |
| 2013/0272294 A1 | 10/2013 | Mildh et al. | |
| 2014/0050206 A1 | 2/2014 | Seo et al. | |
| 2014/0126498 A1 | 5/2014 | Koorapaty et al. | |
| 2014/0307643 A1 | 10/2014 | Froberg Olsson et al. | |
| 2015/0009949 A1 | 1/2015 | Khoryaev et al. | |
| 2015/0036764 A1 | 2/2015 | Oh et al. | |
| 2015/0049741 A1 | 2/2015 | Chen et al. | |
| 2015/0055574 A1* | 2/2015 | Kim .................... H04J 11/0073 | |
| | | | 370/329 |
| 2015/0055632 A1 | 2/2015 | Gou et al. | |
| 2015/0085833 A1 | 3/2015 | Han et al. | |
| 2015/0109943 A1 | 4/2015 | Sahin et al. | |
| 2015/0109974 A1 | 4/2015 | Zeng et al. | |
| 2015/0131750 A1 | 5/2015 | Xue et al. | |
| 2015/0172940 A1 | 6/2015 | Nagata et al. | |
| 2015/0173051 A1 | 6/2015 | Nagata et al. | |
| 2015/0236774 A1 | 8/2015 | Son et al. | |
| 2015/0256308 A1 | 9/2015 | Ma et al. | |
| 2015/0289079 A1 | 10/2015 | Webb et al. | |
| 2015/0319724 A1 | 11/2015 | Chae et al. | |
| 2015/0319761 A1 | 11/2015 | Nagata et al. | |
| 2015/0358801 A1 | 12/2015 | Seo et al. | |
| 2016/0014718 A1* | 1/2016 | Mysore Balasubramanya ............ | |
| | | | H04W 52/0219 |
| | | | 455/458 |
| 2016/0050675 A1 | 2/2016 | Tanaka | |
| 2016/0088568 A1 | 3/2016 | Webb et al. | |
| 2016/0127919 A1 | 5/2016 | Hui et al. | |
| 2016/0134402 A1 | 5/2016 | Park et al. | |
| 2016/0150431 A1 | 5/2016 | Zhang et al. | |
| 2016/0212594 A1 | 7/2016 | Morita et al. | |
| 2016/0277225 A1* | 9/2016 | Frenne ............. H04W 56/0015 | |
| 2016/0323757 A1 | 11/2016 | Braun et al. | |
| 2016/0352551 A1 | 12/2016 | Zhang et al. | |
| 2016/0374038 A1 | 12/2016 | Wang | |
| 2017/0094547 A1 | 3/2017 | Yum et al. | |
| 2017/0127444 A1 | 5/2017 | Goto et al. | |
| 2017/0201968 A1 | 7/2017 | Nam et al. | |
| 2017/0353234 A1 | 12/2017 | Islam et al. | |
| 2017/0353254 A1 | 12/2017 | Islam et al. | |
| 2017/0353256 A1 | 12/2017 | Islam et al. | |
| 2017/0353257 A1 | 12/2017 | Islam et al. | |
| 2018/0054289 A1* | 2/2018 | Kim ........................ H04W 4/38 | |
| 2018/0084551 A1 | 3/2018 | Shin et al. | |
| 2018/0092064 A1 | 3/2018 | Ryu et al. | |
| 2018/0098298 A1 | 4/2018 | Jung et al. | |
| 2018/0213562 A1 | 7/2018 | Cierny et al. | |
| 2018/0262313 A1 | 9/2018 | Nam et al. | |
| 2018/0309495 A1* | 10/2018 | Xiong ........................ H04L 5/00 | |
| 2018/0323855 A1 | 11/2018 | Noh et al. | |
| 2018/0337757 A1 | 11/2018 | Noh et al. | |
| 2019/0028984 A1 | 1/2019 | Lee et al. | |
| 2019/0037609 A1 | 1/2019 | Harada et al. | |

FOREIGN PATENT DOCUMENTS

| | | |
|---|---|---|
| CN | 102480443 A | 5/2012 |
| CN | 102892198 A | 1/2013 |
| CN | 103391265 A | 11/2013 |
| CN | 103828398 A | 5/2014 |
| CN | 103873218 A | 6/2014 |
| CN | 104349464 A | 2/2015 |
| CN | 104639229 A | 5/2015 |
| CN | 104735773 A | 6/2015 |
| CN | 104969488 A | 10/2015 |
| CN | 105164951 A | 12/2015 |
| CN | 105453692 A | 3/2016 |
| EP | 2916600 A1 | 9/2015 |
| EP | 3001631 A1 | 3/2016 |
| EP | 3065485 A1 | 9/2016 |
| WO | 2008033985 A2 | 3/2008 |
| WO | 2009049167 A2 | 4/2009 |
| WO | 2010015102 A1 | 2/2010 |
| WO | 2010030941 A2 | 3/2010 |
| WO | 2010050731 A2 | 5/2010 |
| WO | 2010094299 A1 | 8/2010 |
| WO | 2013166961 A1 | 11/2013 |
| WO | 2015003396 A1 | 1/2015 |
| WO | 2015064679 A1 | 5/2015 |
| WO | 2015080649 A1 | 6/2015 |
| WO | 2015115963 A1 | 8/2015 |
| WO | 2016129900 A1 | 8/2016 |
| WO | 2016210302 A1 | 12/2016 |
| WO | 2017018966 A1 | 2/2017 |
| WO | 2017044144 A1 | 3/2017 |
| WO | 2018201491 A1 | 11/2018 |

OTHER PUBLICATIONS

LG Electronics: "Discussion on SS Block Time Index Indication", 3GPP TSG RAN WG1 Meeting #89, R1-1707589, Hangzhou, P.R. China May 15-19, 2017, 3 pages.

(56) References Cited

OTHER PUBLICATIONS

Mediatek Inc: "Multiplexing and Resource Allocation of NB-PDSCH in NB-IoT", 3GPP TSG RAN WG1 Meeting #84, R1-160829, St Julian's, Malta, Feb. 15-19, 2016, 5 pages.
Samsung et al., "WF on SS Block Index Indication", 3GPP TSG RAN WG1 Meeting RAN1#89, R1-1709490, Hangzhou, P.R. China May 15-19, 2017, 4 pages.
Intel Corporation: "Details on Small Cell Discovery Signal", 3GPP Draft; R1-142028, 3rd Generation Partnership Project (3GPP), Mobile Competence Centre ; 650, Route Des Lucioles ; F-06921 Sophia-Antipolis Cedex; France, vol. RAN WG1, No. Seoul, Korea; May 19, 2014-May23, 2014, May 23, 2014, May 18, 2014 (May 18, 2014), XP050789148, Retrieved from the Internet: URL: http://www.3gpp.org/ftp/Meetings_3GPP_SVNC/RAN1/RAN1/Docs/ [retrieved on May 18, 2014].
International Search Report and Written Opinion—PCT/US2017/035250—ISA/EPO—dated Sep. 1, 2017.
LG Electronics et al., "WF on Supporting Different Numerologies in a NR Carrier", 3GPP TSG RAN WG1 Meeting #85, R1-165837, May 30, 2016, XP051112005, Retrieved from the Internet: URL:http://www.3gpp.org/ftp/tsg ran/WG1_RL1/TSGR1_85/Docs/, 3 pages.
QUALCOMM Incorporated: "NB-PSS and NB-SSS Design", 3GPP Draft; R1-160105 NB-PSS and NB-SSS Design, 3rd Generation Partnership Project (3GPP), Mobile Competence Centre ; 650, Route Des Lucioles ; F-06921 Sophia-Antipolis Cedex ; France vol. RAN WG1, No. Budapest, HU; Jan. 18, 2016-Jan. 20, 2016, Jan. 20, 2016, Jan. 17, 2016 (Jan. 17, 2016), pp. 1-11, XP051053425, Retrieved from the Internet: URL: http://www.3gpp.org/ftp/Meetings_3GPP_SYNC/RAN1/Docs/ [retrieved on Jan. 17, 2016].
Sharp: "Synchronization Signal Design for NB-IoT", 3GPP TSG RAN WG1 Meeting #83, R1-157119, Nov. 15, 2015, XP051040013, Retrieved from the Internet: URLhttp://www.3gpp.org/ftp/Meetings_3GPP_SYNC/RAN1/Docs/, 4 pages.
Zte et al., "Performance Evaluation of Numerology Candidates", 3GPP TSG RAN WG1 Meeting #85, R1-164272, May 14, 2016, XP051090020, Retrieved from the Internet: URL:http://www.3gpp.org/ftp/tsg_ran/WG1_RL1/TSGR1_85/Docs/, 7 pages.
Samsung: "Narrowband IoT—Broadcast Channel Design", 3GPP Draft; R1-155511, 3rd Partnership Project (3GPP), Mobile Competence Centre; 650, Route Des Lucioles; F-06921 Sophia-Anti Polls Cedex; France, vol. RAN WG1, No. Malmo, Sweden; Oct. 4, 2015, XP051002403, Retrieved from the Internet: URL:http://www.3gpp.org/ftp/Meetings_3GPP_SYNC/RAN1/Docs/ [retrieved on Oct. 4, 2015], 5 pages.

NTT DoCoMo, et al., "Multiplexing Method of Shared Control Channel in Uplink Single-Carrier FDMA Radio Access," TSG RAN WG1 #42bis, Document #R1-051143 (Original R1-050591), pp. 1-9, XP002450609, Oct. 10-14, 2005.
NTT DoCoMo: "Multiplexing Method of SCH for E-UTRA Downlink", 3GPP TSG-RAN WG1#47, R1-063303, Institute or Infocomm Research, Nov. 6, 2006, p. 1-9.
Intel Corporation: "Considerations on location of PSS/SSS signaling in NCT", 3GPP TSG RAN WG1 Meeting #69, R1-122658, Prague, Czech Republic, May 21-25, 2012, 9 Pages.
Neul: "On NB-PSS Receiver Complexity", 3GPP TSG RAN WG1 Nb-IoT Ad-Hoc Meeting #2, R1-161980, Sophia-Antipolis, France, Mar. 22-24, 2016, 9 Pages.
Nokia Networks, et al., "Synchronization Signal Design for NB-IoT", 3GPP TSG-RAN WG1 # 84, 3GPP Draft; R1-161104, 3rd Generation Partnership Project (3GPP), vol. RAN WG1, No. St Julian's, Malta; Feb. 15, 2016-Feb. 19, 2016, Feb. 24, 2016 (Feb. 24, 2016), XP051079077, Retrieved from the Internet: URL: http://www.3gpp.org/ftp/tsg_ran/WG1_RL1/TSGR1_84/Docs/ [retrieved on Feb. 24, 2016].
Nokia Networks Alcatel-Lucent, Alcatel-Lucent Shanghai Bell: "Synchronization Signal Design for NB-IoT" [online], 3GPP TSG-RAN WG1 # 84 R1-160449, Feb. 5, 2016, 7 Pages, Retrieved from the Internet URL: http://www.3gpp.org/ftp/tsg_ran/WG1_RL1/TSGR1_84/Docs/R1-160449.zip.
QUALCOMM Incorporated: "Narrow band OFDMA—Synchronization", 3GPP TSG GERAN #64, Tdoc GP-140841, San Francisco, USA, Nov. 17-21, 2014, 6 Pages.
QUALCOMM Incorporated: "NB-PSS and NB-SSS Design", 3GPP TSG RAN WG1 NB-IoT Ad-Hoc Meeting, R1-161981, Sophia Antipolis, France, Mar. 22, 2016, 24 Pages, Mar. 22, 2016-Mar. 24, 2016, XP051081092, Retrieved from the Internet: URL: http://www.3gpp.org/ftp/tsg_ran/WG1_RL1/TSGR1_AH/LTE_NB-IoT_1603/Docs/ [retrieved on Mar. 22, 2016].
Mediatek Inc: "General Considerations on NB-IoT DL Physical-Layer Design", 3GPP Draft, 3GPP TSG RAN WG1 Meeting #83, R1-156972 General Considerations on NNIOT DL PHY Design, 3rd Generation Partnership Project (3GPP), Mobile Competence Centre, 650, Route Des Lucioles, F-06921 Sophia-Antipofis Cedex, F, vol. RAN WG1, No. Anaheim, USA, Nov. 15, 2015-Nov. 22, 2015 Nov. 15, 2015 (Nov. 15, 2015), XP051003289, pp. 1-5, Retrieved from the Internet: URL:http://www.3gpp.org/ftp/Meetings_3GPP_SYNC/RAN1/Docs/ [retrieved on Nov. 15, 2015].

\* cited by examiner

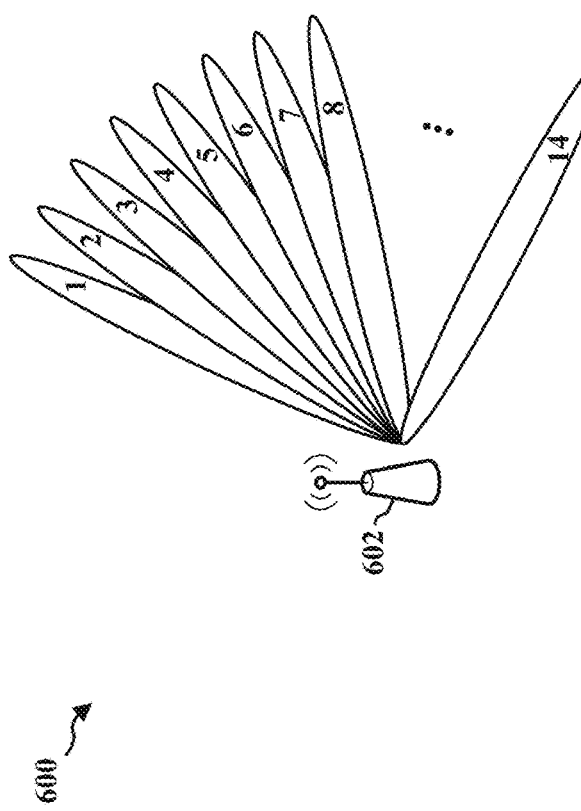
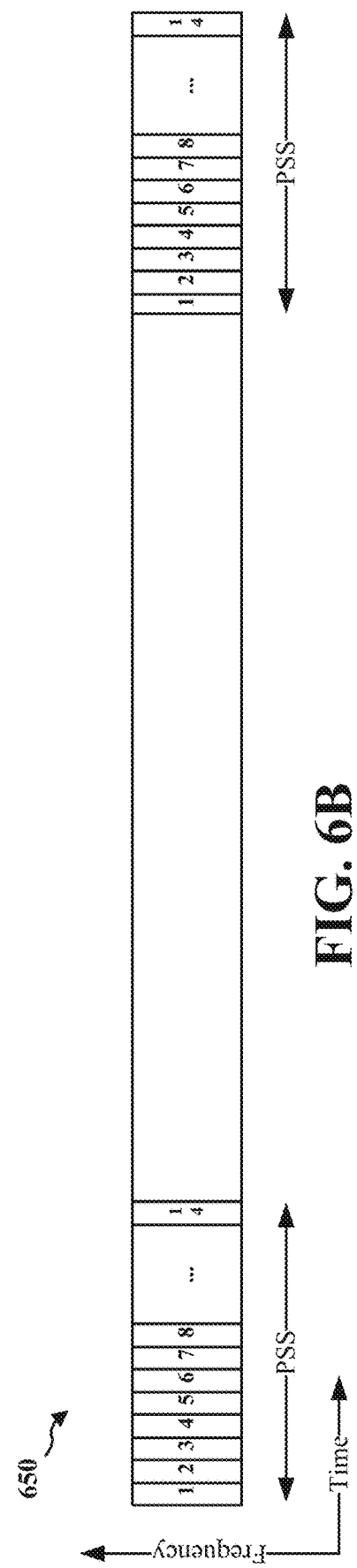
FIG. 6A
FIG. 6B

TIME DIVISION MULTIPLEXING OF SYNCHRONIZATION CHANNELS

CROSS-REFERENCE TO RELATED APPLICATION(S)

This application claims the benefit of U.S. Provisional Application Ser. No. 62/344,381, entitled "TIME DIVISION MULTIPLEXING OF SYNCHRONIZATION CHANNELS" and filed on Jun. 1, 2016, U.S. Provisional Application Ser. No. 62/350,171, entitled "TIME DIVISION MULTIPLEXING OF SYNCHRONIZATION CHANNELS" and filed on Jun. 14, 2016, U.S. Provisional Application Ser. No. 62/401,801, entitled "TIME DIVISION MULTIPLEXING OF SYNCHRONIZATION CHANNELS" and filed on Sep. 29, 2016, and U.S. Provisional Application Ser. No. 62/410,073, entitled "CONVEYING HYPOTHESES THROUGH RESOURCE SELECTION OF SYNCHRONIZATION AND BROADCAST CHANNELS" and filed on Oct. 19, 2016, which are expressly incorporated by reference herein in their entirety.

BACKGROUND

Field

The present disclosure relates generally to communication systems, and more particularly, to wireless communication using multiplexing.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (Iota)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus processes a first group of synchronization signals. The apparatus processes a second group of synchronization signals. The apparatus performs a first transmission by transmitting the processed first group of the synchronization signals in a first synchronization subframe. The apparatus performs a second transmission by transmitting the processed second group of the synchronization signals in a second synchronization subframe.

In an aspect, the apparatus may be a base station. The apparatus includes means for processing a first group of synchronization signals. The apparatus includes means for processing a second group of synchronization signals. The apparatus includes means for performing a first transmission by transmitting the processed first group of the synchronization signals in a first synchronization subframe. The apparatus includes means for performing a second transmission by transmitting the processed second group of the synchronization signals in a second synchronization subframe.

In an aspect, the apparatus may be a base station including a memory and at least one processor coupled to the memory. The at least one processor is configured to: process a first group of synchronization signals, process a second group of synchronization signals, perform a first transmission by transmitting the processed first group of the synchronization signals in a first synchronization subframe, and perform a second transmission by transmitting the processed second group of the synchronization signals in a second synchronization subframe.

In an aspect, a computer-readable medium storing computer executable code for wireless communication by a base station comprises code to: process a first group of synchronization signals, process a second group of synchronization signals, perform a first transmission by transmitting the processed first group of the synchronization signals in a first synchronization subframe, and perform a second transmission by transmitting the processed second group of the synchronization signals in a second synchronization subframe.

In another aspect of the disclosure, a method, a computer-readable medium, and an apparatus are provided. The apparatus may be a UE. The apparatus receives, in a first synchronization subframe, a first transmission of a first group of synchronization signals processed by processing the first group of synchronization signals. The apparatus receives, in a second synchronization subframe, a second transmission of a second group of synchronization signals processed by processing the second group of synchronization signals. The apparatus performs time-division demultiplexing of the processed first group of synchronization signals and the processed second group of synchronization signals.

In an aspect, the apparatus may be a UE. The apparatus includes means for receiving, in a first synchronization subframe, a first transmission of a first group of synchronization signals processed by processing the first group of synchronization signals. The apparatus includes means for receiving, in a second synchronization subframe, a second transmission of a second group of the plurality of synchronization signals processed by processing the second group of synchronization signals. The apparatus includes means for performing time-division demultiplexing of the processed first group of synchronization signals and the processed second group of synchronization signals.

In an aspect, the apparatus may be a UE including a memory and at least one processor coupled to the memory. The at least one processor is configured to: receive, in a first synchronization subframe, a first transmission of a first group of synchronization signals processed by processing the first group of synchronization signals, receive, in a second synchronization subframe, a second transmission of a second group of the plurality of synchronization signals processed by processing the second group of synchronization signals, and perform time-division demultiplexing of the processed first group of synchronization signals and the processed second group of synchronization signals.

In an aspect, a computer-readable medium storing computer executable code for wireless communication by a UE comprises code to: receive, in a first synchronization subframe, a first transmission of a first group of synchronization signals processed by processing the first group of synchronization signals, receive, in a second synchronization subframe, a second transmission of a second group of the plurality of synchronization signals processed by processing the second group of synchronization signals, and perform time-division demultiplexing of the processed first group of synchronization signals and the processed second group of synchronization signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is an example diagram illustrating a base station sweeping in multiple directions.

FIG. 6B is an example diagram illustrating resource usage for the base station of FIG. 6A.

DETAILED DESCRIPTION

Figure 1:
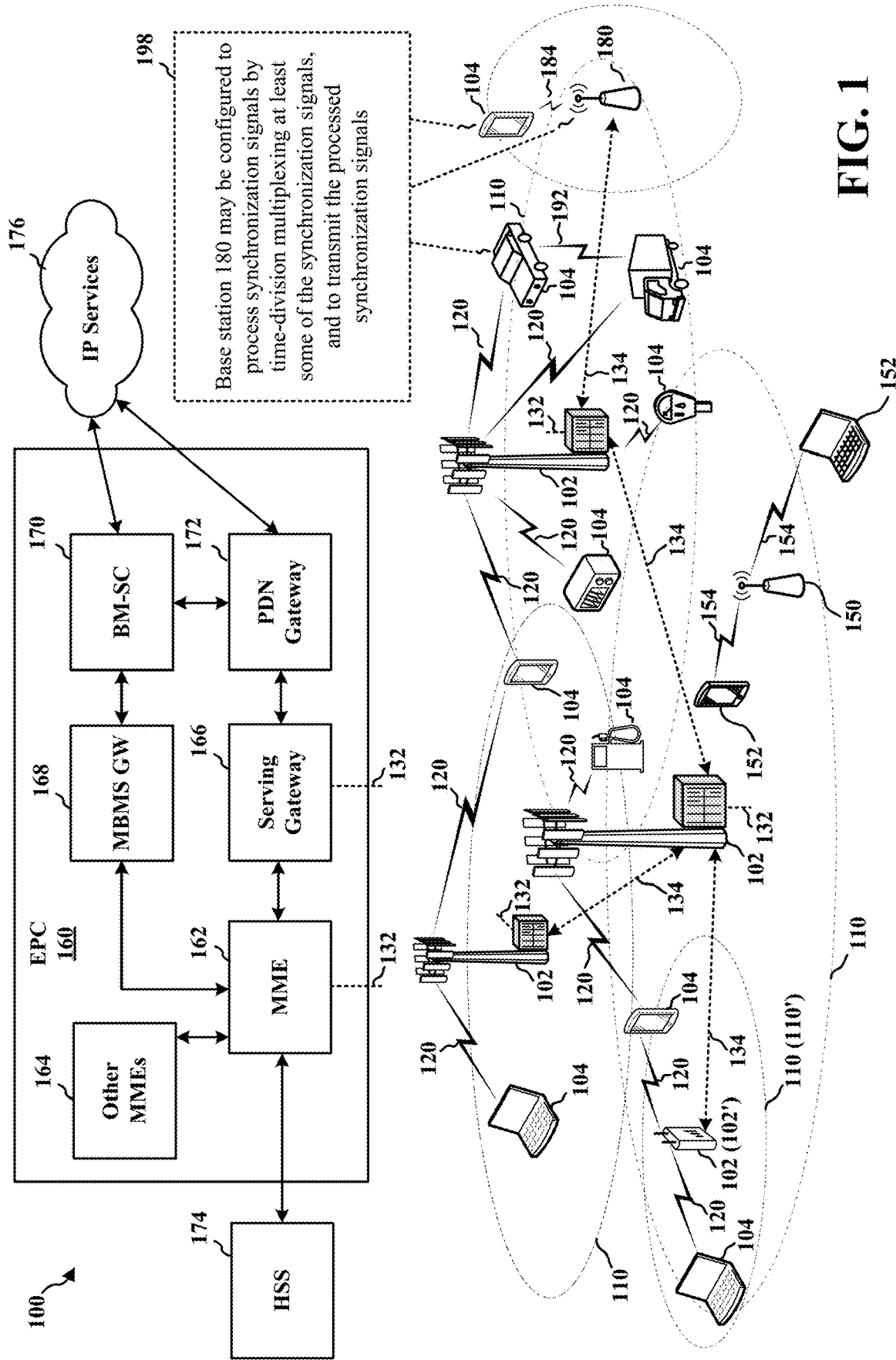
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to process synchronization signals by time-division multiplexing at least some of the synchronization signals, and to transmit the processed synchronization signals (198).

Figure 2:
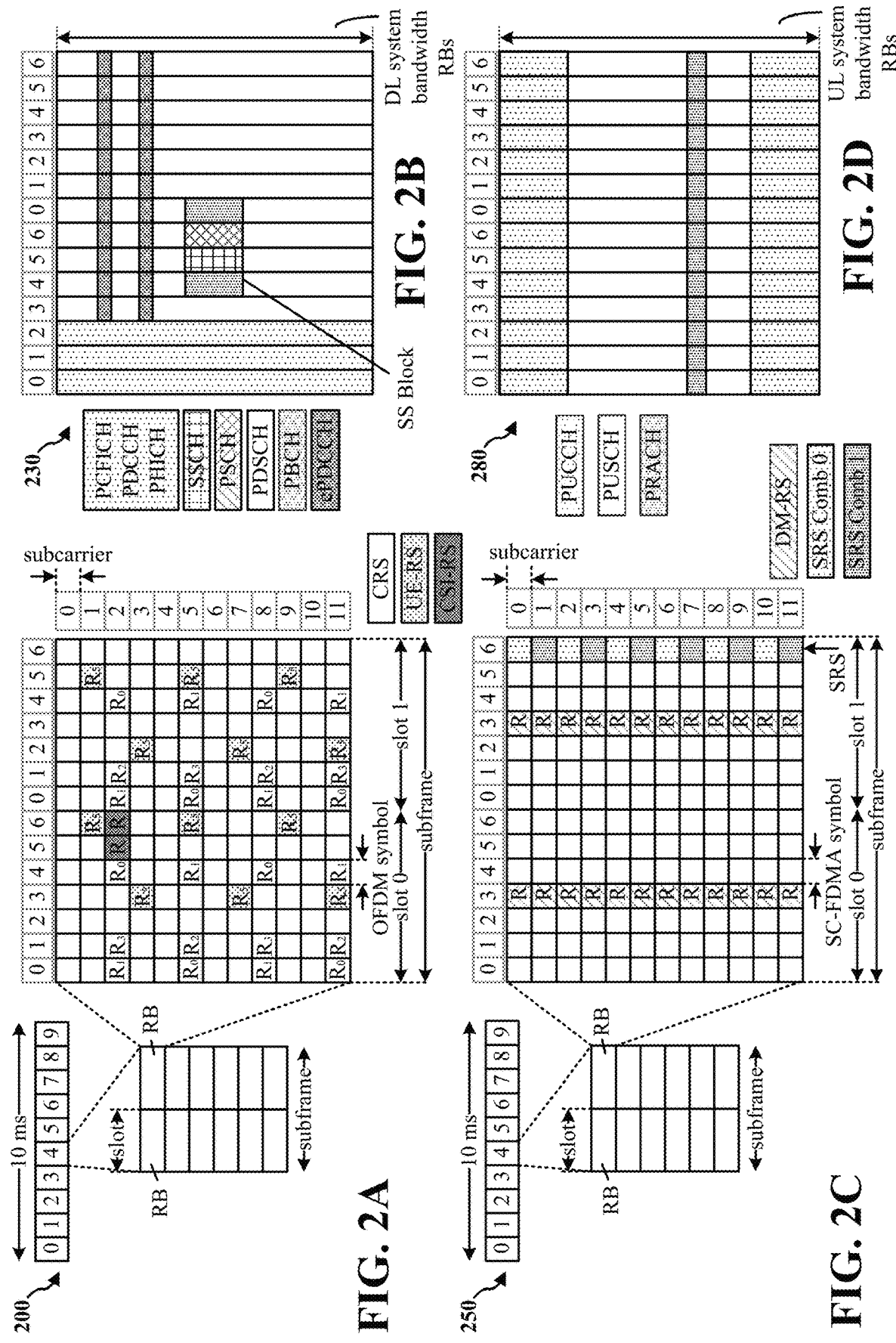
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
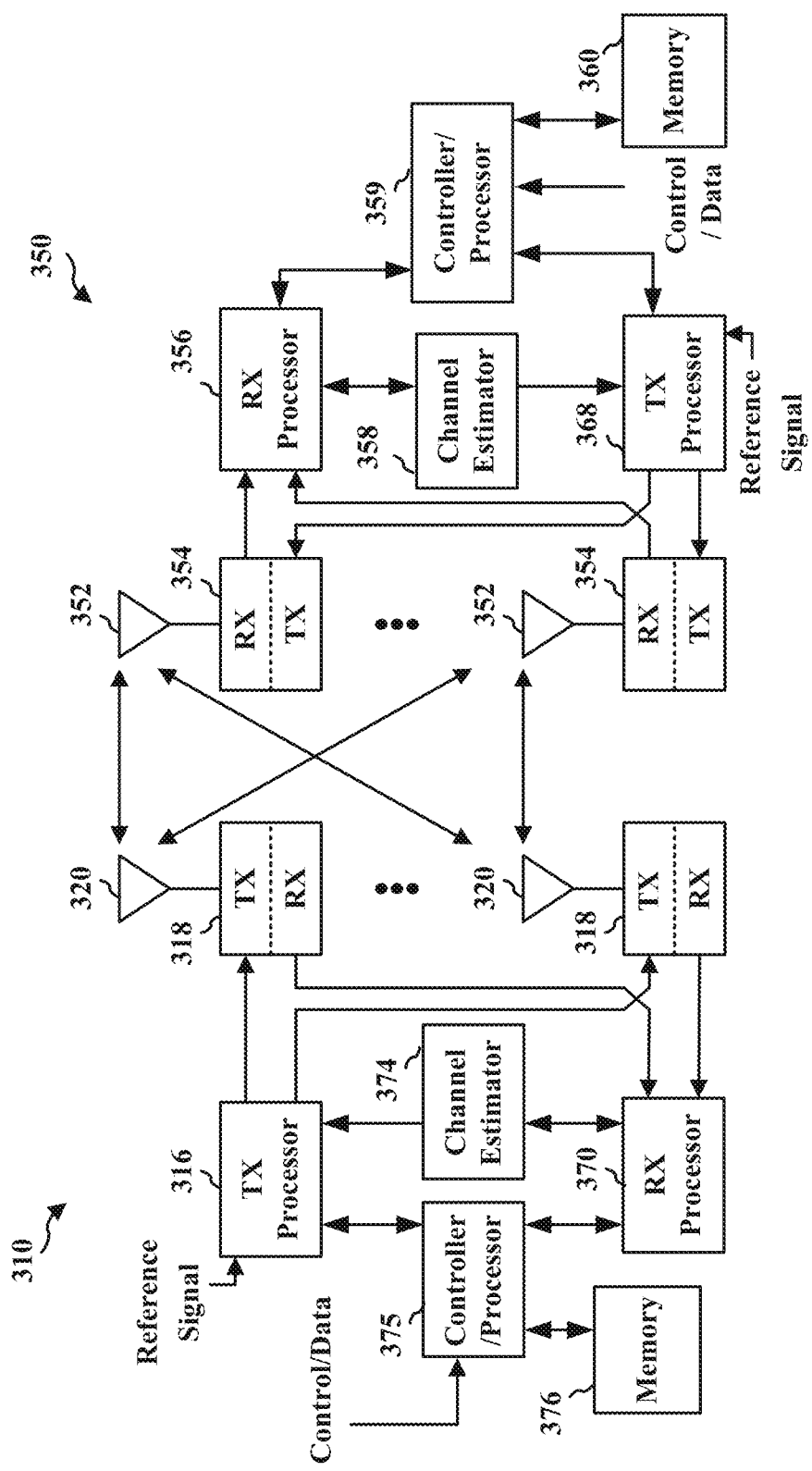
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
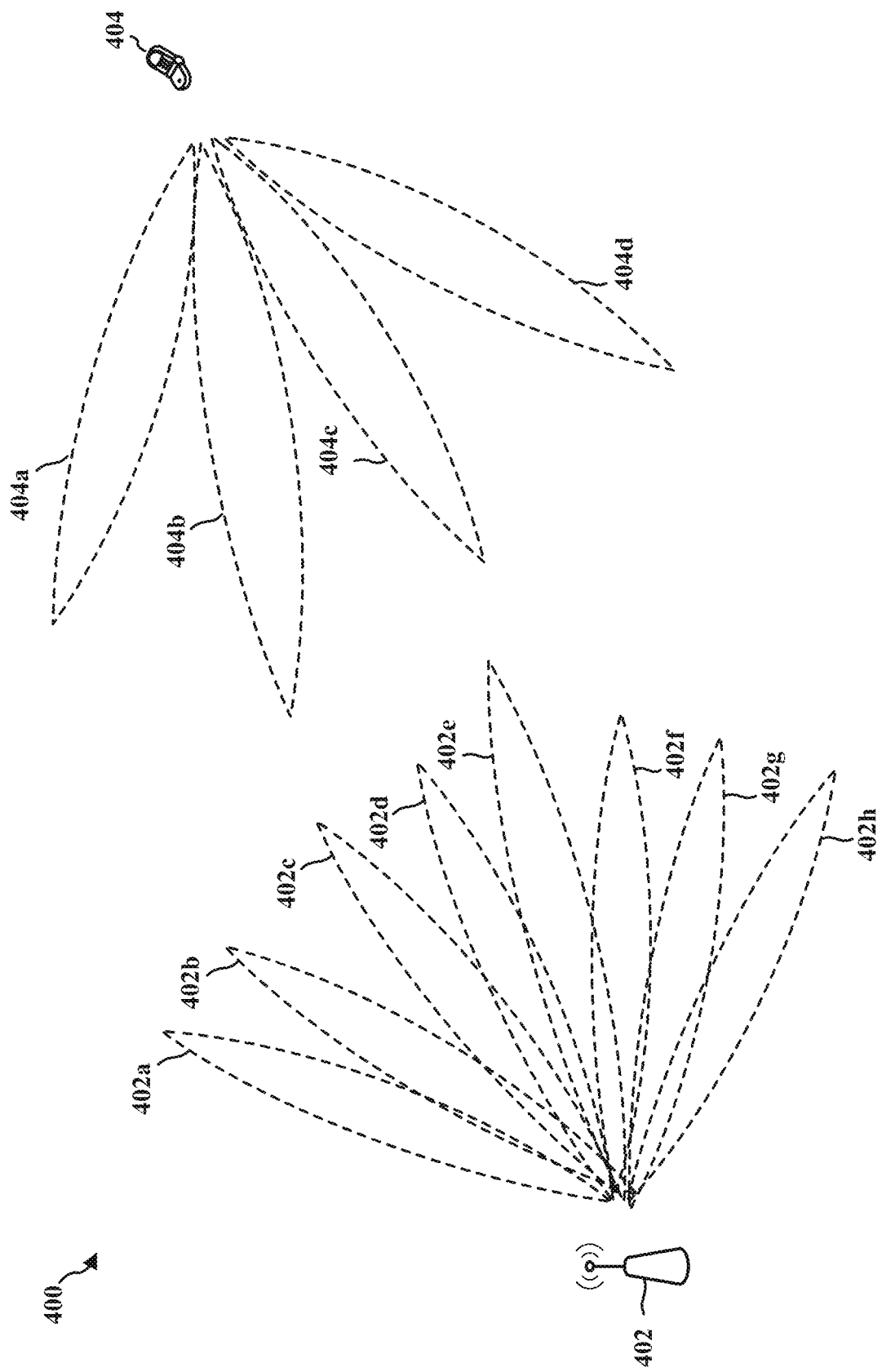
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In an aspect, referring to FIG. 4, when the UE 404 turns on, the UE 404 searches for a nearby NR network. The UE 404 discovers the base station 402, which belongs to an NR network. The base station 402 transmits a synchronization signal block (SS block) including the PSS, SSS, and the PBCH (including the MIB) periodically in different transmit directions 402a-402h. The UE 404 receives the transmission 402e including the PSS, SSS, and PBCH. Based on the received SS block, the UE 404 synchronizes to the NR network and camps on a cell associated with the base station 402.

Figure 5:
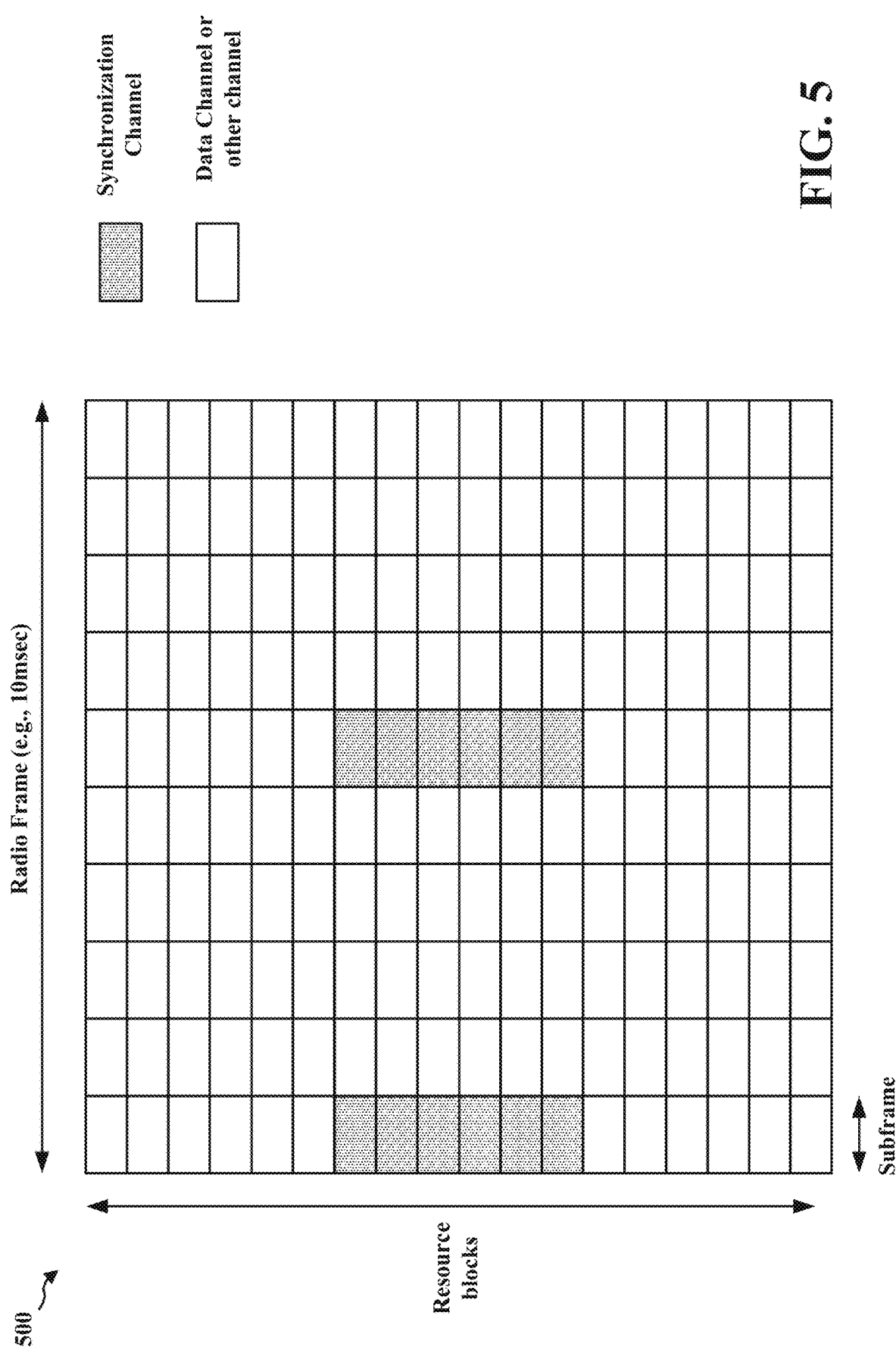
FIG. 5 is an example diagram illustrating synchronization channels over a radio frame.

Synchronization signaling in LTE generally takes place twice over a radio frame, over multiple subcarriers. FIG. 5 is an example diagram 500 illustrating synchronization channels over a radio frame. As shown in FIG. 5, the synchronization channels for synchronization signaling are allocated every five subframes, over six subcarriers. Synchronization signals such as a PSS, an SSS, and a PBCH signal may be transmitted in the subframes corresponding to the synchronization channels.

A base station may use beamforming to transmit signals in a particular direction. For example, in an mmW system that utilize a high carrier frequency (e.g., 28 GHz or higher), path loss may be high and there may be additional non-line-of-sight loss (e.g., diffraction, reflection, absorption, etc.). For example, the carrier frequency for mmW communication may be 10 times higher than a carrier frequency for other types of wireless communication. In such an example, the mmW system may experience a path loss that is approximately 20 dB higher than other types of wireless communication cases at lower frequencies. To mitigate the path loss and/or additional non-line-of-sight loss in mmW systems, a base station may perform transmissions in a directional manner, where the transmissions are beam-formed to steer the transmissions of the beams in different directions.

If the carrier frequency for wireless communication is high, the wavelength is short, which may allow a higher number of antennas to be implemented within a given antenna array length than can be implemented when a lower carrier frequency is used. Therefore, in the mmW system (using a high carrier frequency), a higher number of antennas may be used in a base station and/or a UE. For example, the BS may have 128 or 256 antennas and the UE may have 8, 16 or 24 antennas. With the high number of antennas, a beam-forming technique may be used to digitally change the direction of the beam (e.g., transmit beam and/or receive beam) by applying different phases for different antennas. Because beam-forming in a mmW system may provide a narrow beam for increased gain, the base station may transmit the narrow beam in different directions using beam-forming to transmit the narrow beam in different directions. The base station may also transmit synchronization signals in different directions using beam-forming in a sweeping manner.

If there are multiple antenna ports (multiple sets of antennas) in the base station, the base station may transmit multiple beams per symbol. For example, the base station may sweep in multiple directions using multiple antenna ports in a cell specific manner. Each antenna port may include a set of antennas. For example, an antenna port including a set of antennas (e.g., 64 antennas) may transmit one beam in one direction, and another antenna port including another set of antennas may transmit another beam in another direction. Thus, multiple antenna ports may transmit multiple beams, each in a different direction. FIG. 6A is an example diagram 600 illustrating a base station sweeping in multiple directions. The base station 602 in FIG. 6 has fourteen antenna ports, and thus is capable of transmitting fourteen beams (beam 1-beam 14) in fourteen different directions (sweeping in fourteen different directions). FIG. 6B is an example diagram 650 illustrating resource usage for the base station of FIG. 6A. As illustrated in FIG. 6B, a synchronization signal such as a PSS may be transmitted in fourteen directions via fourteen different beams using fourteen different resources respectively (e.g., fourteen different symbols). The UE may receive the synchronization signal in one of the directions that corresponds to the position of the UE. Therefore, in an aspect, the synchronization signal may not be frequency-division multiplexed with data signals. On the other hand, different synchronization signals such as a PSS, a SSS, an extended synchronization Signal (ESS), a PBCH signal, and a beam reference signal (BRS) may be frequency-division multiplexed with each other (e.g., by the base station), and may be transmitted in each of different directions of the beam-forming within each symbol. For example, for each direction, the synchronization signals may be frequency-division multiplexed with each other, but the synchronization signals in one direction may not be frequency-division multiplexed with synchronization signals in another direction.

Figure 7:
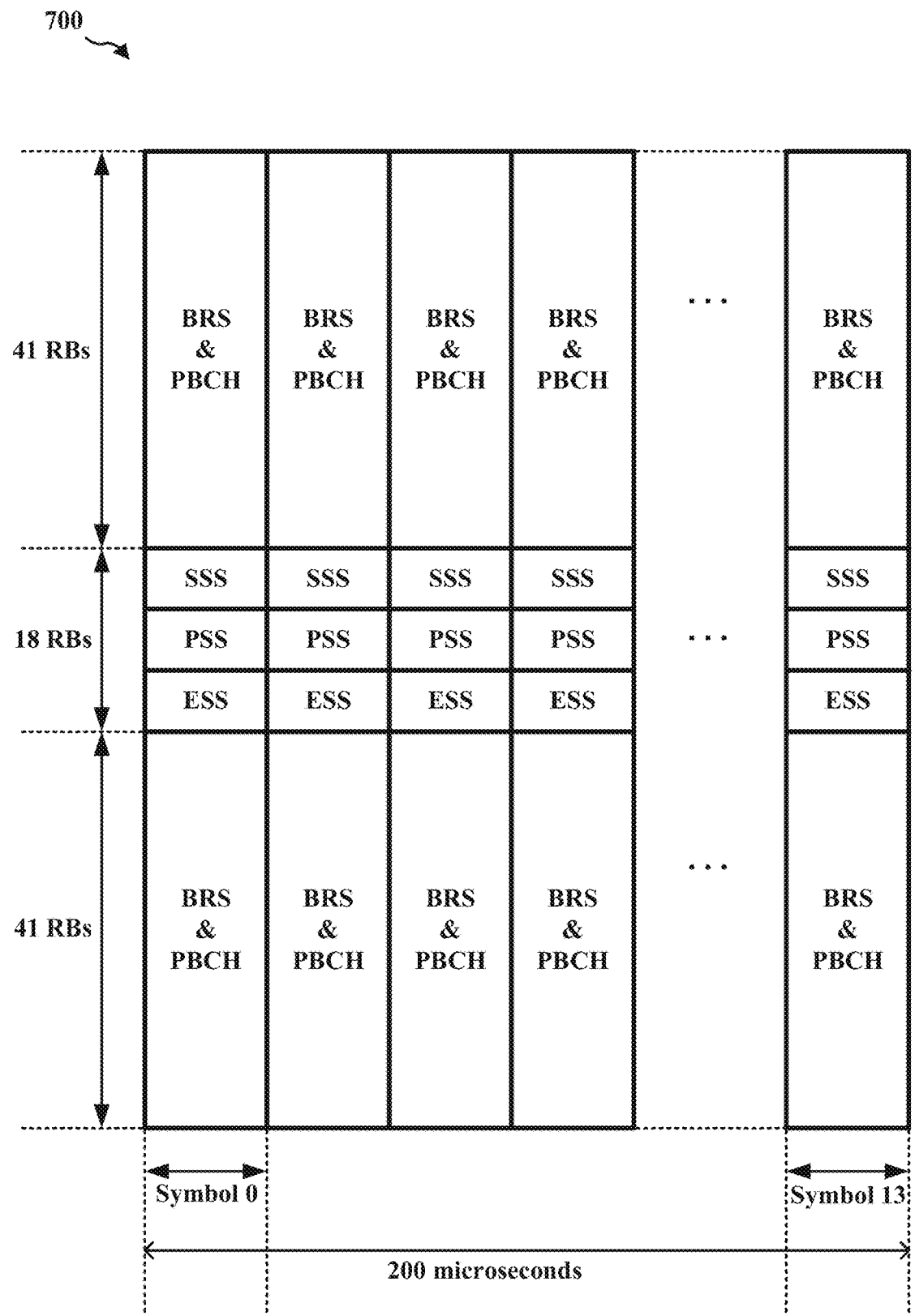
FIG. 7 is an example diagram illustrating a synchronization subframe structure for a millimeter wave communication system.

FIG. 7 is an example diagram 700 illustrating a synchronization subframe structure for a millimeter wave communication system. The synchronization subframe may be divided into 14 symbols, from symbol 0 to symbol 13. Within each symbol, 100 subcarriers may be communicated, where the first 41 RBs are used to carry BRSs and PBCHs, the next 18 RBs are used to carry an SSS, a PSS, and an ESS, and the next 41 RBs are used to carry BRSs and PBCHs.

If different synchronization signals (for different synchronization channels) are frequency-division multiplexed with each other, peak-to-average-power-ratio (PAPR) advantage may be lost. For example, if a base station transmits one type of synchronization signal (e.g., via a Zadoff Chu sequence), a base station may transmit at high power (e.g., with PAPR advantage). However, if multiple different types of synchronization signals (e.g., an SSS, a PSS, an ESS, a BRS, and a PBCH within one symbol (e.g., within one SS block), as shown in FIG. 7) are transmitted simultaneously within one symbol, the PAPR becomes high and thus the PAPR advantage may be lost. Thus, frequency-division multiplexing synchronization signals with each other within each symbol may not be desirable in terms of a PAPR advantage.

On the other hand, if different synchronization signals are time-division multiplexed with each other, some PAPR advantage may be gained. This PAPR advantage may be particularly evident in channels carrying a PSS and an SSS channels. For example, a Zadoff Chu sequence used in the time-division multiplex of the synchronization signals may provide a PAPR advantage. Further, the PAPR advantage may be maintained if the time-division multiplexed synchronization signals are not frequency-division multiplexed with other signals. Thus, time-division multiplexing some of the synchronization signals may be desirable.

According to an aspect of the disclosure, a base station processes synchronization signals by time-division multiplexing at least some of the synchronization signals (e.g., two or more synchronization signals), and then sends the processed synchronization signals to the UE. The base station may avoid frequency-division multiplexing at least some of the synchronization signals. In one example, the synchronization signals may be categorized into first synchronization signals including a PSS and an SSS, and second synchronization signals including an ESS, a BRS, and a PBCH signal. In another example, the first synchronization signals may include a PSS, an SSS, a BRS, an ESS, or a PBCH, and the second synchronization signals may include a PSS, an SSS, a BRS, an ESS, or a PBCH. In such examples, the base station may process the synchronization signals by time-division multiplexing at least one synchronization signal from the first synchronization signals and at least one synchronization signal from the second synchronization signals. In this example, the base station may process the first synchronization signals by time-division multiplexing or frequency-division multiplexing the synchronization signals within the first synchronization signals, and may process the second synchronization signals by time-division multiplexing or frequency-division multiplexing the synchronization signals within the second synchronization signals. Subsequently, the base station may time-division multiplex the processed first synchronization signals and the processed second synchronization signals. In an aspect, the base station may avoid frequency-division multiplexing the processed first synchronization signals and the processed second synchronization signals. In an aspect, the base station may avoid frequency-division multiplexing any synchronization signal from the first synchronization signals and any synchronization signal from the second synchronization signals. In an aspect, the base station may avoid frequency-division multiplexing the synchronization signal(s) and data channel signal(s). In an aspect, the data channel signals may include . . . PDSCH signals and/or PUSCH signals.

After processing the synchronization signals, the base station transmits the processed synchronization signals to the UE, such that the UE may demultiplex the processed synchronization signals for synchronization with the base station. For example, the UE may demultiplex the processed synchronization signals by time-division demultiplexing at least one synchronization signal from the first synchronization signals and at least one synchronization signal from the second synchronization signals. For example, as discussed supra, the UE may demultiplex (e.g., time-division or frequency-division) first multiplexed synchronization signals that were multiplexed (e.g., time-division or frequency-division) within the first synchronization signals and demultiplex (e.g., time-division or frequency-division) second multiplexed synchronization signals that were multiplexed (e.g., time-division or frequency-division) within the second synchronization signals to produce a resulting synchronization signal, and may subsequently perform time-division demultiplex the resulting synchronization signals. In one example, the UE may perform by time-division demultiplexing of first multiplexed synchronization signals that were time-division multiplexed within the first synchronization signals and may perform time-division demultiplexing of second multiplexed synchronization signals that were time-division multiplexed within the second synchronization signals to produce a resulting synchronization signal, and may subsequently perform time-division demultiplexing of the resulting synchronization signals. In another example, the UE may perform by frequency-division demultiplexing of first multiplexed synchronization signals that were frequency-division multiplexed within the first synchronization signals and may perform frequency-division demultiplexing of second multiplexed synchronization signals that were frequency-division multiplexed within the second synchronization signals to produce a resulting synchronization signal, and may subsequently perform time-division demultiplexing of the resulting synchronization signals. In another example, the UE may perform time-division demultiplexing of first multiplexed synchronization signals that were time-division multiplexed within the first synchronization signals and may perform frequency-division demultiplexing of second multiplexed synchronization signals that were frequency-division multiplexed within the second synchronization signals to produce a resulting synchronization signal, and may subsequently perform time-division demultiplexing of the resulting synchronization signals In an aspect, the base station may transmit (e.g., to the UE) the synchronization signals in a synchronization signal block (SS block), where each SS block corresponds to a respective direction of a beam of the base station. When the base station transmits one or more burst sets, each burst set may include a set of SS blocks, where each SS block in the set of SS blocks may correspond to a respective beam direction. For example, in a scenario where a base station may sweep in 16 directions using 16 beams respectively, a burst set may contain 16 SS blocks, where each SS block corresponds to a different direction of a corresponding beam. A PSS or an SSS may be used to convey an SS block index within a burst set. For example, in mmW communication, for every beam direction, the base station may transmit a PSS, an SSS, and a PBCH. In one example, a combination of the PSS, the SSS, and the PBCH may constitute one SS block. In such an example, a burst set may include 16 SS blocks (e.g., in 16 directions) or 32 SS blocks (e.g., in 32 directions).

In an aspect, a synchronization channel subframe (e.g., synchronization subframe) may include a processed synchronization signal including a set of synchronization signals (e.g., a PSS, an SSS, and a PBCH signal) that have been processed and one or more repetitions of the processed synchronization signal. In an aspect, in a case where the processed synchronization signal is repeated one or more times, a synchronization channel subframe may also include a synchronization signal that is not repeated. The non-repeated synchronization signal may indicate time and/or frequency locations of repeated synchronization signals (e.g., time and/or frequency locations of a PSS, an SSS, and a PBCH signal). The non-repeated synchronization signal may be an ESS. In an aspect, the processed synchronization signal may include a set of synchronization signals such as a PSS, an SSS, and a PBCH signal. One or more of the synchronization signals may be repeated within the processed synchronization signal. In one example, the processed synchronization signal may include a PSS, an SSS, a repeated SSS, and a PBCH signal. In one example, the processed synchronization signal may include a PSS, an SSS, a PBCH signal and a repeated PBCH signal. In one example, the processed synchronization signal may include a PSS, an SSS, a DMRS for a PBCH signal and a repeated DMRS. In one aspect, in the processed synchronization signal, a synchronization signal and the repetition of the synchronization signal may be adjacent to each other in time. In another aspect, in the processed synchronization signal, a synchronization signal and the repetition of the synchronization signal may be separated from each other in time. Repetition of the synchronization signal within a processed synchronization signal may provide additional benefits in that the synchronization signal and the repetition of the synchronization allow frequency error estimation based on the synchronization signal and the repetition of the synchronization (e.g., by estimating a carrier frequency offset, as described infra). In an aspect, within a synchronization subframe, a set of SS blocks may be transmitted, where each SS block in the set of SS blocks may correspond to a respective beam direction and may include the processed synchronization signal. Thus, in such an aspect, one or more of the synchronization signals may be repeated within a SS block.

In an aspect, an ESS may be used (e.g., by the UE) to identify the symbol and slot/subframe index of the detected/received synchronization signal. In an aspect, a demodulation reference signal (DMRS) for PBCH signals may be used (e.g., instead of the ESS) to identify the symbol and slot/subframe index of the detected/received synchronization signal. In an aspect, an ESS may be used to identify a part of the SS block index or the entire SS block index. In an aspect, an ESS may be used to identify a part of the symbol and slot/subframe index of the detected/received synchronization signal or the entire symbol and slot/subframe index. In an aspect, a DMRS for a PBCH signal may be used to serve the purposes of ESS. Thus, in such an aspect, for example, a DMRS for a PBCH signal may convey a part of a symbol and slot/subframe index of the detected/received synchronization signal or the entire symbol and slot/subframe index. For example, a DMRS for a PBCH signal may convey a part of the SS block index or the entire SS block index.

In an aspect, the base station may set a numerology such that the numerology (e.g., tone spacing) for a synchronization signal is different from a numerology (e.g., tone spacing) for a data signal. The numerology (e.g., tone spacing) for the synchronization signal may be greater than the numerology (e.g., tone spacing) for the data signal. The base station may transmit the synchronization signal based on the numerology for the synchronization signal, and may transmit the data signal based on the numerology for the data signal. The synchronization signal may include one or more of a PSS, an SSS, a BRS, an ESS, and a PBCH. The data signal may include one or more PDSCH signals. In one aspect, PDSCH signals may carry remaining minimum system information (RMSI) and/or other system information (OSI). In one aspect, the numerology for the data signal may indicate the numerology of RMSI and/or OSI. In an aspect, a numerology for a signal may determine the duration of a transmission (e.g., periodicity) of a signal transmitted by the base station. For example, the duration of the transmission (e.g., periodicity) of a processed synchronization signal may be a function of the numerology and/or tone spacing for the processed synchronization signal. For example, the duration of the transmission (e.g., periodicity) of a data signal may be a function of the numerology and/or tone spacing for the data signal. The base station may use the numerology for the processed synchronization signal and/or the numerology for the data signal. The data signal may include a PDSCH signal and/or a PUSCH signal. The base station may declare such numerology information and/or tone spacing in the system information transmitted to the UE. The system information may be a master information block (MIB) and/or a system information block (SIB), etc. The MIB may be conveyed via a PBCH signal. The SIB may be conveyed via RMSI and/or OSI. In another aspect, a duration for a transmission of a signal may be a fixed value regardless of the numerology used. Because the numerology information is provided to the UE (e.g., via the system information), when the UE receives a synchronization signal, the UE may consider a corresponding numerology to receive the synchronization signal. When the UE receives a data signal, the UE may consider a corresponding numerology to receive the data signal. For example, the UE may consider tone spacing for synchronization signals when receiving the synchronization signals, and the UE may consider tone spacing for data signals when receiving the data signals.

In an aspect, the base station may signal to the UE through broadcast or unicast to associate a beam with a PRACH and/or a scheduling request opportunity. In one example, if the base station is configured to sweep in different directions via beam-forming, such association may provide benefits for downlink and uplink beam-forming. In another example, if the system is not configured to sweep in different directions via beam-forming, the UE may reuse LTE PRACH resource association because the UE may detect multiple beams, each with similar strength. In an aspect, the base station may transmit system information to the UE to indicate whether the processed synchronization signals is transmitted multiple times in different directions or multiple times in the same direction. The system information may be, for example, an MIB or a SIB. Then, the UE may determine which resources to use for the UE's RACH transmission based on the system information and/or the received synchronization signals.

In an aspect, different multiplexing combinations of the synchronization signals may be used. According to one approach, the base station may be configured to utilize time-division multiplex for all types of synchronization signals without utilizing frequency-division multiplex. According to another approach, the base station may be configured to utilize both time-division multiplexing and frequency-division multiplexing of the synchronization signals. For example, a base station may generate a first processed signal by frequency-division multiplexing a PSS and an SSS, and may generate a second processed signal by frequency-division multiplexing a PBCH signal and a BRS. Then, the base station may generate a processed synchronization signal by time-division multiplexing the first processed signal and the second processed signal. When the PSS and the SSS are frequency-division multiplexed, the PSS may be mapped to consecutive tones in a first subset of tones, whereas the SSS may be mapped to tones that are spaced apart (e.g. tones equally spaced apart) from each other in a second subset of tones. Thus, for example, in the second subset of tones, the tones mapped with the SSS are present in every N tones, where N is an integer number.

Figure 8:
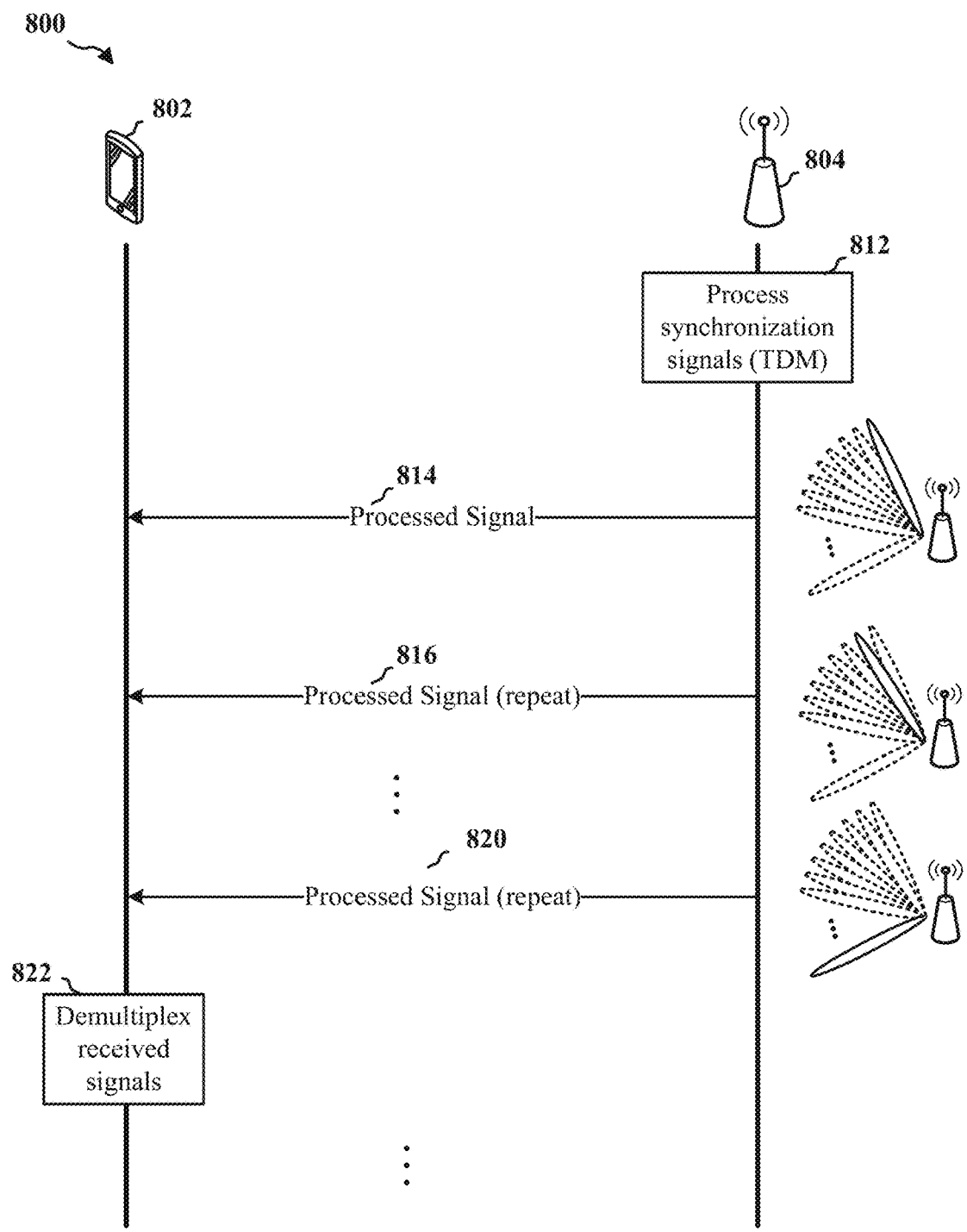
FIG. 8 is an example diagram illustrating communication between a user equipment and a base station, according to an aspect of the disclosure.

FIG. 8 is an example diagram 800 illustrating communication between a user equipment and a base station, according to an aspect of the disclosure. The example diagram 800 involves communication between a UE 802 and a base station 804. In the example diagram 800, the base station 804 has fourteen antenna ports capable of beam-forming in fourteen directions. At 812, the base station 804 processes a group of synchronization signals, which includes time-division multiplexing at least some (e.g., two or more) of the synchronization signals. The base station 804 then transmits the group of the processed synchronization signals and repeats the transmission of the group of the processed synchronization signals in different beam directions via beam-forming, within a synchronization subframe. In particular, at 814, the base station 804 transmits the group of the processed synchronization signals via beam-forming in a first direction. At 816, the base station 804 repeats the transmission of the group of the processed synchronization signals via beam-forming in a second direction. The base station 804 may repeat the transmission of the group of the processed synchronization signals to transmit the processed synchronization signals in each of fourteen different directions via beam-forming. The base station may repeat the transmission of the group of the processed synchronization signals within a synchronization subframe. At 820, the base station 804 repeats the transmission of the group of the processed synchronization signals via beam-forming in the fourteenth direction. For example, the UE 802 may receive a beam transmitted in a direction close to a direction of the UE 802 for optimal reception of the synchronization signals. At 822, the UE 802 demultiplexes the group of the processed synchronization signal to obtain the synchronization signal.

In an aspect, after 820, in a subsequent synchronization subframe, the base station 804 may process a second group of synchronization signals and transmit the second group of processed synchronization signals to the UE. The second group of synchronization signals may be different from the group of synchronization signals processed at 812. The base station 804 may transmit the second group of the processed synchronization signals and repeat the transmission of the second group of the processed synchronization signals in different directions of beams via beam-forming, within the subsequent synchronization subframe.

Figure 9:
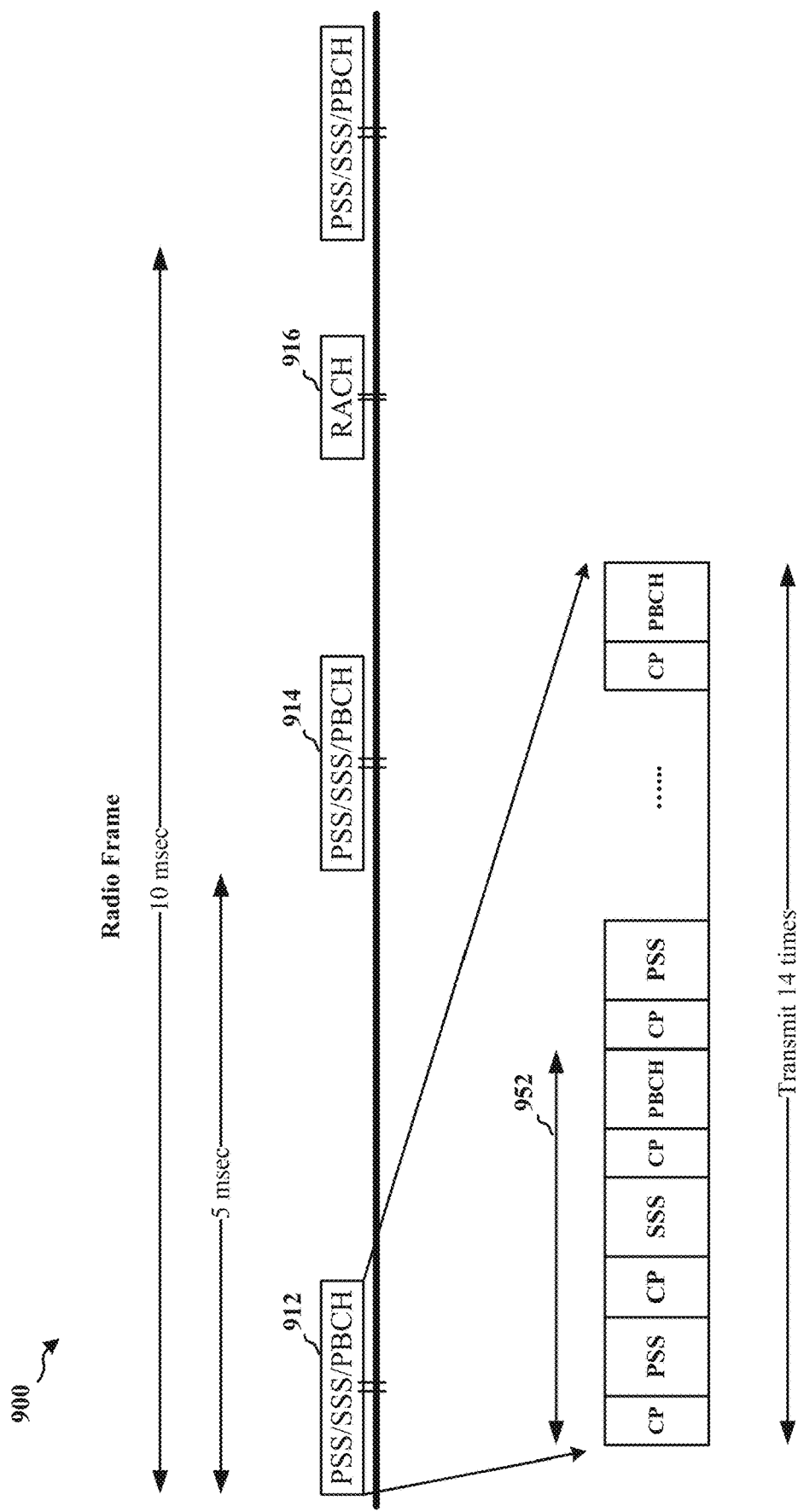
FIG. 9 is an example diagram illustrating transmission of synchronization signals, according to an aspect of the disclosure.

FIG. 9 is an example diagram 900 illustrating transmission of synchronization signals, according to an aspect of the disclosure. The base station may transmit synchronization signals such as a PSS, an SSS, and a PBCH signal twice within one radio frame. In this example, because the radio frame is 10 milliseconds long, the base station may transmit synchronization signals every 5 milliseconds. In particular, the base station may use a first synchronization channel 912 first within a radio frame to transmit the synchronization signals, and then use a second synchronization channel 914 to transmit the synchronization signals later in the radio frame. The RACH 916 may occur after the second synchronization channel 914. In this example, the base station processes the synchronization signals such that there is cyclic prefix between the synchronization signals in the processed synchronization signal 952. As discussed above, the synchronization signals may be processed by time-division multiplexing the PSS, the SSS, and the PBCH, which results the processed synchronization signal 952. In this case, because there are fourteen symbols, transmission of the processed synchronization signal 952 (e.g., per symbol) may be performed fourteen times in fourteen directions via beam forming in a sweeping manner (e.g., sweeping the beam in fourteen directions to cover the entire sector). The tone spacing for each of the synchronization signals in the processed synchronization signal 952 may be 120 kHz. The PBCH signal may be frequency-division multiplexed with a BRS and/or an ESS.

Figure 10:
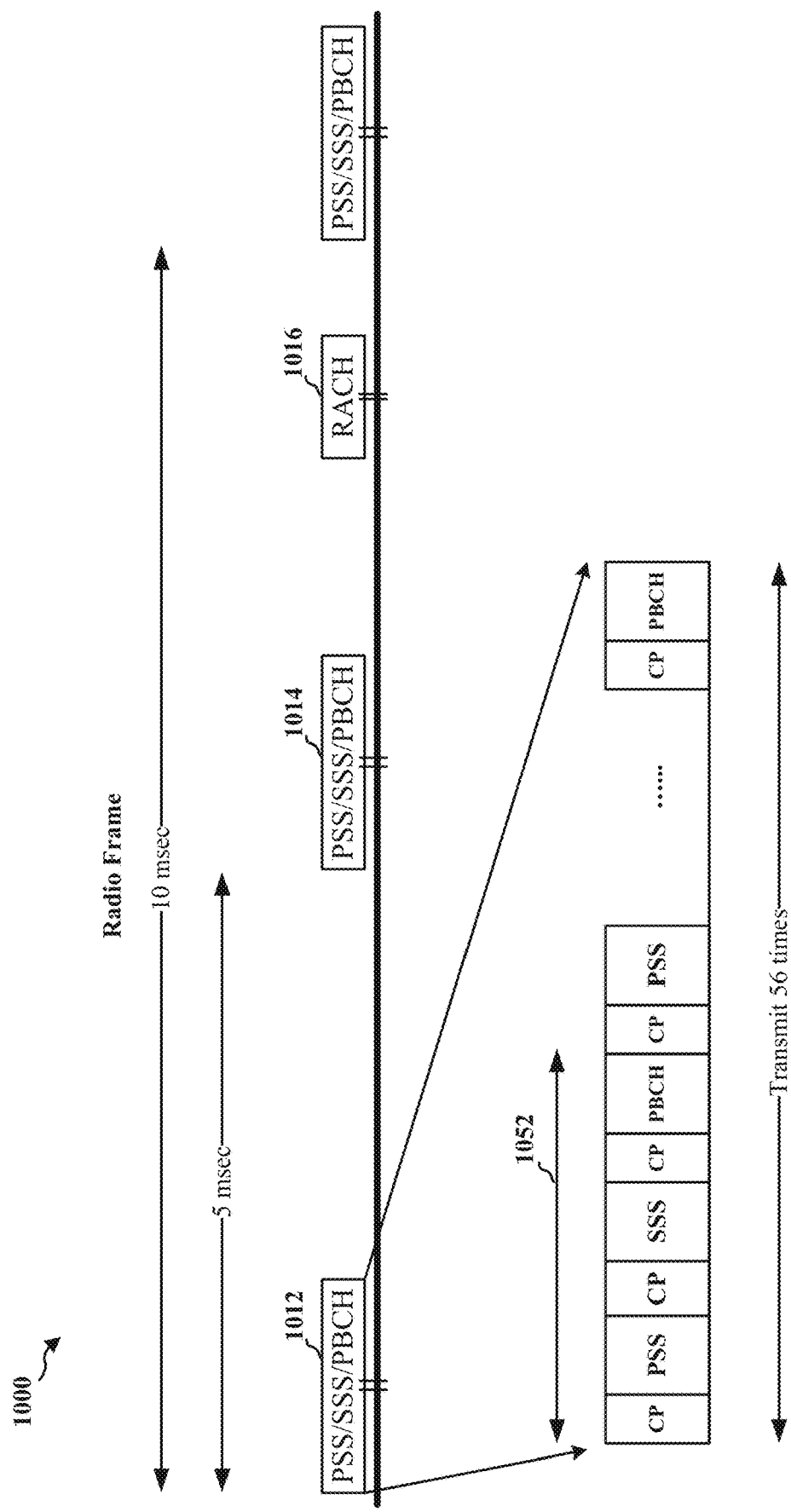
FIG. 10 is an example diagram illustrating transmission of synchronization signals, according to an aspect of the disclosure.

FIG. 10 is an example diagram 1000 illustrating transmission of synchronization signals, according to an aspect of the disclosure. The base station may transmit synchronization signals such as a PSS, an SSS, and a PBCH signal twice within one radio frame. In this example, because the radio frame is 10 milliseconds long, the base station may transmit synchronization signals every 5 milliseconds. In particular, the base station may use a first synchronization channel 1012 first within a radio frame to transmit the synchronization signals, and then use a second synchronization channel 1014 to transmit the synchronization signals later in the radio frame. The RACH 1016 may occur after the second synchronization channel 1014. In this example, the base station processes the synchronization signals such that there is cyclic prefix between the synchronization signals in the processed synchronization signal 1052. As discussed above, the synchronization signals may be processed by time-division multiplexing the PSS, the SSS, and the PBCH, which results the processed synchronization signal 1052. In this case, because there are fourteen symbols, transmission of the processed synchronization signal 1052 (e.g., per symbol) may be performed fourteen times in fourteen directions via beam forming in a sweeping manner (e.g., to cover the entire sector). For each beam-forming direction, the base station may transmit the processed synchronization signal 1052 four times. Thus, when transmitting the processed synchronization signal 1052 in fourteen directions, the base station transmits the processed synchronization signal 1052 fifty-six times (14×4=56) in total. For each beam-forming direction, because the base station transmits the processed synchronization signal 1052 four times, the UE may receive the processed synchronization signal 1052 in different antenna subarrays (e.g., 4 subarrays) of the UE, and may determine an antenna subarray that provides an optimal result (e.g., best signal-to-noise ratio of the received synchronization signal). Each antenna subarray of the UE may correspond to a specific direction. The tone spacing for each of the synchronization signals in the processed synchronization signal 1052 may be 120 kHz. The received PBCH signal may be frequency-division multiplexed with a BRS and/or an ESS.

In one aspect, the base station may transmit the processed synchronization signal 1052 four consecutive times in each of the fourteen directions. For example, in this aspect, the base station may transmit in direction 1, direction 1, direction 1, direction 1, direction 2, direction 2, direction 2, direction, 2, . . . direction 14, direction 14, direction 14, direction 14. In another aspect, the base station may transmit the processed synchronization signal 1052 in each of the fourteen directions in a sweeping manner four times. For example, in this aspect, the base station may transmit in direction 1, 2, . . . , 14, in direction 1, 2, . . . , 14, in direction 1, 2, . . . , 14, and in direction 1, 2, . . . , 14.

Figure 11:
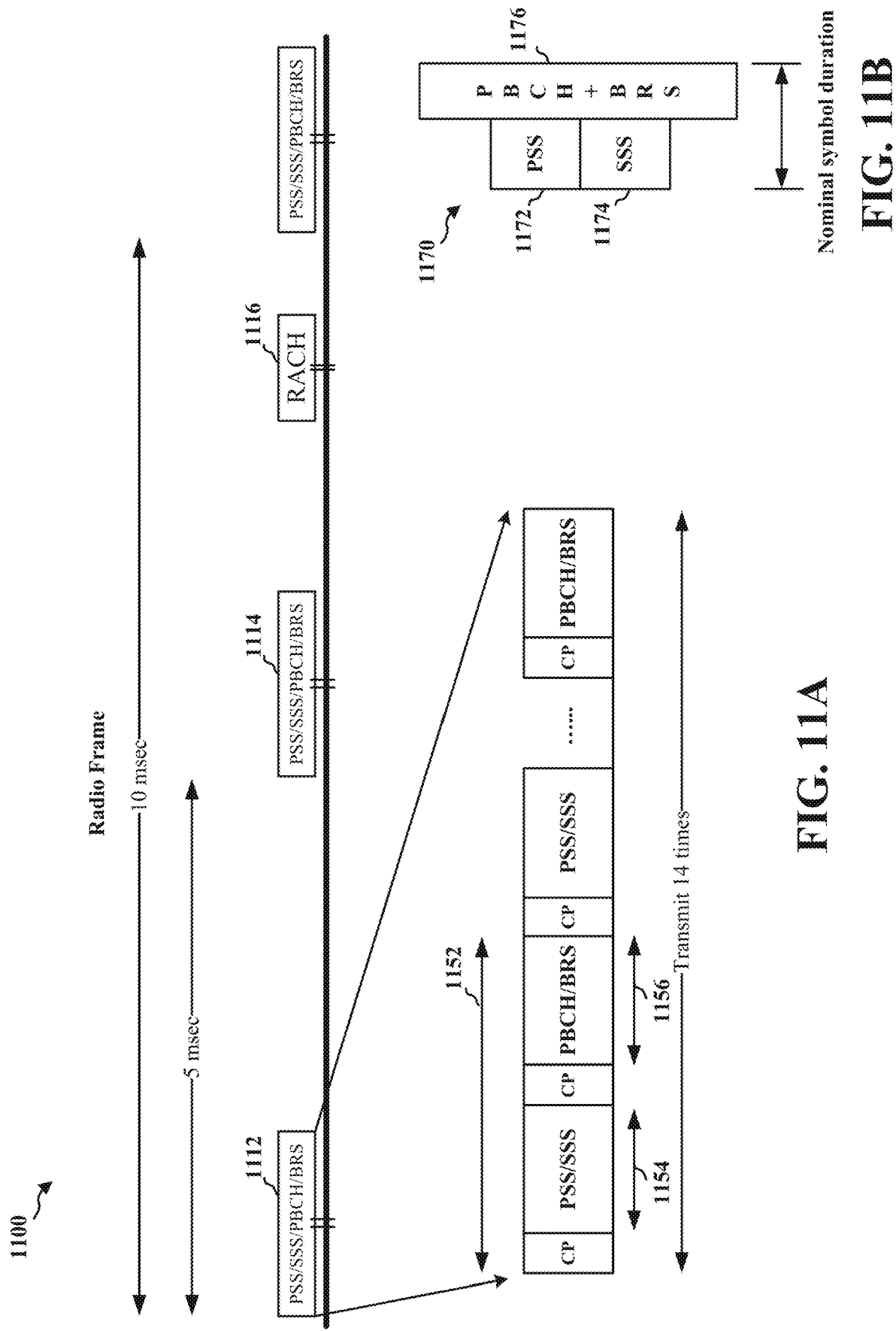
FIGS. 11A and 11B are example diagrams illustrating transmission of synchronization signals, according to an aspect of the disclosure.

FIGS. 11A and 11B are example diagrams 1100 and 1170 illustrating transmission of synchronization signals, according to an aspect of the disclosure. FIG. 11A is an example diagram 1100 illustrating transmission of synchronization signals in a radio frame, according to an aspect of the disclosure. The base station may transmit synchronization signals such as a PSS, an SSS, and a PBCH signal twice within one radio frame. As shown in FIG. 11A, because the radio frame is 10 milliseconds long, the base station may transmit synchronization signals every 5 milliseconds. In particular, the base station may use a first synchronization channel 1112 first within a radio frame to transmit the synchronization signals, and then use a second synchronization channel 1114 to transmit the synchronization signals again later in the radio frame. The RACH 1116 may occur after the second synchronization channel 1114.

In the example shown in FIGS. 11A and 11B, the base station processes the synchronization signals to insert a cyclic prefix between the synchronization signals in the processed synchronization signal 1152. Because there are fourteen symbols, transmission of the processed synchronization signal 1152 (e.g., per symbol) may be performed fourteen times via beam-forming in fourteen directions in a sweeping manner (e.g., to cover the entire sector). The processed synchronization signal 1152 corresponds to the time-division multiplexed synchronization signals 1170 illustrated in FIG. 11B. In particular, when the base station determines to transmit synchronization signals, the base station performs time-division multiplexing of the synchronization signals to generate the time-division multiplexed synchronization signals 1170, and then transmits time-division multiplexed synchronization signals 1170 as the processed synchronization signal 1152 in one symbol. As illustrated in FIG. 11B, to generate the time-division multiplexed synchronization signals 1170, the synchronization signals are processed by time-division multiplexing a PBCH/BRS 1176 and a frequency-division multiplex of a PSS 1172 and an SSS 1174. As illustrated in FIG. 11B, within one symbol (e.g., within one SS block), the PSS 1172 and the SSS 1174 may be transmitted during the same time period and in different resource blocks, and the PBCH/BRS 1176 may be subsequently transmitted in the same time period and in the same resource blocks. The PBCH/BRS (block) 1176 may be generated by frequency-division multiplexing the PBCH and BRS signals. The BRS signals may be used as beam reference signals for the UEs. The BRS signals may also be used as reference signals for PBCH tones. The PBCH tones may also have their own demodulation reference signals. Thus, during the transmission of the processed synchronization signal 1152 in one symbol, the base station transmits the PSS and SSS during a first time period 1154 and transmits the PBCH and the BRS during a second time period 1156, with a cyclic prefix before the beginning of each of the first and the second time periods 1154 and 1156. The tone spacing for each of the synchronization signals in the processed synchronization signal 1152 may be 240 kHz. The PBCH signal may be frequency-division multiplexed with a BRS and/or an ESS.

Figure 12:
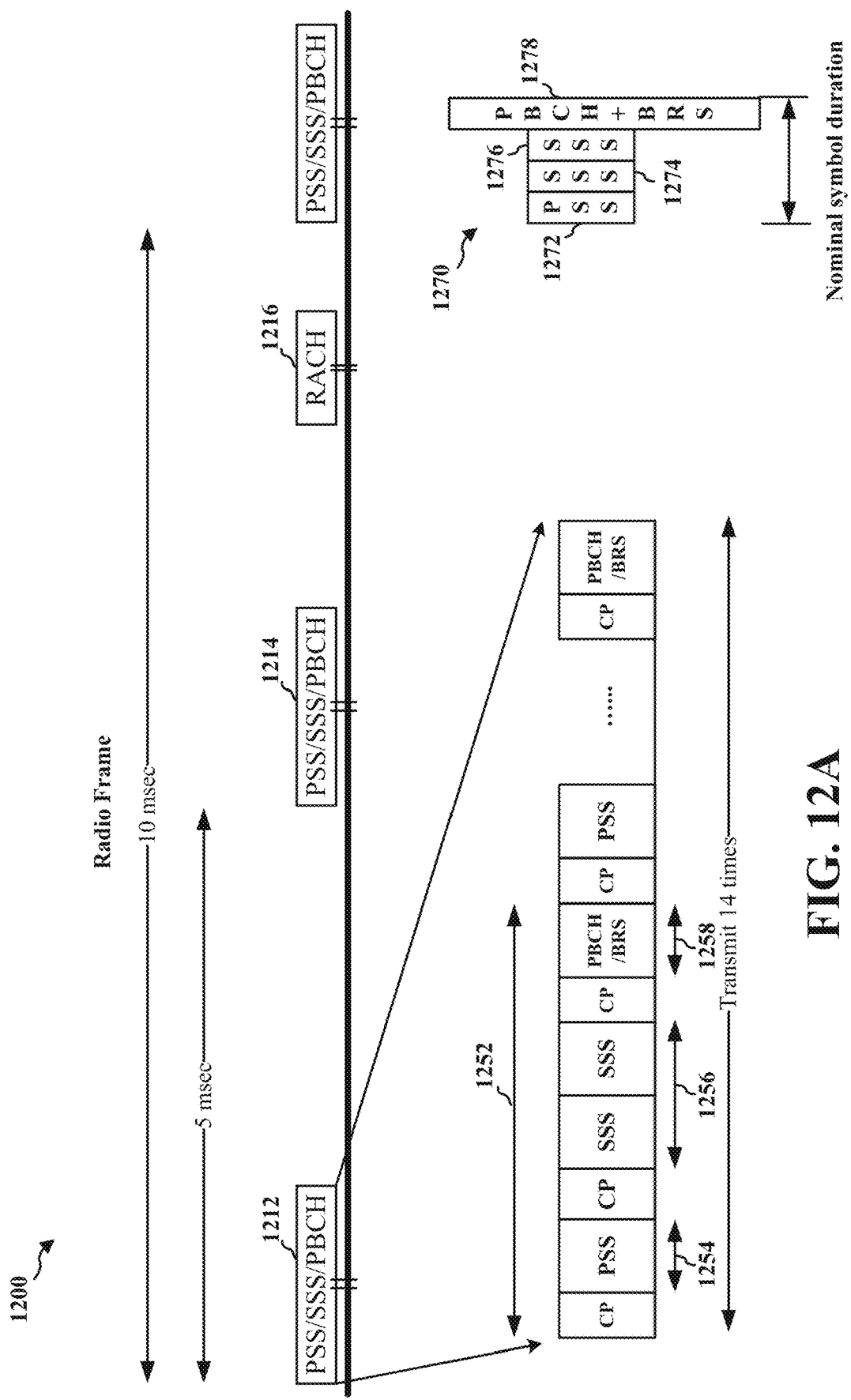
FIGS. 12A and 12B are example diagrams illustrating transmission of synchronization signals, according to an aspect of the disclosure.

FIGS. 12A and 12B are example diagrams 1200 illustrating transmission of synchronization signals, according to an aspect of the disclosure. FIG. 12A is an example diagram 1200 illustrating transmission of synchronization signals in a radio frame, according to an aspect of the disclosure. The base station may transmit one or more synchronization signals such as a PSS, an SSS, and a PBCH signal twice within one radio frame. In this example, because the radio frame is 10 milliseconds long, the base station may transmit synchronization signals every 5 milliseconds. In particular, the base station may use a first synchronization channel 1212 first within a radio frame to transmit the synchronization signals, and then use a second synchronization channel 1214 to repeat transmission of the synchronization signals at a later time in the subframe. The RACH 1216 may occur after the second synchronization channel 1214. In this example, the base station processes the synchronization signals such that a cyclic prefix is present between different synchronization signals in the processed synchronization signal 1252.

In this aspect of the disclosure, the base station may process the synchronization signals such that one or more synchronization signals may be repeated in the processed synchronization signal 1252. In this example, the SSS is repeated in the processed synchronization signal 1252. As discussed above, the synchronization signals may be processed by time-division multiplexing the PSS, the SSS, and the PBCH/BRS. In this case, because there are fourteen symbols, transmission of the processed synchronization signal 1252 (e.g., per symbol) may be performed fourteen times via beam-forming in fourteen directions in a sweeping manner (e.g., to cover the entire sector). The processed synchronization signal 1252 corresponds to the time-division multiplexed synchronization signals 1270 illustrated in FIG. 12B. In particular, when the base station determines to transmit synchronization signals, the base station performs time-division multiplexing of the synchronization signals to generate the time-division multiplexed synchronization signals 1270, and then transmits time-division multiplexed synchronization signals 1270 as the processed synchronization signal 1252 in one symbol. As illustrated in FIG. 12B, the synchronization signals may be processed by time-division multiplexing a PSS 1272, an SSS 1274, a repetition of the SSS 1276, and a PBCH/BRS 1278. In an aspect, a PBCH/BRS block may be generated by frequency-division multiplexing the PBCH signal and the BRS signal. As further illustrated in FIG. 12B, within one symbol (e.g., within one SS block), the PSS 1272, the SSS 1274, the repetition of the SSS 1276, and the PBCH/BRS 1278 may be transmitted in different time periods. Thus, as illustrated in FIG. 12A, during the transmission of the processed synchronization signal 1252 in one symbol, the base station may transmit the PSS during a first time period 1254, the SSS and a repetition of the SSS during a the second time period 1256, and the PBCH/BRS during a third time period 1258, with a cyclic prefix before the beginning of each of the first, second, and third time periods 1254, 1256, and 1258. The tone spacing for each of the synchronization signals in the processed synchronization signal 1252 may be 120 kHz. The PBCH signal may be frequency-division multiplexed with a BRS and/or an ESS.

Figure 13:
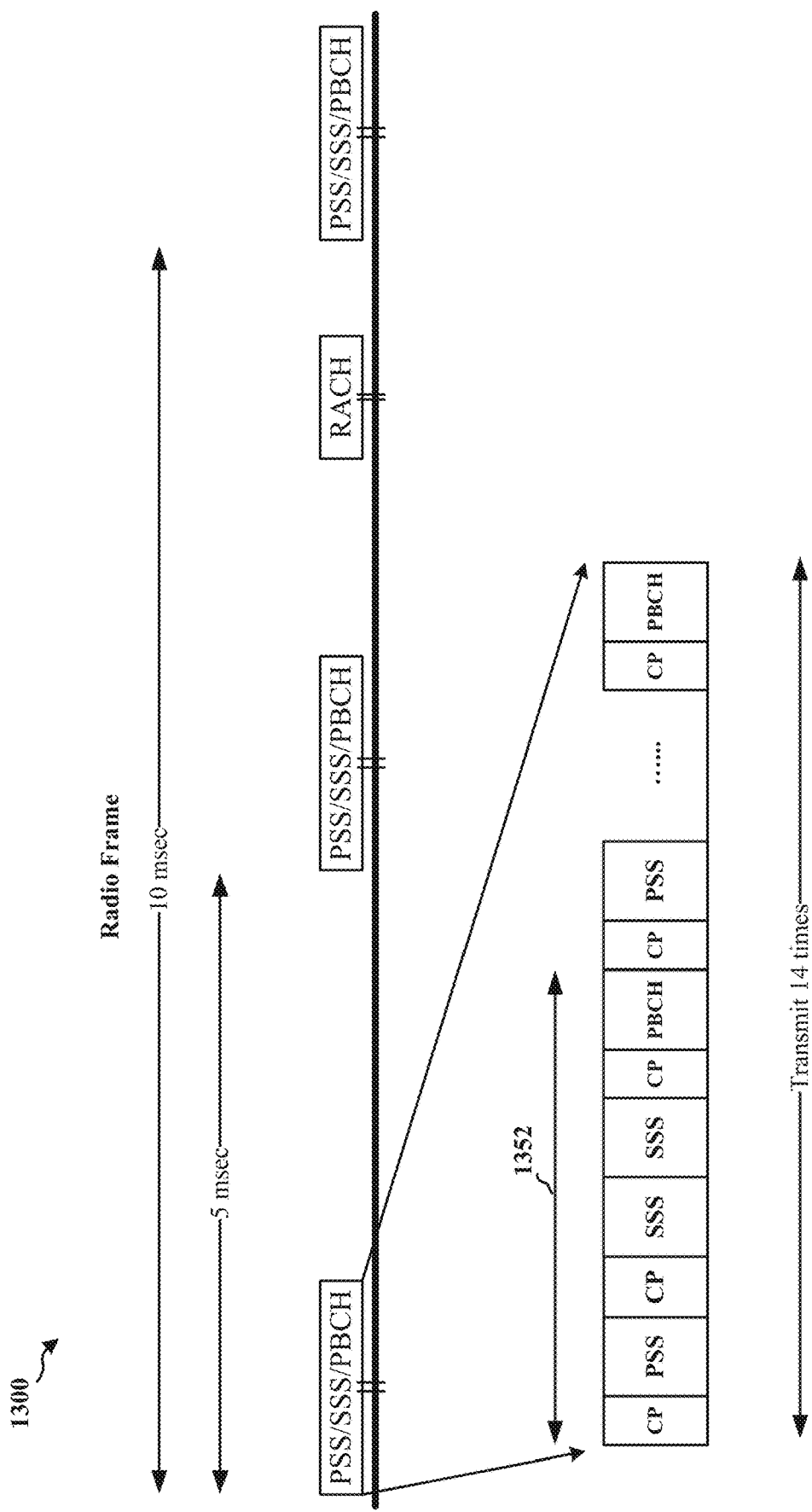
FIG. 13 is an example diagram illustrating transmission of synchronization signals, according to an aspect of the disclosure.

FIG. 13 is an example diagram 1300 illustrating transmission of synchronization signals, according to an aspect of the disclosure. The base station may transmit synchronization signals such as a PSS, an SSS, and a PBCH signal twice within one radio frame. In this example, because the radio frame is 10 milliseconds long, the base station may transmit synchronization signals every 5 milliseconds. FIG. 13 illustrates the same diagram as the example diagram 1200 of FIG. 12, and thus explanations of the processed synchronization signal 1352 is partially omitted for brevity. A tone spacing is inversely proportional to a symbol duration. The tone spacing for one synchronization signal may be different from the tone spacing for another synchronization signal. For example, in the processed synchronization signal 1352, the PSS has a tone spacing of 480 kHz and the duration of 2.083 microseconds, and the PBCH signal has a tone spacing of 480 kHz and the duration of 2.083 microseconds. In the processed synchronization signal 1352, for the SSS, the tone spacing is 240 kHz, and the duration is 4.167 microseconds. The SSS occupies one of every two tones, and the length of the SSS may be 63 sequences. A CP duration of the PSS and the PBCH is 148.81 ns, and a CP duration of the SSS is 297.62 ns. There may be 14 symbols in each subframe with 120 kHz tone spacing.

Figure 14:
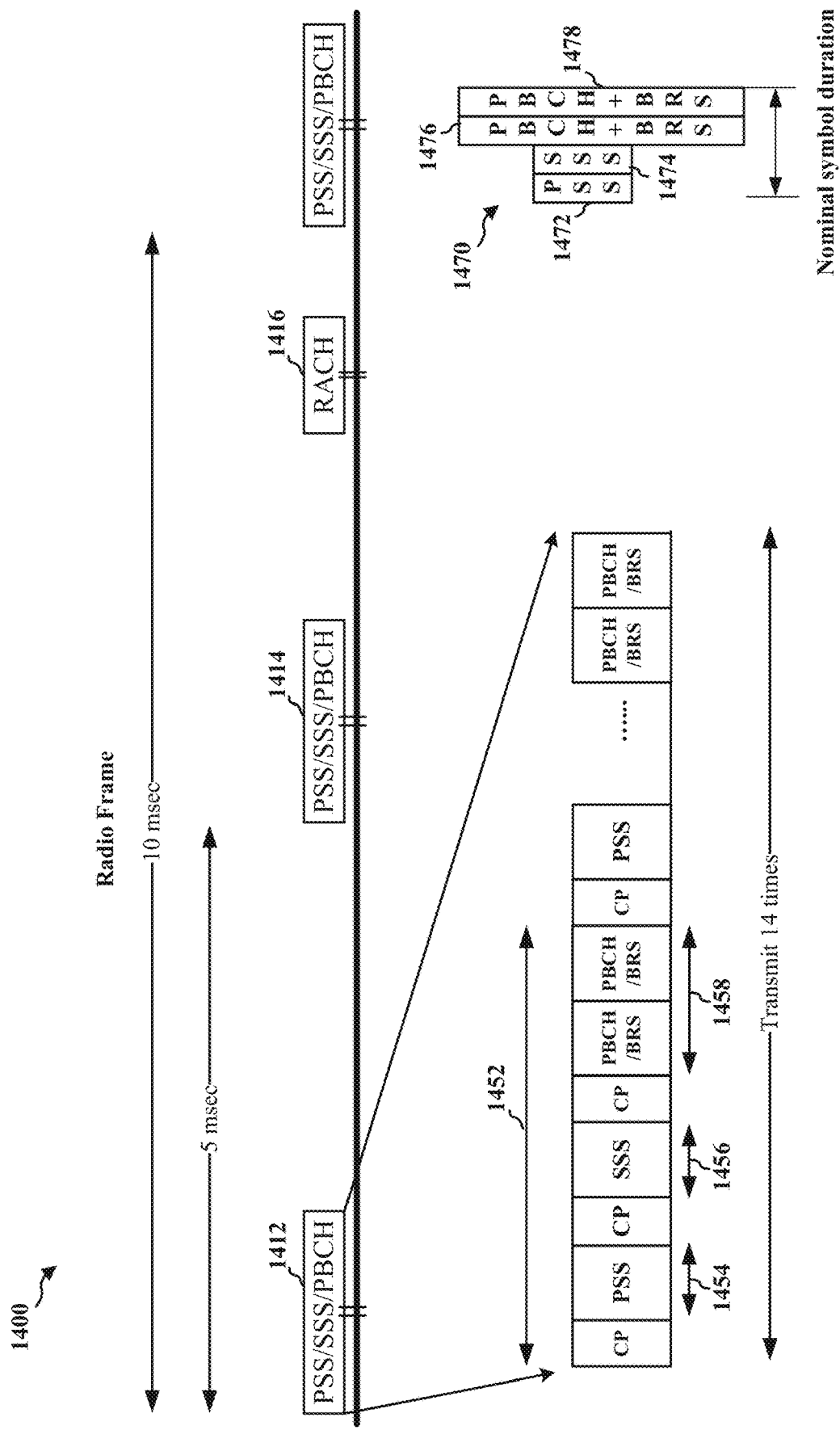
FIGS. 14A and 14B are example diagrams illustrating transmission of synchronization signals, according to an aspect of the disclosure.

FIGS. 14A and 14B are example diagrams 1400 illustrating transmission of synchronization signals, according to an aspect of the disclosure. FIG. 14A is an example diagram 1400 illustrating transmission of synchronization signals over a radio frame, according to an aspect of the disclosure. The base station may transmit synchronization signals such as a PSS, an SSS, and a PBCH signal twice within one radio frame. In this example, because the radio frame is 10 milliseconds long, the base station may transmit synchronization signals every 5 milliseconds. In particular, the base station may use a first synchronization channel 1412 first within a radio frame to transmit the synchronization signals, and then use a second synchronization channel 1414 to transmit the synchronization signals again at a later time in the radio frame. The RACH 1416 may occur after the second synchronization channel 1414. The base station may process the synchronization signals such that a cyclic prefix is present between different synchronization signals in the processed synchronization signal 1452.

In this aspect of the disclosure, the base station may process the synchronization signals such that one or more synchronization signals may be repeated in the processed synchronization signal 1452. The PBCH/BRS may be repeated in the processed synchronization signal 1452. As discussed above, the synchronization signals may be processed by time-division multiplexing the PSS, the SSS, and the PBCH/BRS. In this case, because there are fourteen symbols, transmission of the processed synchronization signal 1452 (e.g., per symbol) may be performed fourteen times via beam-forming in fourteen directions in a sweeping manner (e.g., to cover the entire sector). Thus, the transmission of the processed synchronization signal 1452 may be performed fourteen times within the first synchronization channel 1412. The processed synchronization signal 1452 having cyclic prefixes corresponds to the time-division multiplexed synchronization signals 1470 illustrated in FIG. 14B. In particular, when the base station determines to transmit synchronization signals, the base station may perform time-division multiplexing of the synchronization signals to generate the time-division multiplexed synchronization signals 1470, and then transmit time-division multiplexed synchronization signals 1470 as the processed synchronization signal 1452 with cyclic prefixes in one symbol. In this example, as illustrated in FIG. 14B, the synchronization signals may be processed by time-division multiplexing a PSS 1472, an SSS 1474, a PBCH/BRS 1476, and a repetition of PBCH/BRS 1478. In an aspect, a PBCH/BRS block may be generated from frequency-division multiplexing of PBCH and BRS signals. As illustrated in FIG. 14B, within one symbol (e.g., within one SS block), the PSS 1472, the SSS 1474, the PBCH/BRS 1476, and a repetition of PBCH/BRS 1478 may be transmitted in different time periods. Thus, as illustrated in FIG. 14A, during the transmission of the processed synchronization signal 1452 in one symbol, the base station may transmit the PSS during a first time period 1454, the SSS during a the second time period 1456, and the PBCH/BRS and the repetition of the PBCH/BRS during a third time period 1458, with a cyclic prefix before the beginning of each of the first, second, and third time periods 1454, 1456, and 1458. The tone spacing for each of the synchronization signals in the processed synchronization signal 1452 may be 120 kHz. The PBCH signal may be frequency-division multiplexed with a BRS and/or an ESS.

Figure 15:
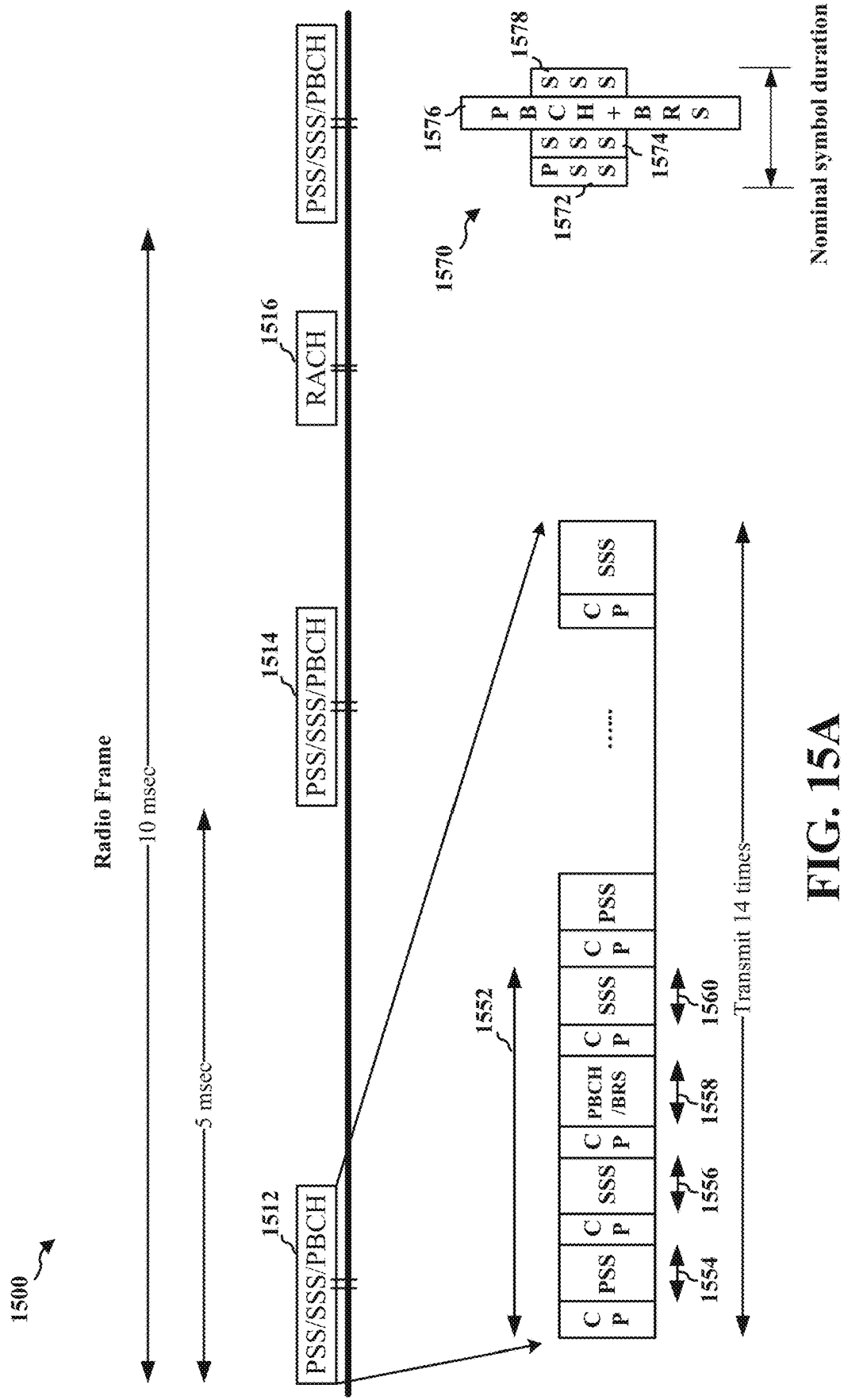
FIGS. 15A and 15B are example diagrams illustrating transmission of synchronization signals, according to an aspect of the disclosure.

FIGS. 15A and 15B are example diagrams 1500 illustrating transmission of synchronization signals, according to an aspect of the disclosure. FIG. 15A is an example diagram 1500 illustrating transmission of synchronization signals over a radio frame, according to an aspect of the disclosure. The base station may transmit synchronization signals such as a PSS, an SSS, and a PBCH signal twice within one radio frame. In this example, because the radio frame is 10 milliseconds long, the base station may transmit synchronization signals every 5 milliseconds. In particular, the base station may use a first synchronization channel 1512 first within a radio frame to transmit the synchronization signals, and then use a second synchronization channel 1514 to transmit the synchronization signals at a later time in the radio frame. The RACH 1516 may occur after the second synchronization channel 1514. The base station may process the synchronization signals such that a cyclic prefix is present between different synchronization signals in the processed synchronization signal 1552.

In this aspect of the disclosure, the base station may process the synchronization signals such that one or more synchronization signals may be repeated in the processed synchronization signal 1552, where a synchronization signal and a repetition of the synchronization signal are spaced apart in time during time-division multiplexing. In this example, the SSS may be repeated in the processed synchronization signal 1552. As discussed above, the synchronization signals may be processed by time-division multiplexing the PSS, the SSS, and the PBCH/BRS. In this case, because there are fourteen symbols, transmission of the processed synchronization signal 1552 (e.g., per symbol) may be performed fourteen times via beam-forming in fourteen directions in a sweeping manner (e.g., to cover the entire sector). The processed synchronization signal 1552 having cyclic prefixes may correspond to the time-division multiplexed synchronization signals 1570 illustrated in FIG. 15B. In particular, when the base station determines to transmit synchronization signals, the base station may perform time-division multiplexing of the synchronization signals to generate the time-division multiplexed synchronization signals 1570, and then transmit time-division multiplexed synchronization signals 1570 as the processed synchronization signal 1552 with cyclic prefixes in one symbol. As illustrated in FIG. 15B, the synchronization signals may be processed by time-division multiplexing a PSS 1572, an SSS 1574, a PBCH/BRS 1576, and a repetition of the SSS 1578, where the SSS 1574 and the repetition of the SSS 1578 are spaced apart from each other in time with the PBCH/BRS 1576 between the SSS 1574 and the repetition of the SSS 1578. In an aspect, a PBCH/BRS block may be generated by frequency-division multiplexing the PBCH signal and the BRS signal. As illustrated in FIG. 15B, within one symbol (e.g., within one SS block), the PSS 1572, the SSS 1574, the PBCH/BRS 1576, and a repetition of the SSS 1578 may be transmitted in different time periods. Thus, as illustrated in FIG. 15A, during the transmission of the processed synchronization signal 1552 in one symbol, the base station may transmit the PSS during a first time period 1554, the SSS during a the second time period 1556, and the PBCH/BRS in a third time period 1558, and the repetition of the SSS during a fourth time period 1560, with a cyclic prefix before the beginning of each of the first, second, third, and fourth time periods 1554, 1556, 1558, and 1560. The tone spacing for each of the synchronization signals in the processed synchronization signal 1552 may be 120 kHz. The PBCH signal may be frequency-division multiplexed with a BRS and/or an ESS.

FIGS. 16A and 16B are example diagrams 1600 illustrating transmission of synchronization signals, according to an aspect of the disclosure. FIG. 16A is an example diagram 1600 illustrating transmission of synchronization signals over a radio frame, according to an aspect of the disclosure. The base station may transmit synchronization signals such as a PSS, an SSS, and a PBCH signal twice within one radio frame. In this example, because the radio frame is 10 milliseconds long, the base station may transmit synchronization signals every 5 milliseconds. In particular, the base station may use a first synchronization channel 1612 first within a radio frame to transmit the synchronization signals, and then use a second synchronization channel 1614 to transmit the synchronization signals at a later time in the radio frame. The RACH 1616 may occur after the second synchronization channel 1614. The base station may process the synchronization signals such that a cyclic prefix is present between different synchronization signals in the processed synchronization signal 1652.

In this aspect of the disclosure, the base station may process the synchronization signals such that one or more synchronization signals may be repeated in the processed synchronization signal 1652, where a synchronization signal and a repetition of the synchronization signal are spaced apart in time during time-division multiplexing. The PBCH/BRS may be repeated in the processed synchronization signal 1652. As discussed above, the synchronization signals may be processed by time-division multiplexing the PSS, the SSS, and the PBCH/BRS. In this case, because there are fourteen symbols, transmission of the processed synchronization signal 1652 (e.g., per symbol) may be performed fourteen times via beam-forming in fourteen directions in a sweeping manner (e.g., to cover the entire sector). The processed synchronization signal 1652 having cyclic prefixes may correspond to the time-division multiplexed synchronization signals 1670 illustrated in FIG. 16B. In particular, when the base station determines to transmit synchronization signals, the base station may perform time-division multiplexing of the synchronization signals to generate the time-division multiplexed synchronization signals 1670, and then transmit time-division multiplexed synchronization signals 1670 as the processed synchronization signal 1652 with cyclic prefixes in one symbol. In an aspect, a PBCH/BRS block may be generated from frequency-division multiplexing of PBCH and BRS signals. As illustrated in FIG. 16B, the synchronization signals may be processed by time-division multiplexing a PBCH/BRS 1672, a PSS 1674, an SSS 1676, and a repetition of the PBCH/BRS 1678, where the PBCH/BRS 1672 and the repetition of the PBCH/BRS 1678 are spaced apart from each other in time with the PSS 1674 and the SSS 1676 between the PBCH/BRS 1672 and the repetition of the PBCH/BRS 1678. As illustrated in FIG. 16B, within one symbol (e.g., within one SS block), the PBCH/BRS 1672, the PSS 1674, the SSS 1676, and the repetition of the PBCH/BRS 1678 may be transmitted in different time periods. Thus, as illustrated in FIG. 16A, during the transmission of the processed synchronization signal 1652 in one symbol, the base station may transmit the PBCH/BRS during a first time period 1654, the PSS during a the second time period 1656, and the SSS in a third time period 1658, and the repetition of the PBCH/BRS during a fourth time period 1660, with a cyclic prefix before the beginning of each of the first, second, third, and fourth time periods 1654, 1656, 1658, and 1660. The tone spacing for each of the synchronization signals in the processed synchronization signal 1652 may be 120 kHz. The PBCH signal may be frequency-division multiplexed with a BRS and/or an ESS.

FIGS. 17A and 17B are example diagrams 1700 illustrating transmission of synchronization signals, according to an aspect of the disclosure. FIG. 17A is an example diagram 1700 illustrating transmission of synchronization signals over a radio frame, according to an aspect of the disclosure. The base station may transmit synchronization signals such as a PSS, an SSS, and a PBCH signal in two sessions (e.g., a first session using a first synchronization channel 1712 and a second session using second synchronization channel 1714) within one radio frame. In this example, because the radio frame is 10 milliseconds long, the base station may transmit synchronization signals every 5 milliseconds. In particular, the base station may use a first synchronization channel 1712 first within a radio frame to transmit the synchronization signals (e.g., during a first synchronization subframe), and then use a second synchronization channel 1714 to transmit the synchronization signals later (e.g., during a second synchronization subframe). The RACH

1716 may occur after the second synchronization channel 1714. In this example, the base station may process the synchronization signals such that a cyclic prefix is present between different synchronization signals in the processed synchronization signal 1732.

In this aspect of the disclosure, the base station may process the synchronization signals such that a PBCH signal may be repeated in the processed synchronization signal 1732. In an aspect, a PBCH signal and a repeated PBCH signal may be spaced apart in time during time-division multiplexing (e.g., for estimation of a carrier frequency offset, as discussed infra). The PBCH signal may be repeated in the processed synchronization signal 1732. As discussed above, the synchronization signals may be processed by time-division multiplexing the PSS, the SSS, and the PBCH. In this case, because there are fourteen symbols, transmission of the processed synchronization signal 1732 (e.g., per symbol) may be performed fourteen times via beam-forming in fourteen directions in a sweeping manner (e.g., to cover the entire sector). The processed synchronization signal 1732 having cyclic prefixes may correspond to the time-division multiplexed synchronization signals 1770 illustrated in FIG. 17B. In particular, when the base station determines to transmit synchronization signals, the base station may perform time-division multiplexing of the synchronization signals to generate the time-division multiplexed synchronization signals 1770, and then transmit time-division multiplexed synchronization signals 1770 as the processed synchronization signal 1732 with cyclic prefixes in one nominal symbol (e.g., 17.89 microseconds).

As illustrated in FIG. 17B, the synchronization signals may be processed by time-division multiplexing a PBCH 1772, a PSS 1774, an SSS 1776, and a repetition of the PBCH 1778, where the PBCH 1772 and the repetition of the PBCH 1778 may be spaced apart from each other in time with the PSS 1774 and the SSS 1776 between the PBCH 1772 and the repetition of the PBCH 1778 (e.g., for estimation of a carrier frequency offset, as discussed infra). The PBCH 1772 and the repetition of the PBCH 1778 may be identical in that the signal transmitted for the repetition of the PBCH 1778 and the antenna port and a beam for the transmission of the repetition of the PBCH 1778 are identical to those for the transmission of the PBCH 1778. Although the order of the PSS 1774 and the SSS 1776 in the time-division multiplexed synchronization signals 1770 shows that the PSS 1774 before the SSS 1767, the order may be reversed in another example. As illustrated in FIG. 17B, the bandwidths of the PBCH 1772, the PSS 1774, the SSS 1776, and the repetition of the PBCH 1778 may be the same. For example, the bandwidth may be 36 MHz (150 REs with 24 kHz tone spacing). However, in another example, a bandwidth of a PSS may be smaller than a bandwidth of an SSS and/or a bandwidth of a PBCH/repeated PBCH.

As illustrated in FIG. 17B, within one nominal symbol, the PBCH 1772, the PSS 1774, the SSS 1776, and the repetition of the PBCH 1778 may be transmitted in different time periods. Thus, as illustrated in FIG. 17A, during the transmission of the processed synchronization signal 1732 in one symbol, the base station may transmit the PBCH during a first time period 1734, the PSS during a the second time period 1736, and the SSS in a third time period 1738, and the repetition of the PBCH during a fourth time period 1740, with a cyclic prefix before the beginning of each of the first, second, third, and fourth time periods 1734, 1736, 1738, and 1740. Each of the first, second, third, and fourth time periods 1734, 1736, 1738, and 1740 may correspond to an OFDM symbol. The tone spacing for each of the synchronization signals in the processed synchronization signal 1732 may be 120 kHz. For example, each OFDM symbol may have 4× the nominal subcarrier spacing, thus may have ¼ of the length in time of the nominal symbol. Thus, the nominal symbol duration may be divided into the four OFDM symbols, where the four OFDM symbols respectively correspond to the transmission times for PBCH 1772, the PSS 1774, the SSS 1776, and the repetition of the PBCH 1778.

FIGS. 18A and 18B are example diagrams 1800 illustrating transmission of synchronization signals, according to an aspect of the disclosure. FIG. 18A is an example diagram 1800 illustrating transmission of synchronization signals over a radio frame, according to an aspect of the disclosure. The base station may transmit a first group of synchronization signals including a PSS, an SSS, and a PBCH signal in one session (e.g., using a first synchronization channel 1812) and may transmit a second group of synchronization signals including a PSS, an SSS, and a BRS signal in a subsequent session (e.g., using a second synchronization channel 1814), within one radio frame. In particular, during the first synchronization subframe, the base station may transmit the first group of processed synchronization signals multiple times (e.g., 14 times) using multiple beams in different directions. During the second synchronization subframe, the base station may transmit the second group of processed synchronization signals multiple times (e.g., 14 times) using the multiple beams in different directions. Thus, for example, if the base station transmits the first group of processed synchronization signals 14 times, then 14 transmit beams in 14 directions are used for such a transmission, and if the base station transmits the second group of processed synchronization signals 14 times, the same 14 transmit beams in the same 14 directions may be used for such a transmission. That is, in this example, the 1st through 14th beams used for the first synchronization subframe may respectively correspond with the 1st through 14th beams for the second synchronization subframe.

In the example diagram 1800 of FIG. 18A, because the radio frame is 10 milliseconds long, the base station may transmit synchronization signals every 5 milliseconds. In particular, the base station may use a first synchronization channel 1812 first within a radio frame to transmit the first group of the synchronization signals (e.g., during a first synchronization subframe), and then use a second synchronization channel 1814 to transmit the second group of the synchronization signals at a later time/subframe in the radio frame (e.g., during a second synchronization subframe). The RACH 1816 may occur after the second synchronization channel 1814. The base station may process the synchronization signals such that a cyclic prefix is present between different synchronization signals in the processed synchronization signal 1832.

In this aspect of the disclosure, during the first synchronization subframe, the base station may process the synchronization signals such that a PBCH signal may be repeated in the processed synchronization signal 1832. For example, during the first synchronization subframe, the base station may transmit the first group of synchronization signals including a PBCH, a PSS, an SSS, and a repetition of the PBCH. In an aspect, a PBCH signal and a repeated PBCH signal may be spaced apart in time during time-division multiplexing (e.g., for estimation of a carrier frequency offset, as discussed infra). The processing and transmission of the synchronization signals during the first synchronization subframe using the first synchronization channel 1812 may be similar to the processing and transmission of the synchronization signals during the first synchronization subframe using the first synchronization channel 1712, as discussed above in reference to FIGS. 17A and 17B. Further, the processed synchronization signal 1832 may correspond to time-division multiplexed synchronization signals similar to the time-division multiplexed synchronization signals 1770 illustrated in FIG. 17B. Thus, detailed explanations about the processed synchronization signal 1832 and a corresponding time-division multiplexed synchronization signals are omitted.

During the second synchronization subframe, the base station may process the synchronization signals such that a BRS signal may be repeated in the processed synchronization signal 1852. For example, during the second synchronization subframe, the base station may transmit the second group of synchronization signals including a BRS, a PSS, an SSS, and a repetition of the BRS. In an aspect, a BRS signal and a repeated BRS signal may be spaced apart in time during time-division multiplexing. The BRS signal may be repeated in the processed synchronization signal 1852. As discussed above, the synchronization signals may be processed by time-division multiplexing the PSS, the SSS, and the BRS. In this case, because there are fourteen symbols, transmission of the processed synchronization signal 1852 (e.g., per symbol) may be performed fourteen times via beam-forming in fourteen directions in a sweeping manner (e.g., to cover the entire sector). The processed synchronization signal 1852 having cyclic prefixes may correspond to the time-division multiplexed synchronization signals 1880 illustrated in FIG. 18B. In particular, when the base station determines to transmit synchronization signals, the base station may perform time-division multiplexing of the synchronization signals to generate the time-division multiplexed synchronization signals 1880, and then transmit time-division multiplexed synchronization signals 1880 as the processed synchronization signal 1852 with cyclic prefixes in one nominal symbol (e.g., 17.89 microseconds). As illustrated in FIG. 18B, the synchronization signals may be processed by time-division multiplexing a BRS 1882, a PSS 1884, an SSS 1886, and a repetition of the BRS 1888, where the BRS 1882 and the repetition of the BRS 1888 are spaced apart from each other in time with the PSS 1884 and the SSS 1886 between the BRS 1882 and the repetition of the BRS 1888. The BRS 1882 and the repetition of the BRS 1888 may be identical in that the signal transmitted for the repetition of the BRS 1888 and the antenna port and a beam for the transmission of the repetition of the BRS 1888 may be identical to those for the transmission of the BRS 1888. Although the order of the PSS 1884 and the SSS 1886 in the time-division multiplexed synchronization signals 1880 shows that the PSS 1884 before the SSS 1887, the order may be reversed in another example. As illustrated in FIG. 18B, the bandwidths of the BRS 1882, the PSS 1884, the SSS 1886, and the repetition of the BRS 1888 may be the same. For example, the bandwidth may be 36 MHz. In an aspect, a bandwidth of a BRS (e.g., BRS 1882 or the repetition of the BRS 1888) may be wider than a bandwidth of a bandwidth of a PBCH/repeated PBCH.

As illustrated in FIG. 18B, within one nominal symbol, the BRS 1882, the PSS 1884, the SSS 1886, and the repetition of the BRS 1888 may be transmitted in different time periods. Thus, as illustrated in FIG. 18A, during the transmission of the processed synchronization signal 1852 in one symbol, the base station may transmit the PBCH during a first time period 1854, the PSS during a second time period 1856, and the SSS in a third time period 1858, and the repetition of the PBCH during a fourth time period 1860, with a cyclic prefix before the beginning of each of the first, second, third, and fourth time periods 1854, 1856, 1858, and 1860. Each of the first, second, third, and fourth time periods 1854, 1856, 1858, and 1860 may correspond to an OFDM symbol. The tone spacing for each of the synchronization signals in the processed synchronization signal 1852 may be 120 kHz. For example, each OFDM symbol may have 4× the nominal subcarrier spacing, thus may have ¼ of the length in time of the nominal symbol. Thus, the nominal symbol duration may be divided into the four OFDM symbols, where the four OFDM symbols respectively corresponds to the transmission times for BRS 1882, the PSS 1884, the SSS 1886, and the repetition of the BRS 1888.

In an aspect, a UE may estimate a channel within a 36 MHz bandwidth using an SSS, which is transmitted in all subframes, or may estimate a channel within a 36 MHz bandwidth using a BRS, which is transmitted in every other subframe. Further, the UE may estimate a channel outside the 36 MHz bandwidth using a BRS, which is transmitted in every other subframe.

In an aspect, the UE may determine whether the UE is receiving a signal in the first synchronization subframe or the second synchronization subframe. If the UE determines that the UE is receiving a signal in the first synchronization subframe, the UE may receive and decode the PBCH from the signal. If the UE determines that the UE is receiving a signal in the second synchronization subframe, the UE may receive and decode the BRS from the signal. Decoding the BRS may include detecting a beam identifier, measuring an RSRP or other beam quality measurements, and estimating channel for one or more beams.

In an aspect of the disclosure, the base station may determine whether to transmit a BRS. If the base station determines to transmit a BRS, the base station may include an indication of the presence of BRS transmission in a PBCH transmitted to the UE, such that the UE may determine to a decode a BRS and may transmit the BRS. If the base station determines not to transmit a BRS, the base station may include an indication of absence of BRS transmission in a PBCH transmitted to the UE, such that the UE may determine not to a decode a BRS. If the base station determines not to transmit a BRS, the base station may transmit a PBCH instead of the BRS.

Figure 19:
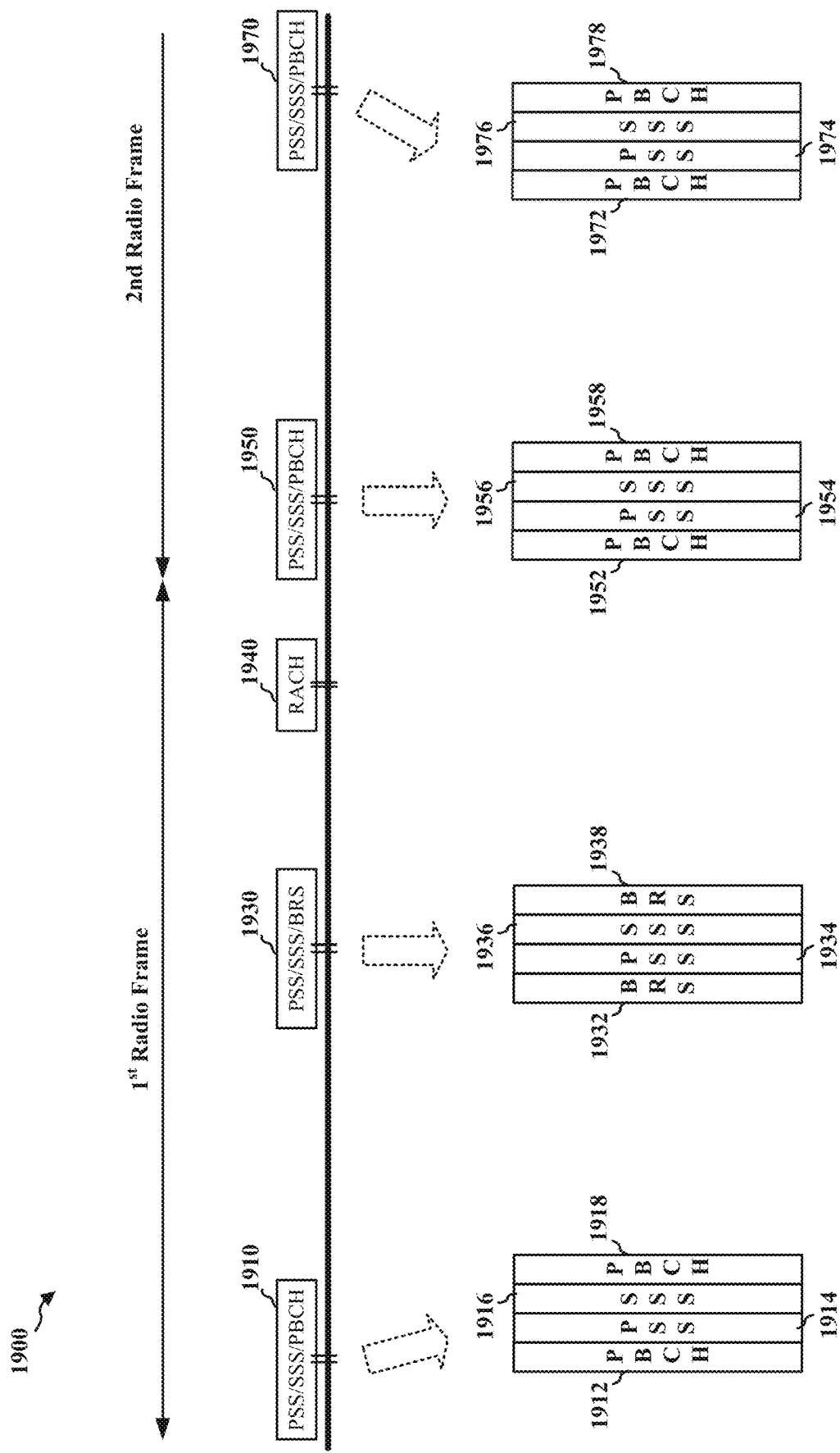
FIG. 19 is an example flow diagram illustrating an example procedure to process received signals.

FIG. 19 is an example diagram 1900 illustrating transmission of synchronization signals, according to an aspect of the disclosure. The example diagram 1900 illustrates that the base station determines to transmit a BRS in the first radio frame, and determines not to transmit a BRS in the second radio frame. In particular, during the first synchronization subframe of the first radio frame, the base station may use the first synchronization channel 1910 to transmit a PBCH 1912, a PSS 1914, an SSS 1916, and a repetition of the PBCH 1918. When the base station determines to transmit a BRS in the first radio frame, the base station may send the UE an indication indicating a presence of a BRS transmission in the PBCH 1912 and/or the repetition of the PBCH 1918 (e.g., in the first synchronization subframe), such that the UE may expect to decode a BRS (e.g., from the second synchronization subframe). During the second synchronization subframe of the first radio frame, the base station may use the second synchronization channel 1930 to transmit a BRS 1932, a PSS 1934, an SSS 1936, and a repetition of the BRS 1938. The RACH 1940 may occur after the second synchronization channel 1930.

During the first synchronization subframe of the second radio frame, the base station may use the third synchronization channel 1950 to transmit a PBCH 1952, a PSS 1954, an SSS 1956, and a repetition of the PBCH 1958. When the base station determines not to transmit a BRS in the second radio frame, the base station may indicate an absence of BRS transmission in the PBCH 1952 and/or the repetition of the PBCH 1958, such that the UE may not expect to decode a BRS. Because the base station determines not to transmit a BRS in the second radio frame, the base station instead transmits a PBCH during the second synchronization subframe of the second radio frame. In particular, during the second synchronization subframe of the second radio frame, the base station may use the fourth synchronization channel 1970 to transmit a PBCH 1972, a PSS 1974, an SSS 1976, and a repetition of the PBCH 1978.

In an aspect, the base station may indicate in a PBCH allocation information of a BRS in time and/or frequency. In an aspect, the base station may frequency-division multiplex a BRS with one or more of a PSS, an SSS, and a PBCH. In an aspect, the base station may indicate in a PBCH a location of a BRS to be frequency-division multiplexed with one or more signals including a PSS, an SSS, and a PBCH. In an aspect, the base station may further indicate in a PBCH locations of one or more signals including a PSS, an SSS, and a PBCH that are to be frequency-division multiplexed with a BRS. The locations may be indicated in time and/or frequency.

In an aspect, when a base station repeats a transmission of a synchronization signal (e.g., PBCH) of multiple synchronization signals, the UE may estimate a carrier frequency offset (CFO) based on the synchronization signal and the repeated synchronization signal before the UE decodes the synchronization signal. As discussed above, the base station may transmit a PBCH and a repeated PBCH to the UE (e.g., a PBCH 1672 and a repetition of the PBCH 1678 in FIG. 16B, a PBCH 1772 and a repetition of the PBCH 1778 in FIG. 17B). For example, the UE may initially have a different carrier frequency than the base station due to a CFO, although the UE should have the same carrier frequency as the base station. Thus, the UE may correct the carrier frequency of the UE over time based on the estimated CFO (e.g., so as to minimize the CFO). When the UE receives a PBCH and a repeated PBCH, the UE may estimate a CFO based on the PBCH and the repeated PBCH. Because the PBCH and the repeated PBCH should be identical, the UE may estimate a CFO based on a difference (e.g., in frequency and/or time) between a received transmission of PBCH and a received repeated transmission of the PBCH. If the transmission time for the PBCH is too close in time to the transmission time for the repeated PBCH, then the CFO may be too small to be measurable by the UE. Thus, having the PBCH and the repetition of the PBCH spaced apart from each other in time with another synchronization signal (e.g., a PSS or an SSS) between the PBCH and the repetition of the PBCH may be more beneficial for CFO estimation than having the PBCH adjacent to the repetition of the PBCH. On the other hand, if the transmission time for the PBCH is too far apart in time from the transmission time for the repeated PBCH, the signal may go through a $2\pi$ rotation between the transmission of the PBCH and the transmission of the repeated PBCH and/or the channel conditions may change significantly, which may make estimation of the CFO more difficult. Thus, for example, configuring the transmission of the PBCH to be one or two OFDM symbols apart from the transmission of the repeated PBCH may be beneficial.

Figure 20:
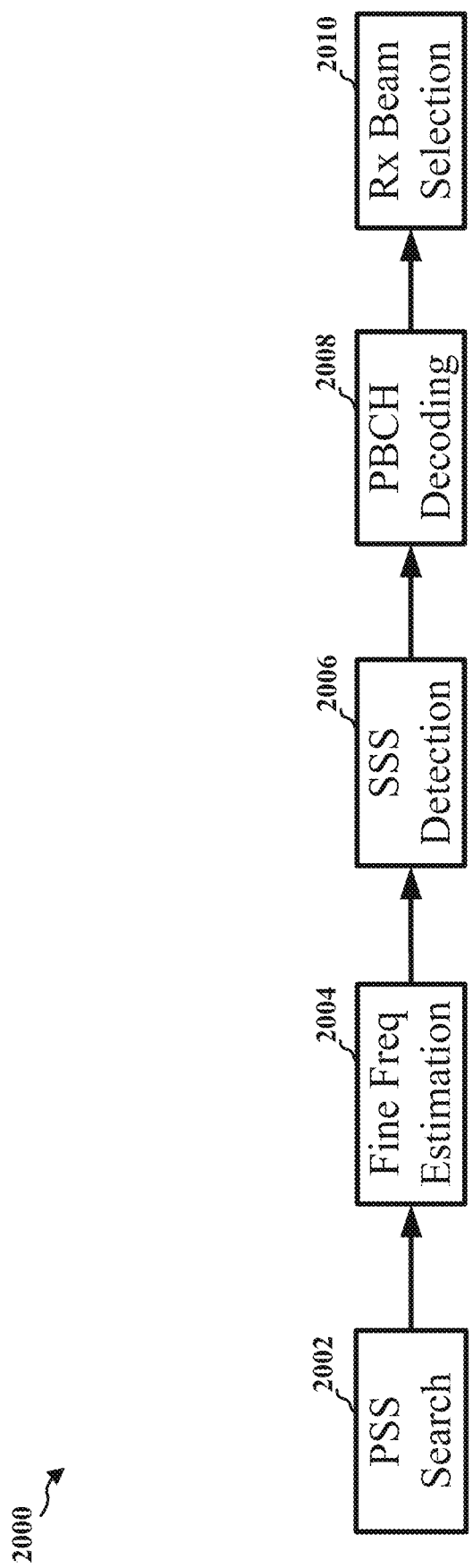
FIG. 20 is an example flow diagram illustrating an example procedure to process received signals.

FIG. 20 is an example diagram 2000 illustrating an example procedure by a UE to process received signals. As discussed above, the base station may transmit a first PBCH signal and a second PBCH signal (e.g., a PBCH 1672 and a repetition of the PBCH 1678 in FIG. 16B, a PBCH 1772 and a repetition of the PBCH 1778 in FIG. 17B) to the UE, such that the UE may estimate a CFO based on the two PBCH signals. The UE may estimate the CFO based on the two PBCH signals (e.g., the first PBCH signal and the second PBCH signal) and a PSS. At 2002, the UE may search for a PSS and receive the PSS based on the search. In an example, the UE may receive a first PBCH signal before receiving the PSS. When the UE receives the PSS, the UE may make a coarse estimation of the CFO based on the received PSS and an expected transmission of the PSS. At 2004, the UE may receive a second PBCH signal and refine the estimation of the CFO based on the coarse estimation and a difference between the first PBCH signal and the second PBCH signal, to determine the estimated CFO. The second PBCH signal may be a repetition of the second PBCH signal. At 2006, the UE may detect an SSS using the estimated CFO, and may receive the detected SSS. At 2008, the UE may decode a PBCH using the estimated CFO.

At 2010, the UE may select a receive beam out of multiple receive beams based on the two BPCHs received at the UE. In particular, when the UE receives the two PBCHs in two OFDM symbols, the UE may use different receive beams to receive the two PBCHs respectively. Based on the signal conditions (e.g., RSRP) of the two received PBCHs using the respective receive beams, the UE may determine a receive beam with the best reception condition (e.g., highest RSRP). In an aspect, the UE may additionally use SSS in addition to the two PBCHs to select a receive beam out of multiple receive beams, by considering a reception condition (e.g., RSRP) for the received SSS. Thus, the UE may consider a receive beam used to receive a PBCH, a receive beam used to receive a repletion of the PBCH, and a receive beam used to receive an SSS, and select one of the three receive beams based on the reception conditions for each of the three receive beams.

Figure 21:
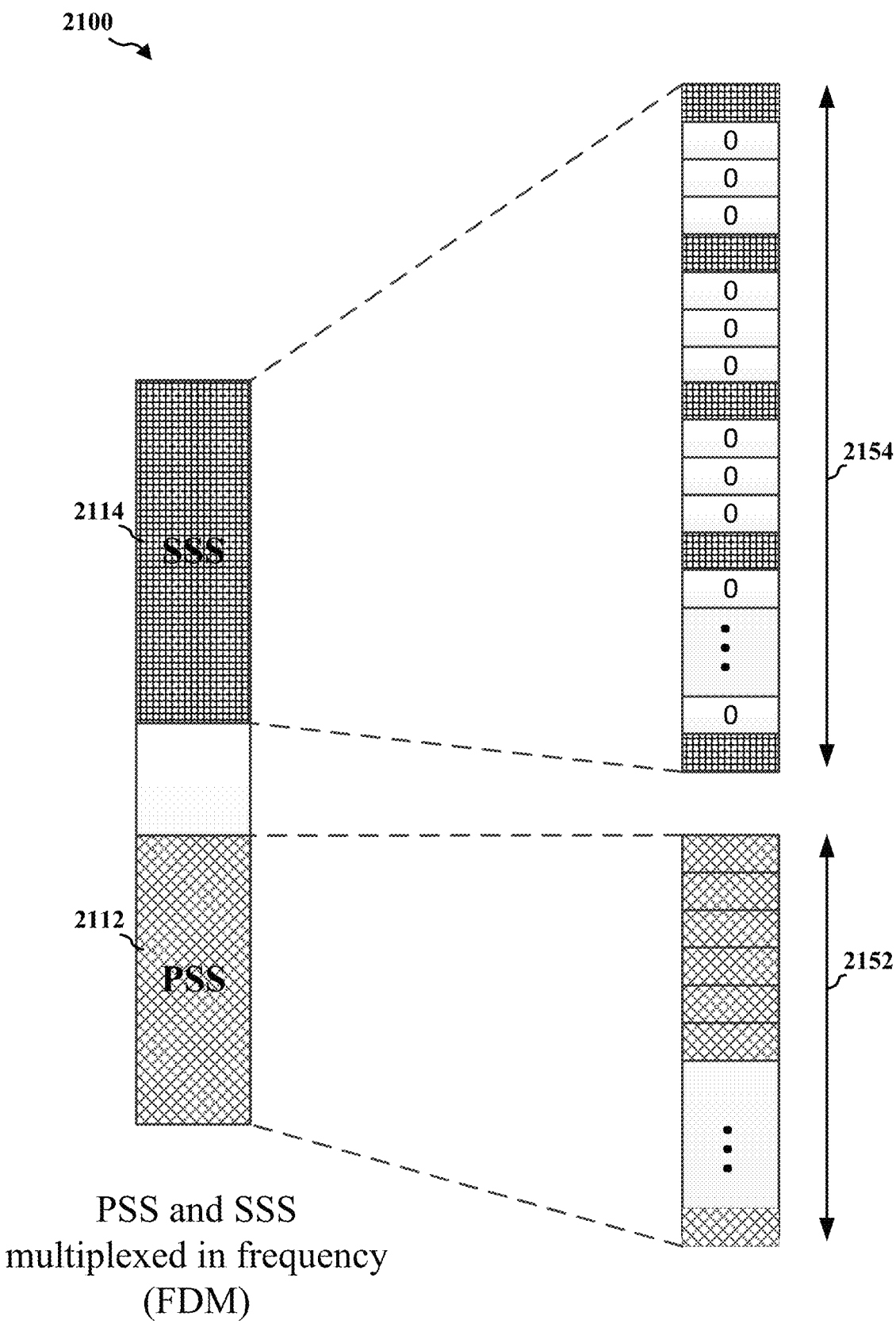
FIG. 21 is an example diagram illustrating frequency mapping for synchronization signals being frequency-division multiplexed.

FIG. 21 is an example diagram 2100 illustrating frequency mapping for synchronization signals being frequency-division multiplexed. When two synchronization signals (e.g., an SSS and a PSS) are frequency-division multiplexed, the first signal 2112 may be mapped to a first subset 2152 of tones, where the tones used to map the first signal 2112 are adjacent to each other in the first subset 2152 of tones. The second signal 2114 may be mapped to a second subset 2154 of tones that is different from the first subset 2152 of tones, where the tones used to map the second signal 2114 are spaced apart from each other by null tones, e.g., tones with no signal. The tones used to map the second signal 2114 may be spaced from each other by an equal number of null tones (e.g., tones with zero tone values).

Figure 22:
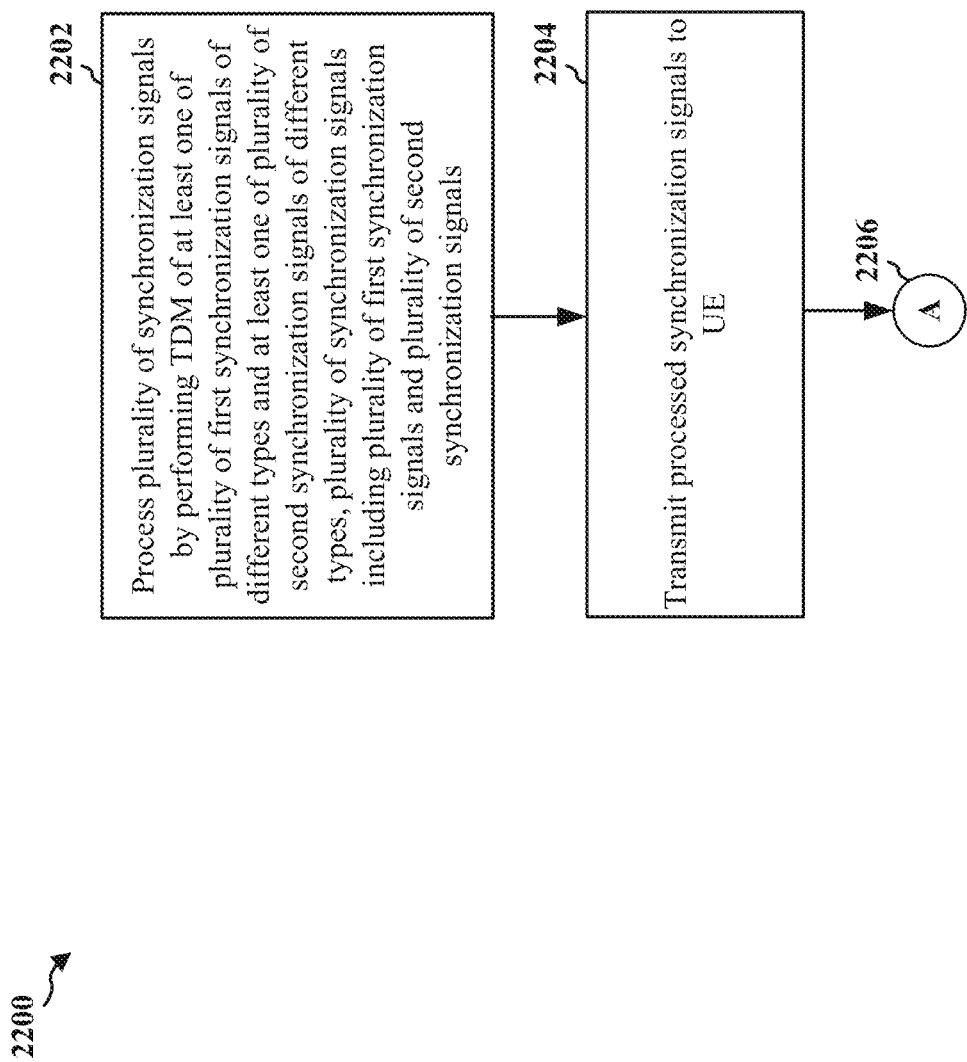
FIG. 22 is a flowchart of a method of wireless communication.

FIG. 22 is a flowchart 2200 of a method of wireless communication. The method may be performed by a base station (e.g., the base station 804, the apparatus 2802/2802'). At 2202, the base station may process a plurality of synchronization signals by performing TDM of at least one first synchronization signal of a plurality of first synchronization signals of different types and at least one second synchronization signal of the plurality of second synchronization signals of different types, the plurality of synchronization signals including the plurality of first synchronization signals and the plurality of second synchronization signals. For example, as discussed supra, the base station may process the synchronization signals by time-division multiplexing at least one first synchronization signal from the plurality of first synchronization signals and at least one second synchronization signal from the plurality of second synchronization signals. In an aspect, the base station may process the plurality of synchronization signals by: generating a first multiplexed signal by performing at least one of FDM of at least two first synchronization signals of the plurality of first synchronization signals or TDM of at least two second synchronization signals of the plurality of first synchronization signals, generating a second multiplexed signal by performing at least one of FDM of at least two second synchronization signals of the plurality of second synchronization signals or TDM of at least two second synchronization signals of the plurality of second synchronization signals, and performing the TDM of the first multiplexed signal and the second multiplexed signal. For example, as discussed supra, the base station may process the first synchronization signals by time-division multiplexing or frequency-division multiplexing the synchronization signals within the first synchronization signals, and may process the second synchronization signals by time-division multiplexing or frequency-division multiplexing the synchronization signals within the second synchronization signals, and, subsequently, may time-division multiplex the processed first synchronization signals and the processed second synchronization signals.

In an aspect, the first multiplexed signal may be generated by: performing at least one of FDM or TDM of two first synchronization signals of the plurality of first synchronization signals, mapping one of the two first synchronization signals to a first subset of tones, and mapping the other one of the two first synchronization signals to a second subset of tones, the second subset of tones different from the first subset of tones. In an aspect, tones in the second subset of tones may be equally spaced from each other in a frequency domain. For example, as discussed supra, when the PSS and the SSS are frequency-division multiplexed, the PSS is mapped to consecutive tones in a first subset of tones, whereas the SSS is mapped to tones that are spaced apart (e.g. equally spaced apart) from each other in a second subset of tones.

In an aspect, the plurality of the synchronization signals may be processed without performing FDM of the at least one of the plurality of synchronization signals with at least one of a plurality of data channel signals. In such an aspect, the plurality of data channel signals may include one or more PDSCH signals. For example, as discussed supra, the base station may avoid frequency-division multiplexing one or more of the synchronization signals and one or more of data channel signals (e.g., PDSCH signals, PUSCH signals).

In an aspect, the plurality of first synchronization signals may include at least one of a PSS, an SSS, a BRS, an ESS, or a PBCH signal. In an aspect, the plurality of second synchronization signals may include at least one of a PSS, an SSS, a BRS, an ESS, or a PBCH signal. For example, as discussed supra, the first synchronization signals may include a PSS, an SSS, a BRS, an ESS, or a PBCH signal, and the second synchronization signals may include a PSS, an SSS, a BRS, an ESS, or a PBCH. In an aspect, a tone spacing of each of the at least one of the plurality of first synchronization signals and a second tone spacing of at least one of the plurality of second synchronization signals may be different from each other. For example, as discussed supra, the PSS and the PBCH may have a tone spacing of 480 kHz, and an SSS may have a tone spacing of 240 KHz.

At 2204, the base station may transmit the processed synchronization signals to a UE. For example, as discussed supra, after processing the synchronization signal, the base station transmits the processed synchronization signals to the UE. In an aspect, the base station may transmit the processed synchronization signals by: transmitting a synchronization signal block via each beam of a plurality of beams of the base station, the plurality of beams corresponding to a plurality of directions, respectively, the synchronization signal block including two or more of the processed synchronization signals. For example, as discussed supra, the base station may transmit the synchronization signals in a synchronization signal block (SS block), where each SS block corresponds to a respective direction of a beam of the base station.

In an aspect, the base station may transmit the processed synchronization signals by: performing a first transmission by transmitting a first group of the processed synchronization signals, and performing one or more repeat transmissions of the first transmission, where each of the one or more repeat transmissions of the first transmission includes a repetition of the first transmission, where the first transmission and the one or more repeat transmission of the first transmission are performed within a first synchronization subframe. In an aspect, the first transmission and the one or more repeat transmissions of the first transmission are each performed using a different beam of a plurality of beams of the base station, each beam corresponding to a different direction, respectively. In such an aspect, the first transmission and the one or more repeat transmission may be performed multiple times within the first synchronization subframe. For example, as discussed supra, after processing a group of synchronization signals, the base station 804 transmits the group of the processed synchronization signals and repeat the transmission of the group of the processed synchronization signals in different directions of beams via beam-forming, within a synchronization subframe (e.g., at 814-820 of FIG. 8). In an aspect, the first transmission may include a transmission of at least one of the processed first synchronization signals in the first group being repeated at least once during each of the first transmission and the one or more repeat transmissions in the first synchronization subframe. For example, as illustrated in FIGS. 18A and 17B, within the first synchronization subframe, a PBCH may be repeated at least once during each transmission.

In an aspect, the base station may transmit the processed synchronization signals further by: performing a second transmission of a second group of the processed synchronization signals, performing one or more repeat transmissions of the second transmission, wherein each of the one or more repeat transmissions of the second transmission includes a repetition of the second transmission, where the second transmission and the one or more repeat transmissions of the second transmission are performed within a second synchronization subframe. In an aspect, the first transmission and the one or more repeat transmissions of the first transmission may each be performed using a respective beam of a plurality of beams, each beam transmitted in a respective direction of a plurality of directions, and the second transmission and the one or more repeat transmissions of the second transmission may each be performed using a respective beam of the plurality of beams, each beam transmitted in a respective direction of the plurality of directions. For example, as discussed supra, after processing a second group of synchronization signals, the base station 804 may transmit the second group of the processed synchronization signals and repeat the transmission of the second group of the processed synchronization signals in different directions of beams via beam-forming, within the subsequent synchronization subframe. In an aspect, the first group of the processed synchronization signals may include a first one of the processed second synchronization signals and the second group of the processed synchronization signals may include a second one of the processed second synchronization signals. For example, as illustrated in FIG. 18A, the synchronization signals transmitted during a first synchronization subframe may include a PBCH, and the synchronization signals transmitted during a second synchronization subframe may include a BRS. In such an aspect, the first transmission may include a transmission of the first one of the processed second synchronization signals in the first group being repeated at least once during each of the first transmission and the one or more repeat transmissions of the first transmission in the first synchronization subframe, and the second transmission may include a transmission of the second one of the processed second synchronization signals in the second group being repeated at least once during each of the second transmission and the one or more repeat transmissions of the second transmission in the second synchronization subframe. For example, as illustrated in FIGS. 18A and 17B, within the first synchronization subframe, a PBCH may be repeated at least once during each transmission. For example, as illustrated in FIGS. 18A and 18B, during the second synchronization subframe, a BRS may be repeated at least once during each transmission. In an aspect, the first group of the processed synchronization signals may include a PBCH signal, a PSS, an SSS, and a duplicate of the PBCH signal, and the second group of the processed synchronization signals may include a BRS, a PSS, an SSS, and a duplicate of the BRS. For example, as illustrated in FIGS. 18A and 18B, the processed synchronization signals include a PBCH, a PSS, an SSS, and a duplicate of the PBCH, and the processed synchronization signal 1852 include a BRS, a PSS, an SSS, and a duplicate of the BRS.

In an aspect, the base station may transmit the processed synchronization signals further by: determining whether to transmit a BRS in a second transmission, performing the second transmission, wherein the second transmission is performed by transmitting a second group of the processed synchronization signals including the BRS if the BRS is to be transmitted in the second transmission, and the second transmission is performed by transmitting the first group of the processed synchronization signals without the BRS if the BRS is not to be transmitted in the second transmission, and performing one or more repeat transmissions of the second transmission, wherein each of the one or more repeat transmissions of the second transmission includes a repetition of the second transmission, where the second transmission and the one or more repeat transmissions of the second transmission are performed within a second synchronization subframe. For example, as discussed supra, the base station may determine whether to transmit a BRS. For example, as illustrated in FIG. 19, in the first radio frame, if the BRS is to be transmitted in the second synchronization subframe of the first radio frame, the base station may transmit a BRS 1932, a PSS 1934, an SSS 1936, and a repetition of the BRS 1938 during the second synchronization subframe. For example, as illustrated in FIG. 19, in the second radio frame, if the BRS is not to be transmitted in the second synchronization subframe of the second radio frame, the base station may transmit a PBCH 1972, a PSS 1974, an SSS 1976, and a repetition of the PBCH 1978. In such an aspect, the BRS may be frequency-division multiplexed with at least one of a PBCH signal, a PSS, an SSS. In such an aspect, the BRS may be frequency-division multiplexed based on at least one of a location of the BRS or a location of the at least one of the PBCH signal, the PSS, and the SSS. For example, as discussed supra, the base station may frequency-division multiplex a BRS with one or more of a PSS, an SSS, and a PBCH. For example, as discussed supra, the base station may indicate in a PBCH a location of a BRS to be frequency-division multiplexed with one or more signals including a PSS, an SSS, and a PBCH. For example, as discussed supra, the base station may further indicate in a PBCH locations of one or more signals including a PSS, an SSS, and a PBCH that are to be frequency-division multiplexed with a BRS.

In an aspect, at 2206, the base station may perform additional features, as discussed infra.

Figures 23A, 23B:
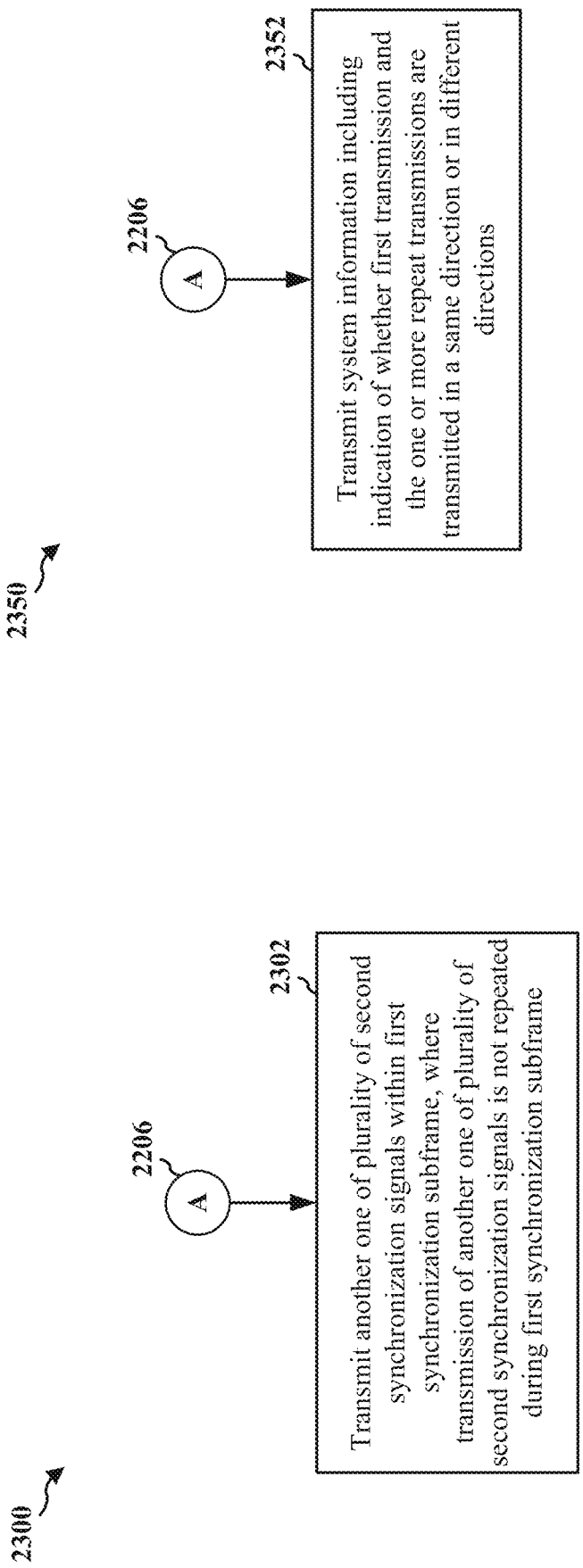
FIG. 23A is a flowchart of a method of wireless communication, expanding from the flowchart of FIG. 22.
FIG. 23B is a flowchart of a method of wireless communication, expanding from the flowchart of FIG. 22.

FIG. 23A is a flowchart 2300 of a method of wireless communication, expanding from the flowchart 2200 of FIG. 22. The method may be performed by a base station (e.g., the base station 804, the apparatus 2802/2802'). At 2206, the base station may continue from the flowchart 2200 of FIG. 22. At 2302, the base station may transmit another one of the plurality of second synchronization signals within the first synchronization subframe, wherein the transmission of the another one of the plurality of second synchronization signals is not repeated during the first synchronization subframe. For example, as discussed supra, the base station may transmit in a synchronization channel subframe a synchronization signal that is not repeated. For example, as discussed supra, the non-repeated synchronization signal may be an ESS.

FIG. 23B is a flowchart 2350 of a method of wireless communication, expanding from the flowchart 2200 of FIG. 22. The method may be performed by a base station (e.g., the base station 804, the apparatus 2802/2802'). At 2206, the base station may continue from the flowchart 2200 of FIG. 22. At 2352, the base station transmits system information including an indication of whether the first transmission and the one or more repeat transmissions are transmitted in a same direction or are transmitted in different directions. For example, as discussed supra, the base station may transmit system information to the UE to indicate whether the processed synchronization signals should be transmitted multiple times in different directions or in the same direction.

Figure 24:
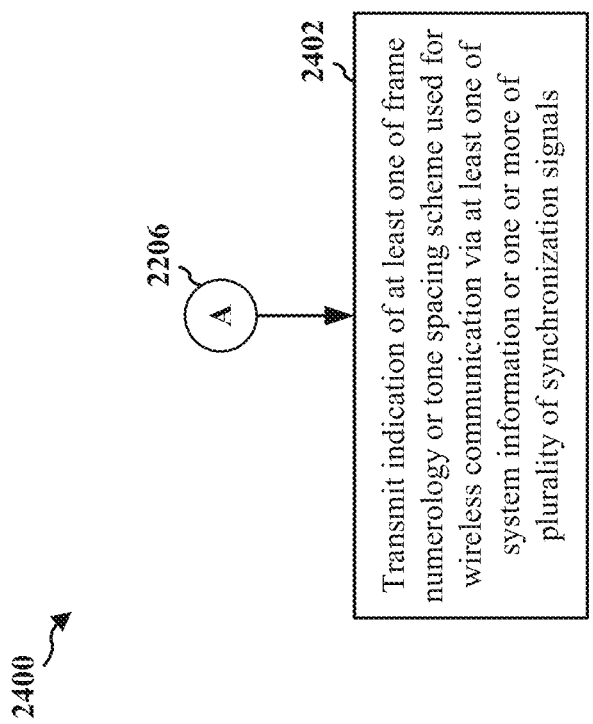
FIG. 24 is a flowchart of a method of wireless communication, expanding from the flowchart of FIG. 22.

FIG. 24 is a flowchart 2400 of a method of wireless communication, expanding from the flowchart 2200 of FIG. 22. The method may be performed by a base station (e.g., the base station 804, the apparatus 2802/2802'). At 2206, the base station may continue from the flowchart 2200 of FIG. 22. In an aspect, a duration of the first transmission and a duration of the at least one repeat transmission may be determined based at least on a frame numerology of the wireless communication or are fixed values independent of the frame numerology. For example, as discussed supra, in an aspect, a duration of a transmission of a processed synchronization signal may be a function of numerology used. For example, as discussed supra, in an aspect, a duration for the transmission may be fixed regardless of a numerology used. At 2402, the base station transmits an indication of at least one of the frame numerology or a tone spacing scheme used for the wireless communication via at least one of system information or one or more of the plurality of synchronization signals. For example, as discussed supra, the base station may declare such numerology information and/or tone spacing in the system information transmitted to the UE. In an aspect, the system information may be conveyed in at least one of a MIB or a SIB. For example, as discussed supra, the system information may be included in a MIB and/or a SIB, etc. In an aspect, the SIB may be transmitted via at least one of RMSI or OSI. For example, as discussed supra, the SIB may be conveyed via RMSI and/or OSI.

Figure 17:
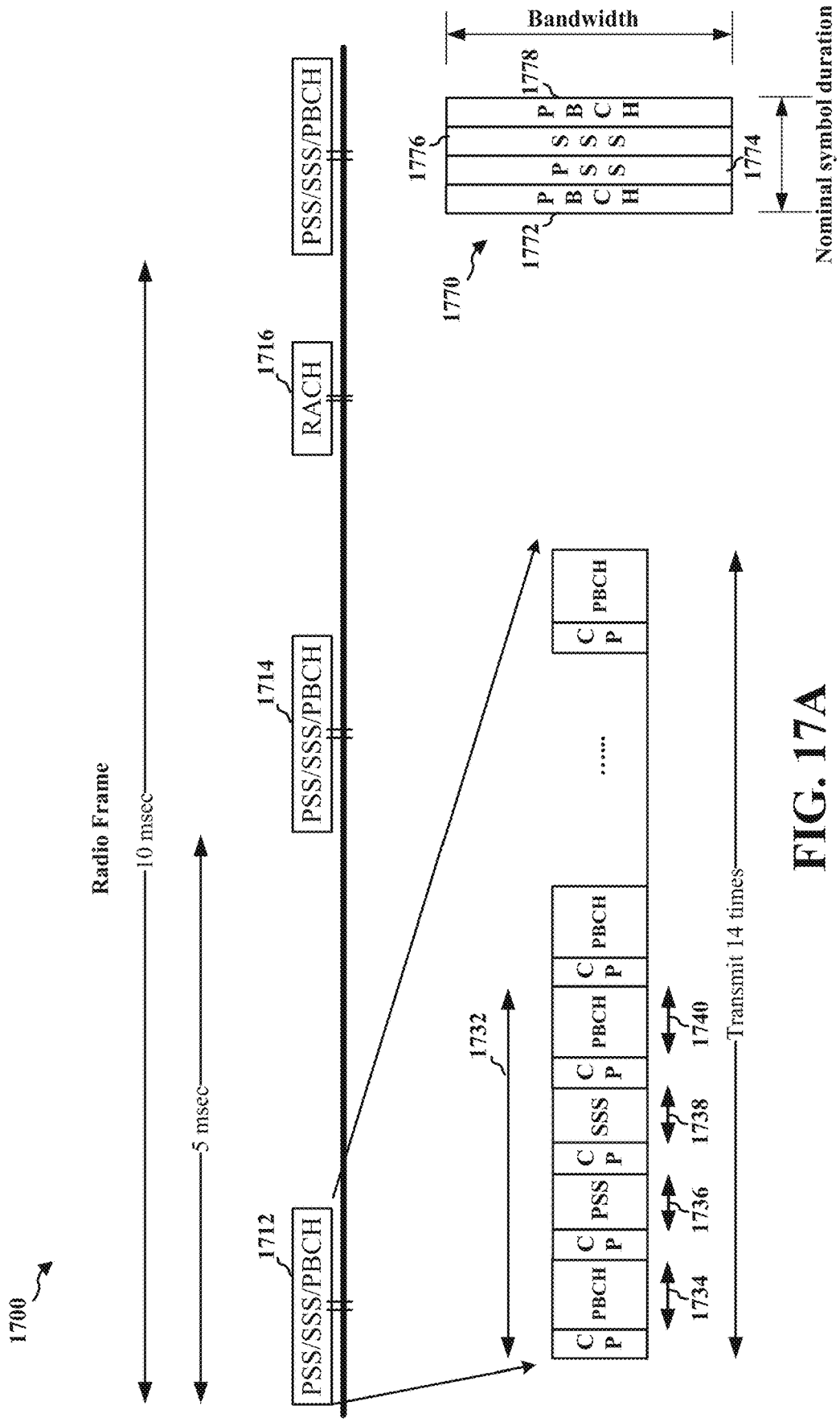
FIGS. 17A and 17B are example diagrams illustrating transmission of synchronization signals, according to an aspect of the disclosure.
Figure 18:
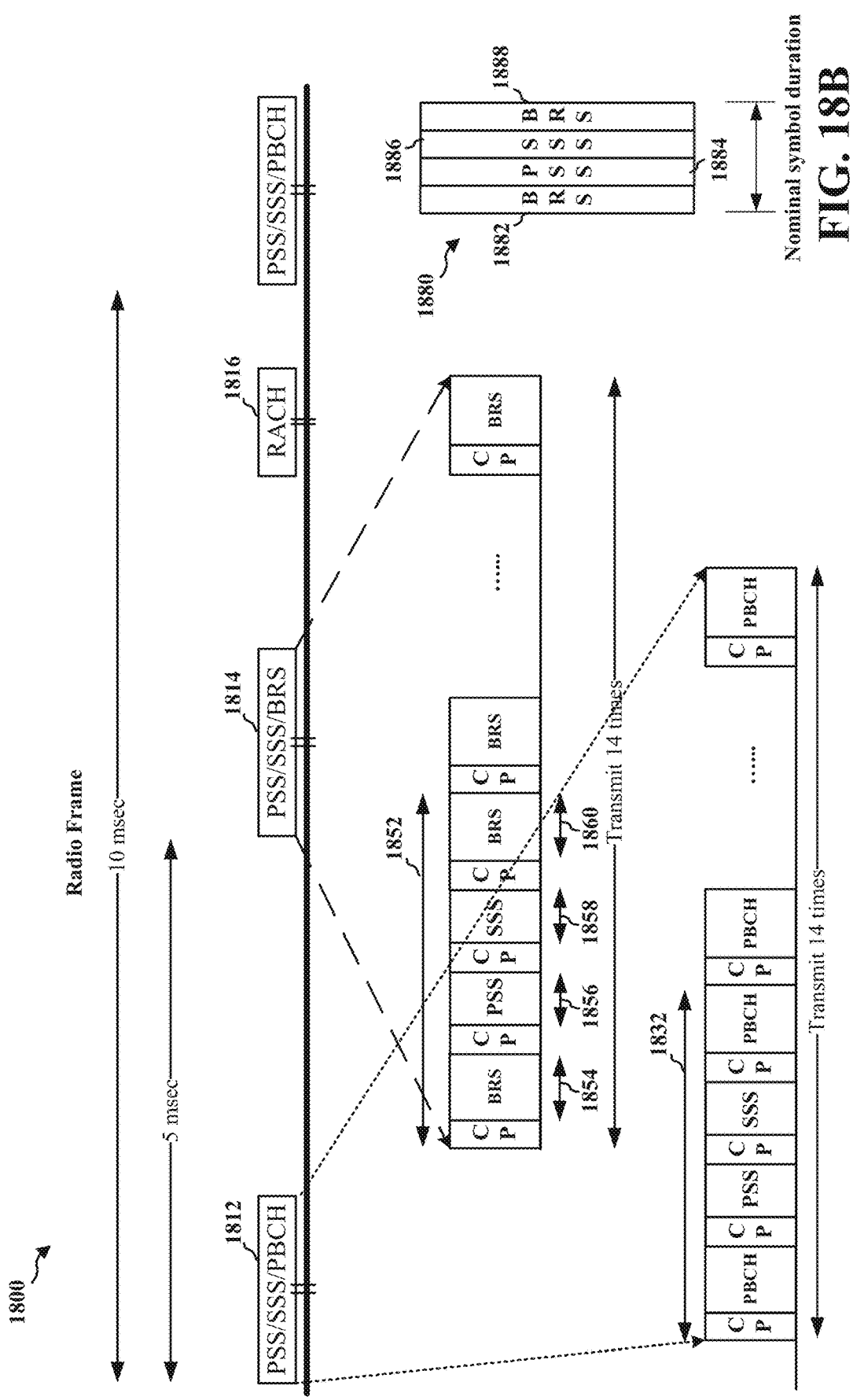
FIGS. 18A and 18B are example diagrams illustrating transmission of synchronization signals, according to an aspect of the disclosure.
Figure 25:
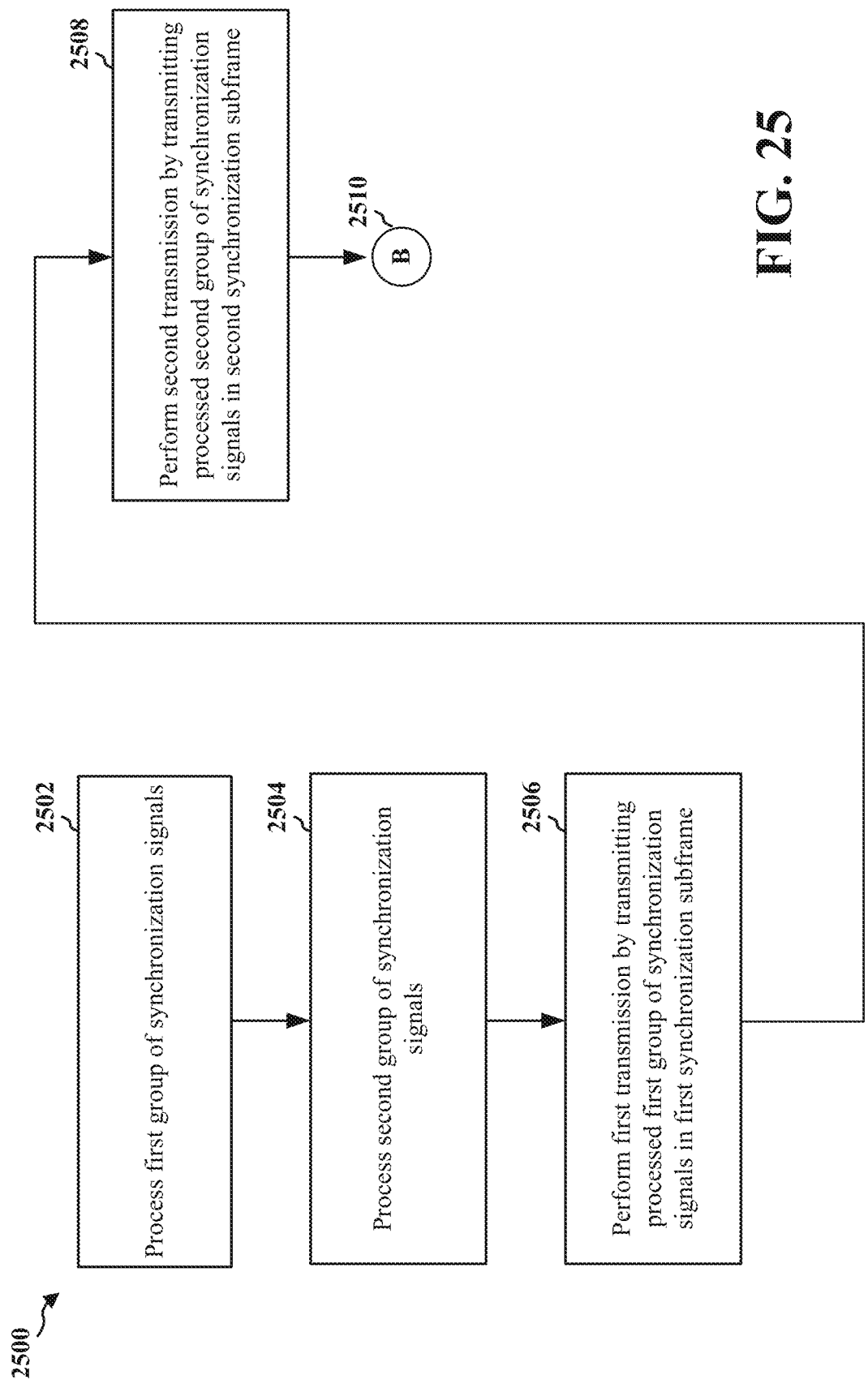
FIG. 25 is a flowchart of a method of wireless communication.

FIG. 25 is a flowchart 2500 of a method of wireless communication. The method may be performed by a base station (e.g., the base station 804, the apparatus 2802/2802'). At 2502, the base station processes a first group of synchronization signals. For example, as illustrated in FIGS. 17 and 18, the base station may process a first group of synchronization signals including a PSS, an SSS, and a PBCH signal by performing time-division multiplexing on the first group of synchronization signals. At 2504, the base station processes a second group of synchronization signals. For example, as illustrated in FIG. 18, the base station may process a second group of synchronization signals including a PSS, an SSS, and a BRS by performing time-division multiplexing on the second group of synchronization signals. In an aspect, the first group of synchronization signals may be processed by performing TDM of the first group of synchronization signals, and the second group of synchronization signals may be processed by performing TDM of the second group of synchronization signals. At 2506, the base station performs a first transmission by transmitting the processed first group of the synchronization signals in a first synchronization subframe. For example, as illustrated in FIG. 18, the base station may transmit the first group of the synchronization signals by transmitting the processed synchronization signals including a PBCH, a PSS, an SSS, and a repetition of PBCH during the first synchronization subframe. At 2508, the base station performs a second transmission by transmitting the processed second group of the synchronization signals in a second synchronization subframe. For example, as illustrated in FIG. 18, the base station may transmit the second group of the synchronization signals by transmitting the processed synchronization signals including a BRS, a PSS, an SSS, and a repetition of BRS during the second synchronization subframe.

In an aspect, the first group of the synchronization signals may include a PBCH, and the second group of the synchronization signals may include a BRS. For example, as illustrated in FIG. 18, the first group of the synchronization signals may include a PBCH and the second group of the synchronization signals may include a BRS. In an aspect, the first group of the synchronization signals may further include one or more of a PSS, an SSS, and another PBCH signal, and the second group of the synchronization signals may further include one or more of a PSS, an SSS, and another BRS. In such an aspect, the another PBCH signal may be a duplicate of the PBCH signal and the another BRS may be a duplicate of the BRS. For example, as illustrated in FIG. 18, the first group of the synchronization signals may include a PBCH, a PSS, an SSS, and a repetition of the PBCH and the second group of the synchronization signals may include a BRS, a PSS, an SSS, and a repetition of the BRS.

At 2510, the base station may perform additional features, as discussed infra.

Figure 26:
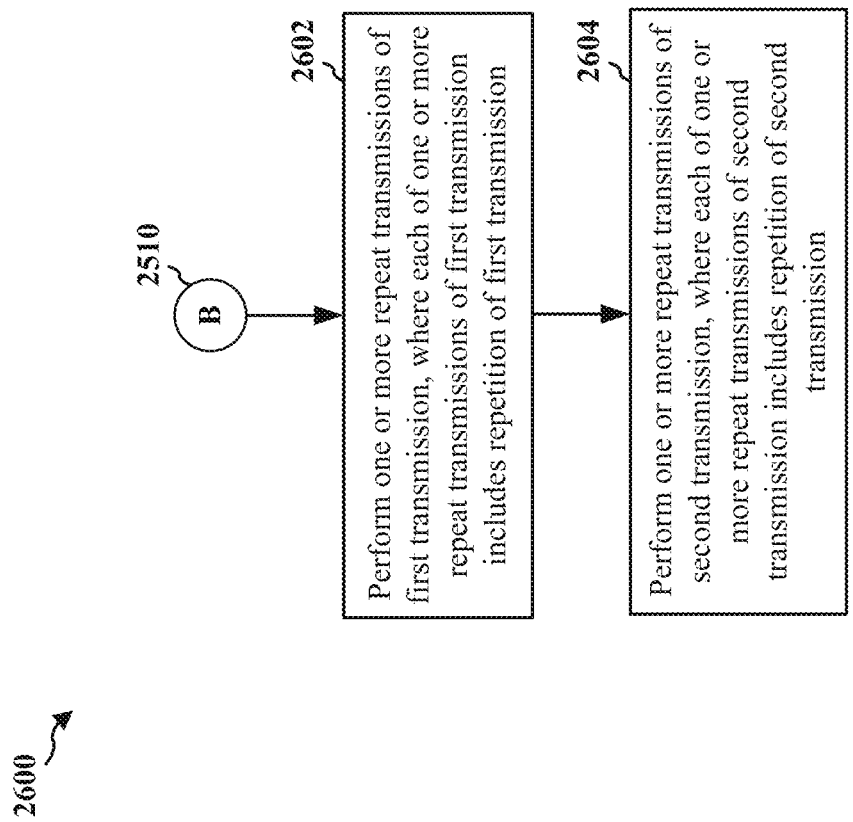
FIG. 26 is a flowchart of a method of wireless communication, expanding from the flowchart of FIG. 25.

FIG. 26 is a flowchart 2600 of a method of wireless communication, expanding from the flowchart 2500 of FIG. 25. The method may be performed by a base station (e.g., the base station 804, the apparatus 2802/2802'). At 2510, the base station may continue from the flowchart 2500 of FIG. 25. At 2602, the base station may perform one or more repeat transmissions of the first transmission, wherein each of the one or more repeat transmissions of the first transmission includes a repetition of the first transmission, where the first transmission and the one or more repeat transmission of the first transmission are performed within the first synchronization subframe. For example, as illustrated in FIG. 18, during the first synchronization subframe, the base station may transmit the first group of processed synchronization signals multiple times (e.g., 14 times). In an aspect, the first transmission may include a transmission of at least one of the processed first synchronization signals in the first group being repeated at least once during each of the first transmission and the one or more repeat transmissions in the first synchronization subframe. For example, as illustrated in FIGS. 18A and 17B, within the first synchronization subframe, a PBCH may be repeated at least once during each transmission. At 2604, the base station may perform one or more repeat transmissions of the second transmission, wherein each of the one or more repeat transmissions of the second transmission includes a repetition of the second transmission, where the second transmission and the one or more repeat transmissions of the second transmission are performed within the second synchronization subframe. For example, as illustrated in FIG. 18, during the second synchronization subframe, the base station may transmit the second group of processed synchronization signals multiple times (e.g., 14 times).

In an aspect, the first transmission and the one or more repeat transmissions of the first transmission may each be performed using a respective beam of a plurality of beams, each beam transmitted in a respective direction of a plurality of directions, and the second transmission and the one or more repeat transmissions of the second transmission may each be performed using a respective beam of the plurality of beams, each beam transmitted in a respective direction of the plurality of directions. For example, as illustrated in FIG. 18, during the first synchronization subframe, the base station may transmit the first group of processed synchronization signals multiple times using multiple beams in different directions, and during the second synchronization subframe, the base station may transmit the second group of processed synchronization signals multiple times using the multiple beams in different directions. In an aspect, the first group of the processed synchronization signals may include a first one of the second synchronization signals and the second group of the processed synchronization signals may include a second one of the second synchronization signals. For example, as illustrated in FIG. 18, the first group of the processed synchronization signals may include a PBCH, and the second group of the processed synchronization signals may include a BRS. In such an aspect, the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe. For example, as illustrated in FIGS. 18A and 17B, during the first synchronization subframe, a PBCH may be repeated at least once during each transmission of the multiple transmissions of the first group of the synchronization signals. For example, as illustrated in FIGS. 18A and 18B, during the second synchronization subframe, a BRS may be repeated at least once during each transmission of the multiple transmissions of the second group of the synchronization signals.

Figure 27:
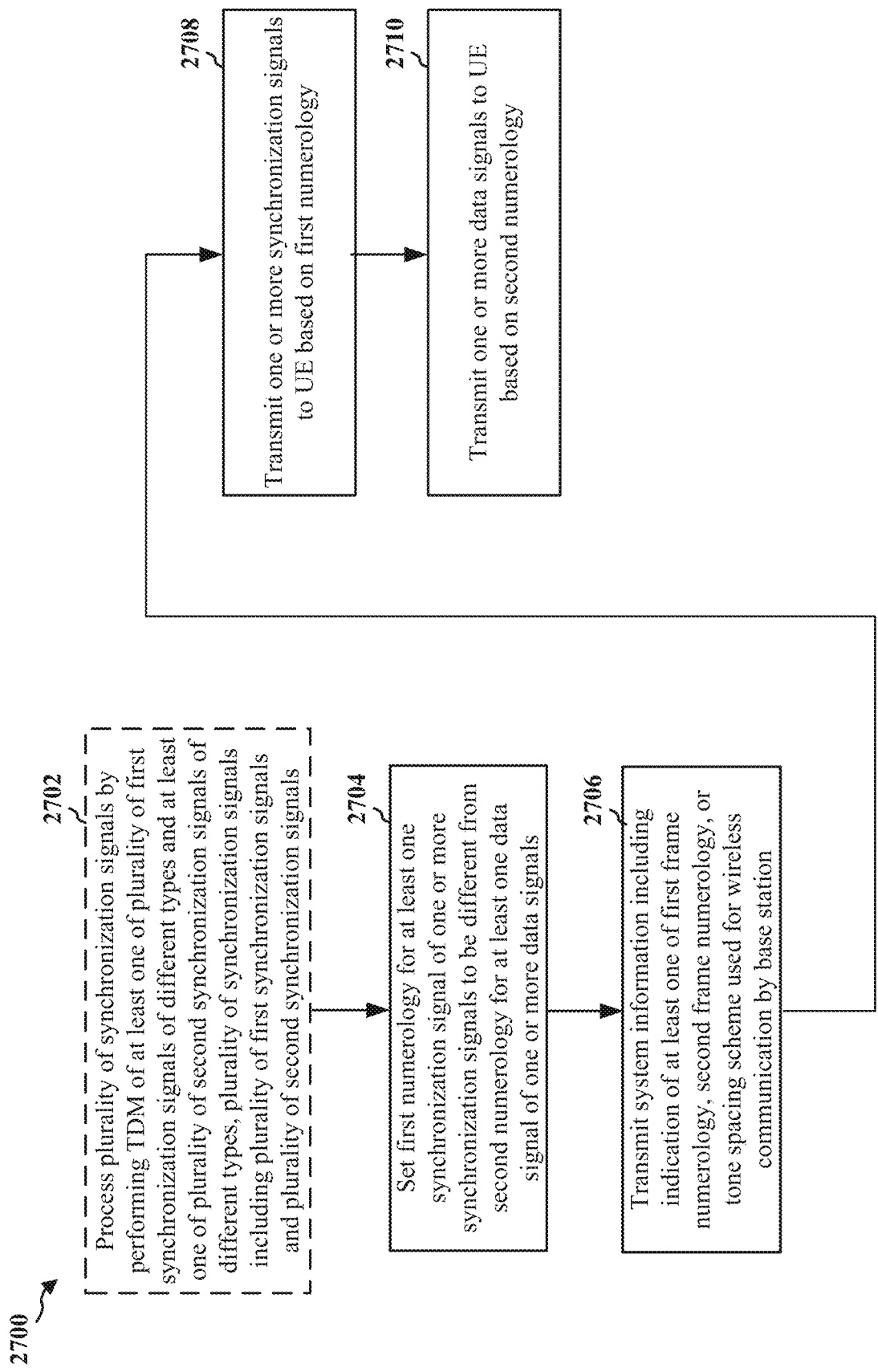
FIG. 27 is a flowchart of a method of wireless communication.

FIG. 27 is a flowchart 2700 of a method of wireless communication. The method may be performed by a base station (e.g., the base station 804, the apparatus 2802/2802'). In an aspect, at 2702, the base station may process a plurality of synchronization signals by performing TDM of at least one of a plurality of first synchronization signals of different types and at least one of the plurality of second synchronization signals of different types, the plurality of synchronization signals including the plurality of first synchronization signals and the plurality of second synchronization signals. For example, as discussed supra, the base station may process the synchronization signals by time-division multiplexing at least one synchronization signal from the first synchronization signals and at least one synchronization signal from the second synchronization signals. In such an aspect, the base station may process the plurality of synchronization signals by: generating a first multiplexed signal by performing at least one of FDM of at least two of the plurality of first synchronization signals or TDM of at least two of the plurality of first synchronization signals, generating a second multiplexed signal by performing at least one of FDM of at least two of the plurality of second synchronization signals or TDM of at least two of the plurality of second synchronization signals, and performing the TDM of the first multiplexed signal and the second multiplexed signal. For example, as discussed supra, the base station may process the first synchronization signals by time-division multiplexing or frequency-division multiplexing the synchronization signals within the first synchronization signals, and may process the second synchronization signals by time-division multiplexing or frequency-division multiplexing the synchronization signals within the second synchronization signals, and, subsequently, may time-division multiplex the processed first synchronization signals and the processed second synchronization signals. In such an aspect, the plurality of the synchronization signals are processed without performing FDM of the at least one of the plurality of synchronization signals with the at least one of a plurality of data channel signals. For example, as discussed supra, the base station may avoid frequency-division multiplexing one or more of the synchronization signals and one or more of data channel signals (e.g., PDSCH signals, PUSCH signals).

At 2704, the base station may set a first numerology for at least one synchronization signal of one or more synchronization signals to be different from a second numerology for at least one data signal of the one or more data signals. For example, as discussed supra, the base station may set a numerology such that a numerology for a synchronization signal is different from a numerology for a data signal.

At 2706, the base station may transmit system information including an indication of at least one of the first numerology, the second numerology, or a tone spacing scheme used for the wireless communication by the base station. In an aspect, the system information may be included in at least one of a MIB or a SIB. For example, as discussed supra, a numerology and/or tone spacing may be declared in the system information transmitted from the base station in a MIB or a SIB. In an aspect, the second numerology may indicate a numerology of at least one of RMSI or OSI. For example, as discussed supra, the numerology for the data signal may indicate the numerology of RMSI and/or OSI.

At 2708, the base station transmits the one or more synchronization signals to a UE based on the first numerology. For example, as discussed supra, the base station may transmit the synchronization signal based on the numerology for the synchronization signal. In an aspect, the one or more synchronization signals include one or more of a PSS, an SSS, a BRS, an ESS, or a PBCH signal. For example, as discussed supra, the synchronization signal may include one or more of a PSS, an SSS, a BRS, an ESS, and a PBCH.

In an aspect, the base station may transmit the one or more synchronization signals by transmitting the processed synchronization signals. In an aspect, the base station may transmit the processed synchronization signals by: performing a first transmission of a first group of the processed synchronization signals, performing one or more repeat transmissions of the first transmission, where each of the one or more repeat transmissions of the first transmission includes a repetition of the first transmission, where the first transmission and the one or more repeat transmission of the first transmission are performed within a first synchronization subframe. In such an aspect, the first transmission and the one or more repeat transmissions of the first transmission are each performed using a different beam of a plurality of beams of the base station, each beam corresponding to a different direction, respectively. For example, as discussed supra, after processing a group of synchronization signals, the base station 804 transmits the group of the processed synchronization signals and repeat the transmission of the group of the processed synchronization signals in different directions of beams via beam-forming, within a synchronization subframe (e.g., at 814-820 of FIG. 8). In an aspect, the first transmission may include a transmission of at least one of the processed first synchronization signals in the first group being repeated at least once during each of the first transmission and the one or more repeat transmissions in the first synchronization subframe. For example, as illustrated in FIGS. 18A and 17B, within the first synchronization subframe, a PBCH may be repeated at least once during each transmission.

In an aspect, the base station may transmit the processed synchronization signals by: performing a second transmission of a second group of the processed synchronization signals, and performing one or more repeat transmissions of the second transmission, wherein each of the one or more repeat transmissions of the second transmission includes a repetition the second transmission, where the second transmission and the one or more repeat transmissions of the second transmission are performed within a second synchronization subframe. In an aspect, the second transmission and the one or more repeat transmissions of the second transmission may be performed using the plurality of beams at the plurality of directions. For example, as discussed supra, after processing a second group of synchronization signals, the base station 804 may transmit the second group of the processed synchronization signals and repeat the transmission of the second group of the processed synchronization signals in different directions of beams via beam-forming, within the subsequent synchronization subframe. In an aspect, the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe At 2710, the base station transmits the one or more data signals to the UE based on the second numerology. For example, as discussed supra, the base station may transmit the data signal based on the numerology for the data signal. In an aspect, the one or more data signals include one or more PDSCH signals. For example, as discussed supra, the data signal may include one or more of a PDSCH and a PUSCH.

In an aspect, the first numerology of the at least one synchronization signal defines a first tone spacing and the second numerology of the at least one data signal defines a second tone spacing. For example, as discussed supra, the numerology for a synchronization signal may have a tone spacing different from a tone spacing for a data signal. In such an aspect, the at least one synchronization signal is transmitted at a first periodicity based on the first tone spacing and the at least one data signal is transmitted at a second periodicity based on the second tone spacing. For example, as discussed supra, a duration of a transmission (e.g., periodicity) of a processed synchronization signal may be a function of a numerology and/or tone spacing for the processed synchronization signal. For example, as discussed supra, a duration of a transmission (e.g., periodicity) of a data signal may be a function of a numerology and/or tone spacing for the data signal. In such an aspect, the first tone spacing for the at least one synchronization signal is greater than the second spacing for the at least one data signal. For example, as discussed supra, the numerology (e.g., tone spacing) for the synchronization signal may be greater than the numerology (e.g., tone spacing) for the data signal.

Figure 28:
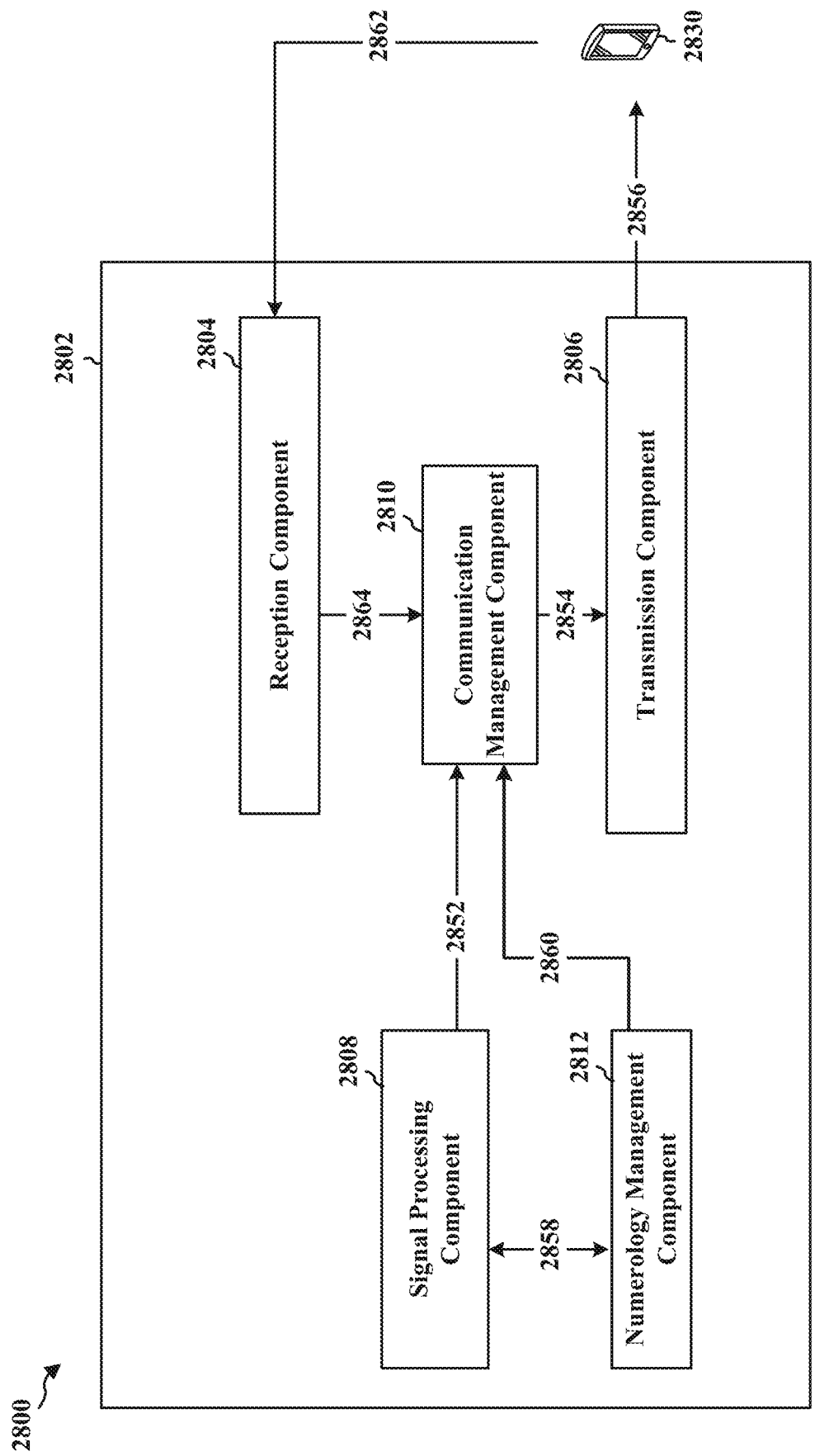
FIG. 28 is a conceptual data flow diagram illustrating the data flow between different means/components in an exemplary apparatus.

FIG. 28 is a conceptual data flow diagram 2800 illustrating the data flow between different means/components in an exemplary apparatus 2802. The apparatus may be a base station. The apparatus includes a reception component 2804, a transmission component 2806, a signal processing component 2808, a communication management component 2810, a numerology management component 2812.

The signal processing component 2808 may process a plurality of synchronization signals by performing TDM of at least one first synchronization signal of a plurality of first synchronization signals of different types and at least one second synchronization signal of the plurality of second synchronization signals of different types, the plurality of synchronization signals including the plurality of first synchronization signals and the plurality of second synchronization signals. The signal processing component 2808 may communicate the processed synchronization signals to the communication management component 2810, at 2852. In an aspect, the signal processing component 2808 may process the plurality of synchronization signals by: generating a first multiplexed signal by performing at least one of FDM of at least two first synchronization signals of the plurality of first synchronization signals or TDM of at least two second synchronization signals of the plurality of first synchronization signals, generating a second multiplexed signal by performing at least one of FDM of at least two second synchronization signals of the plurality of second synchronization signals or TDM of at least two second synchronization signals of the plurality of second synchronization signals, and performing the TDM of the first multiplexed signal and the second multiplexed signal. In an aspect, the base station may process the plurality of synchronization signals by: performing at least one of FDM or TDM of two first synchronization signals of the plurality of first synchronization signals, mapping one of the two first synchronization signals to a first subset of tones, and mapping the other one of the two first synchronization signals to a second subset of tones, the second subset of tones different from the first subset of tones. In an aspect, tones in the second subset of tones are equally spaced from each other in a frequency domain. In an aspect, the plurality of the synchronization signals may be processed without performing FDM of the at least one of the plurality of synchronization signals with at least one of a plurality of data channel signals. In such an aspect, the plurality of data channel signals may include one or more PDSCH signals.

In an aspect, the plurality of first synchronization signals may include at least one of a PSS, an SSS, a BRS, an ESS, or a PBCH signal. In an aspect, the plurality of second synchronization signals may include at least one of a PSS, an SSS, a BRS, an ESS, or a PBCH signal. In an aspect, a tone spacing of each of the at least one of the plurality of first synchronization signals and a second tone spacing of at least one of the plurality of second synchronization signals may be different from each other.

The communication management component 2810 may transmit, via the transmission component 2806, the processed synchronization signals to a UE (e.g., UE 2830), at 2854 and 2856. In an aspect, the communication management component 2810 may transmit the processed synchronization signals by: transmitting a synchronization signal block via each beam of a plurality of beams of the base station, the plurality of beams corresponding to a plurality of directions, respectively, the synchronization signal block including two or more of the processed synchronization signals.

In an aspect, the communication management component 2810 may transmit the processed synchronization signals by: performing a first transmission by transmitting a first group of the processed synchronization signals, and performing one or more repeat transmissions of the first transmission, where each of the one or more repeat transmissions of the first transmission includes a repetition of the first transmission, where the first transmission and the one or more repeat transmission of the first transmission are performed within a first synchronization subframe. In an aspect, the first transmission and the one or more repeat transmissions of the first transmission are each performed using a different beam of a plurality of beams of the base station, each beam corresponding to a different direction, respectively. In such an aspect, the first transmission and the one or more repeat transmission may be performed multiple times within the first synchronization subframe. In an aspect, the first transmission may include a transmission of at least one of the processed first synchronization signals in the first group being repeated at least once during each of the first transmission and the one or more repeat transmissions in the first synchronization subframe.

In an aspect, the communication management component 2810 may transmit the processed synchronization signals further by: performing a second transmission of a second group of the processed synchronization signals, performing one or more repeat transmissions of the second transmission, wherein each of the one or more repeat transmissions of the second transmission includes a repetition of the second transmission, where the second transmission and the one or more repeat transmissions of the second transmission are performed within a second synchronization subframe. In an aspect, the first transmission and the one or more repeat transmissions of the first transmission may each be performed using a respective beam of a plurality of beams, each beam transmitted in a respective direction of a plurality of directions, and the second transmission and the one or more repeat transmissions of the second transmission may each be performed using a respective beam of the plurality of beams, each beam transmitted in a respective direction of the plurality of directions. In an aspect, the first group of the processed synchronization signals may include a first one of the processed second synchronization signals and the second group of the processed synchronization signals may include a second one of the processed second synchronization signals. In such an aspect, the first transmission may include a transmission of the first one of the processed second synchronization signals in the first group being repeated at least once during each of the first transmission and the one or more repeat transmissions of the first transmission in the first synchronization subframe, and the second transmission may include a transmission of the second one of the processed second synchronization signals in the second group being repeated at least once during each of the second transmission and the one or more repeat transmissions of the second transmission in the second synchronization subframe. In an aspect, the first group of the processed synchronization signals may include a PBCH signal, a PSS, an SSS, and a duplicate of the PBCH signal, and the second group of the processed synchronization signals may include a BRS, a PSS, an SSS, and a duplicate of the BRS.

In an aspect, the communication management component 2810 may transmit the processed synchronization signals further by: determining whether to transmit a BRS in a second transmission, performing the second transmission, wherein the second transmission is performed by transmitting a second group of the processed synchronization signals including the BRS if the BRS is to be transmitted in the second transmission, and the second transmission is performed by transmitting the first group of the processed synchronization signals without the BRS if the BRS is not to be transmitted in the second transmission, and performing one or more repeat transmissions of the second transmission, wherein each of the one or more repeat transmissions of the second transmission includes a repetition of the second transmission, where the second transmission and the one or more repeat transmissions of the second transmission are performed within a second synchronization subframe. In such an aspect, the BRS may be frequency-division multiplexed with at least one of a PBCH signal, a PSS, an SSS. In such an aspect, the BRS may be frequency-division multiplexed based on at least one of a location of the BRS or a location of the at least one of the PBCH signal, the PSS, and the SSS.

In an aspect, the communication management component 2810 may transmit, via the transmission component 2806, another one of the plurality of second synchronization signals within the first synchronization subframe, at 2854 and 2856, where the transmission of the another one of the plurality of second synchronization signals is not repeated during the first synchronization subframe.

In an aspect, the communication management component 2810 may transmit, via the transmission component 2806, system information including an indication of whether the first transmission and the one or more repeat transmissions are transmitted in a same direction or are transmitted in different directions, at 2854 and 2856.

In an aspect, a duration of the first transmission and a duration of the at least one repeat transmission may be determined based at least on a frame numerology of the wireless communication or are fixed values independent of the frame numerology. The communication management component 2810 may transmit, via the transmission component 2806, an indication of at least one of the frame numerology or a tone spacing scheme used for the wireless communication via at least one of system information or one or more of the plurality of synchronization signals, at 2854 and 2856. In an aspect, the system information may be conveyed in at least one of a MIB or a SIB. In an aspect, the SIB may be transmitted via at least one of RMSI or OSI.

According to another aspect of the disclosure, the signal processing component 2808 processes a first group of synchronization signals, and processes a second group of synchronization signals. In an aspect, the first group of synchronization signals may be processed by performing TDM of the first group of synchronization signals, and the second group of synchronization signals may be processed by performing TDM of the second group of synchronization signals. The signal processing component 2808 may communicate the processed first group of the synchronization signals and the processed second group of the synchronization signals to the communication management component 2810, at 2852. The communication management component 2810 performs a first transmission by transmitting the processed first group of the synchronization signals in a first synchronization subframe, via the transmission component 2806, at 2854 and 2856. The communication management component 2810 performs a second transmission by transmitting the processed second group of the synchronization signals in a second synchronization subframe, via the transmission component 2806, at 2854 and 2856.

In an aspect, the first group of the synchronization signals may include a PBCH, and the second group of the synchronization signals may include a BRS. In an aspect, the first group of the synchronization signals may further include one or more of a PSS, an SSS, and another PBCH signal, and the second group of the synchronization signals may further include one or more of a PSS, an SSS, and another BRS. In such an aspect, the another PBCH signal may be a duplicate of the PBCH signal and the another BRS may be a duplicate of the BRS.

In an aspect, the communication management component 2810 may perform one or more repeat transmissions of the first transmission, via the transmission component 2806, at 2854 and 2856, where each of the one or more repeat transmissions of the first transmission includes a repetition of the first transmission, where the first transmission and the one or more repeat transmission of the first transmission are performed within the first synchronization subframe. In an aspect, the first transmission may include a transmission of at least one of the processed first synchronization signals in the first group being repeated at least once during each of the first transmission and the one or more repeat transmissions in the first synchronization subframe. The communication management component 2810 may perform one or more repeat transmissions of the second transmission, via the transmission component 2806, at 2854 and 2856, where each of the one or more repeat transmissions of the second transmission includes a repetition of the second transmission, where the second transmission and the one or more repeat transmissions of the second transmission are performed within the second synchronization subframe.

In an aspect, the first transmission and the one or more repeat transmissions of the first transmission may each be performed using a respective beam of a plurality of beams, each beam transmitted in a respective direction of a plurality of directions, and the second transmission and the one or more repeat transmissions of the second transmission may each be performed using a respective beam of the plurality of beams, each beam transmitted in a respective direction of the plurality of directions. In an aspect, the first group of the processed synchronization signals may include a first one of the second synchronization signals and the second group of the processed synchronization signals may include a second one of the second synchronization signals. In such an aspect, the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

According to another aspect of the disclosure, the following features may be performed. In such an aspect, the numerology management component 2812 may set a first numerology for at least one synchronization signal of one or more synchronization signals to be different from a second numerology for at least one data signal of the one or more data signals. The numerology management component 2812 may communicate the first numerology and the second numerology to the communication management component 2810, at 2852. The numerology management component 2812 may communicate with the signal processing component 2808 at 2860

The communication management component 2810 may transmit system information including an indication of at least one of the first numerology, the second numerology, or a tone spacing scheme used for the wireless communication, via the transmission component 2806, at 2854 and 2856. In an aspect, the system information may be included in at least one of a MIB or a SIB. In an aspect, the second numerology may indicate a numerology of at least one of RMSI or OSI.

The communication management component 2810 transmits the one or more synchronization signals to a UE based on the first numerology, via the transmission component 2806, at 2854 and 2856. In an aspect, the one or more synchronization signals include one or more of a PSS, an SSS, a BRS, an ESS, or a PBCH signal.

In an aspect where the one or more synchronization signals a plurality of synchronization signals, the signal processing component 2808 may process the plurality of synchronization signals by performing TDM of at least one of a plurality of first synchronization signals of different types and at least one of the plurality of second synchronization signals of different types, the plurality of synchronization signals including the plurality of first synchronization signals and the plurality of second synchronization signals. In such an aspect, the signal processing component 2808 may process the plurality of synchronization signals by: generating a first multiplexed signal by performing at least one of FDM of at least two of the plurality of first synchronization signals or TDM of at least two of the plurality of first synchronization signals, generating a second multiplexed signal by performing at least one of FDM of at least two of the plurality of second synchronization signals or TDM of at least two of the plurality of second synchronization signals, and performing the TDM of the first multiplexed signal and the second multiplexed signal. In such an aspect, the plurality of the synchronization signals are processed without performing FDM of the at least one of the plurality of synchronization signals with the at least one of a plurality of data channel signals. The signal processing component 2808 may communicate the processed synchronization signals to the communication management component 2810, at 2852.

In an aspect, the communication management component 2810 may transmit the one or more synchronization signals by transmitting the processed synchronization signals. In an aspect, the base station may transmit the processed synchronization signals by: performing a first transmission of a first group of the processed synchronization signals, performing one or more repeat transmissions of the first transmission, where each of the one or more repeat transmissions of the first transmission includes a repetition of the first transmission, where the first transmission and the one or more repeat transmission of the first transmission are performed within a first synchronization subframe. In such an aspect, the first transmission and the one or more repeat transmissions of the first transmission are each performed using a different beam of a plurality of beams of the base station, each beam corresponding to a different direction, respectively. In an aspect, the first transmission may include a transmission of at least one of the processed first synchronization signals in the first group being repeated at least once during each of the first transmission and the one or more repeat transmissions in the first synchronization subframe.

In an aspect, the communication management component 2810 may transmit the processed synchronization signals by: performing a second transmission of a second group of the processed synchronization signals, and performing one or more repeat transmissions of the second transmission, wherein each of the one or more repeat transmissions of the second transmission includes a repetition the second transmission, where the second transmission and the one or more repeat transmissions of the second transmission are performed within a second synchronization subframe. In an aspect, the second transmission and the one or more repeat transmissions of the second transmission may be performed using the plurality of beams at the plurality of directions. In an aspect, the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe The communication management component 2810 transmits the one or more data signals to the UE based on the second numerology, via the transmission component 2806, at 2854 and 2856. In an aspect, the one or more data signals include one or more PDSCH signals.

In an aspect, the first numerology of the at least one synchronization signal defines a first tone spacing and the second numerology of the at least one data signal defines a second tone spacing. In such an aspect, the at least one synchronization signal is transmitted at a first periodicity based on the first tone spacing and the at least one data signal is transmitted at a second periodicity based on the second tone spacing. In such an aspect, the first tone spacing for the at least one synchronization signal is greater than the second spacing for the at least one data signal.

In an aspect, the communication management component 2810 may receive communication from the UE 2830 via the reception component, at 2862 and 2864.

The apparatus may include additional components that perform each of the blocks of the algorithm in the aforementioned flowcharts of FIGS. 22-27. As such, each block in the aforementioned flowcharts of FIGS. 22-27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 29:
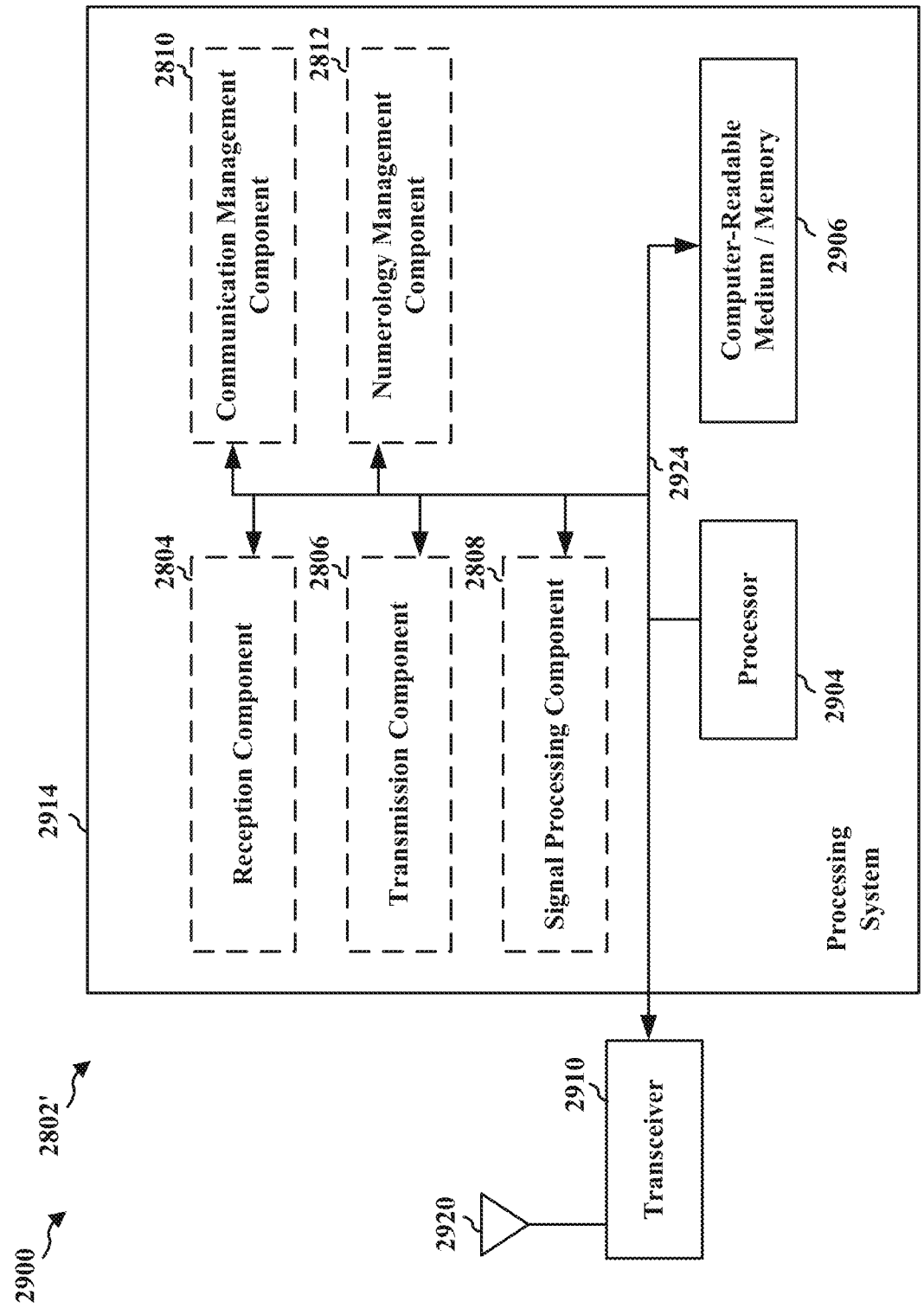
FIG. 29 is a diagram illustrating an example of a hardware implementation for an apparatus employing a processing system.

FIG. 29 is a diagram 2900 illustrating an example of a hardware implementation for an apparatus 2802' employing a processing system 2914. The processing system 2914 may be implemented with a bus architecture, represented generally by the bus 2924. The bus 2924 may include any number of interconnecting buses and bridges depending on the specific application of the processing system 2914 and the overall design constraints. The bus 2924 links together various circuits including one or more processors and/or hardware components, represented by the processor 2904, the components 2804, 2806, 2808, 2810, 2812, and the computer-readable medium/memory 2906. The bus 2924 may also link various other circuits such as timing sources, peripherals, voltage regulators, and power management circuits, which are well known in the art, and therefore, will not be described any further.

The processing system 2914 may be coupled to a transceiver 2910. The transceiver 2910 is coupled to one or more antennas 2920. The transceiver 2910 provides a means for communicating with various other apparatus over a transmission medium. The transceiver 2910 receives a signal from the one or more antennas 2920, extracts information from the received signal, and provides the extracted information to the processing system 2914, specifically the reception component 2804. In addition, the transceiver 2910 receives information from the processing system 2914, specifically the transmission component 2806, and based on the received information, generates a signal to be applied to the one or more antennas 2920. The processing system 2914 includes a processor 2904 coupled to a computer-readable medium/memory 2906. The processor 2904 is responsible for general processing, including the execution of software stored on the computer-readable medium/memory 2906. The software, when executed by the processor 2904, causes the processing system 2914 to perform the various functions described supra for any particular apparatus. The computer-readable medium/memory 2906 may also be used for storing data that is manipulated by the processor 2904 when executing software. The processing system 2914 further includes at least one of the components 2804, 2806, 2808, 2810, 2812. The components may be software components running in the processor 2904, resident/stored in the computer readable medium/memory 2906, one or more hardware components coupled to the processor 2904, or some combination thereof. The processing system 2914 may be a component of the base station 310 and may include the memory 376 and/or at least one of the TX processor 316, the RX processor 370, and the controller/processor 375.

In one configuration, the apparatus 2802/2802' for wireless communication includes means for processing a plurality of synchronization signals by performing TDM of at least one of a plurality of first synchronization signals of different types and at least one of the plurality of second synchronization signals of different types, the plurality of synchronization signals including the plurality of first synchronization signals and the plurality of second synchronization signals, and means for transmitting the processed synchronization signals to a UE. In an aspect, the means for processing the plurality of synchronization signals is configured to: generate a first multiplexed signal by performing at least one of FDM of at least two of the plurality of first synchronization signals or TDM of at least two first synchronization signals of the plurality of first synchronization signals, generate a second multiplexed signal by performing at least one of FDM of at least two second synchronization signals of the plurality of second synchronization signals or TDM of at least two of the plurality of second synchronization signals, and perform the TDM of the first multiplexed signal and the second multiplexed signal. the means for transmitting the processed synchronization signals is configured to transmit a synchronization signal block via each beam of a plurality of beams of the base station, the plurality of beams corresponding to a plurality of directions, respectively, the synchronization signal block including two or more of the processed synchronization signals. In an aspect, the means for transmitting the processed synchronization signals is configured to: perform a first transmission by transmitting a first group of the processed synchronization signals, and perform one or more repeat transmissions of the first transmission, wherein each of the one or more repeat transmissions of the first transmission includes a repetition of the first transmission, where the first transmission and the one or more repeat transmission of the first transmission are performed within a first synchronization subframe.

In an aspect, the apparatus 2802/2802' may further include means for transmitting another one of the plurality of second synchronization signals within the first synchronization subframe, wherein the transmission of the another one of the plurality of second synchronization signals is not repeated during the first synchronization subframe. In an aspect, the apparatus 2802/2802' may further include means for transmitting system information including an indication of whether the first transmission and the one or more repeat transmissions are transmitted in a same direction or are transmitted in different directions.

In an aspect, the means for transmitting the processed synchronization signals is further configured to: perform a second transmission by transmitting a second group of the processed synchronization signals, and perform one or more repeat transmissions of the second transmission, wherein each of the one or more repeat transmissions of the second transmission includes a repetition the second transmission, wherein the second transmission and the one or more repeat transmissions of the second transmission are performed within a second synchronization subframe. In an aspect, the means for transmitting the processed synchronization signals is further configured to: determine whether to transmit a BRS in the second transmission, perform the second transmission, wherein the second transmission is performed by transmitting a second group of the processed synchronization signals including the BRS when the BRS is transmitted in the second transmission, and the second transmission is performed by transmitting the first group of the processed synchronization signals without the BRS when the BRS is not transmitted in the second transmission, and perform one or more repeat transmissions of the second transmission, wherein each of the one or more repeat transmissions of the second transmission includes a repetition the second transmission, wherein the second transmission and the one or more repeat transmissions of the second transmission are performed within a second synchronization subframe. In an aspect, the apparatus 2802/2802' further includes means for transmitting an indication of at least one of the frame numerology or a tone spacing scheme used for the wireless communication via at least one of system information or one or more of the plurality of synchronization signals.

In one configuration, the apparatus 2802/2802' for wireless communication includes means for processing a first group of synchronization signals, means for processing a second group of synchronization signals, means for performing a first transmission by transmitting the processed first group of the synchronization signals in a first synchronization subframe, and means for performing a second transmission by transmitting the processed second group of the synchronization signals in a second synchronization subframe. In an aspect, the apparatus 2802/2802' further includes means for performing one or more repeat transmissions of the first transmission, wherein each of the one or more repeat transmissions of the first transmission includes a repetition of the first transmission, wherein the first transmission and the one or more repeat transmission of the first transmission are performed within the first synchronization subframe. In an aspect, the apparatus 2802/2802' further includes means for performing one or more repeat transmissions of the second transmission, wherein each of the one or more repeat transmissions of the second transmission includes a repetition of the second transmission, wherein the second transmission and the one or more repeat transmissions of the second transmission are performed within the second synchronization subframe. In an aspect, the means for processing the first group of synchronization signals is configured to perform TDM of at least one of a plurality of first synchronization signals of different types and at least one of the plurality of second synchronization signals of different types, the first group of synchronization signals including the plurality of first synchronization signals and the plurality of second synchronization signals.

In one configuration, the apparatus 2802/2802' for wireless communication includes means for setting a first numerology for at least one synchronization signal of one or more synchronization signals to be different from a second numerology for at least one data signal of the one or more data signals, means for transmitting the one or more synchronization signals to a UE based on the first numerology, and means for transmitting the one or more data signals to the UE based on the second numerology. In an aspect, the apparatus 2802/2802' further includes means for transmitting system information including an indication of at least one of the first numerology, the second numerology, or a tone spacing scheme used for the wireless communication by the base station.

In an aspect where the one or more synchronization signals include a plurality of synchronization signals, the apparatus 2802/2802' further includes means for processing the plurality of synchronization signals by performing TDM of at least one of a plurality of first synchronization signals of different types and at least one of the plurality of second synchronization signals of different types, the plurality of synchronization signals including the plurality of first synchronization signals and the plurality of second synchronization signals, wherein the transmitting the one or more synchronization signals include transmitting the processed synchronization signals. In an aspect, the means for processing the plurality of synchronization signals is configured to: generate a first multiplexed signal by performing at least one of FDM of at least two first synchronization signals of the plurality of first synchronization signals or TDM of at least two of the plurality of first synchronization signals, generate a second multiplexed signal by performing at least one of FDM of at least two second synchronization signals of the plurality of second synchronization signals or TDM of at least two of the plurality of second synchronization signals, and perform the TDM of the first multiplexed signal and the second multiplexed signal. In an aspect, the means for transmitting the processed synchronization signals is configured to: perform a first transmission by transmitting a first group of the processed synchronization signals, and perform one or more repeat transmissions of the first transmission, wherein each of the one or more repeat transmissions of the first transmission includes a repetition of the first transmission, wherein the first transmission and the one or more repeat transmission of the first transmission are performed within a first synchronization subframe. In an aspect, the means for transmitting the processed synchronization signals is further configured to: perform a second transmission by transmitting a second group of the processed synchronization signals, and perform one or more repeat transmissions of the second transmission, wherein each of the one or more repeat transmissions of the second transmission includes a repetition of the second transmission, wherein the second transmission and the one or more repeat transmissions of the second transmission are performed within a second synchronization subframe.

The aforementioned means may be one or more of the aforementioned components of the apparatus 2802 and/or the processing system 2914 of the apparatus 2802' configured to perform the functions recited by the aforementioned means. As described supra, the processing system 2914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 30:
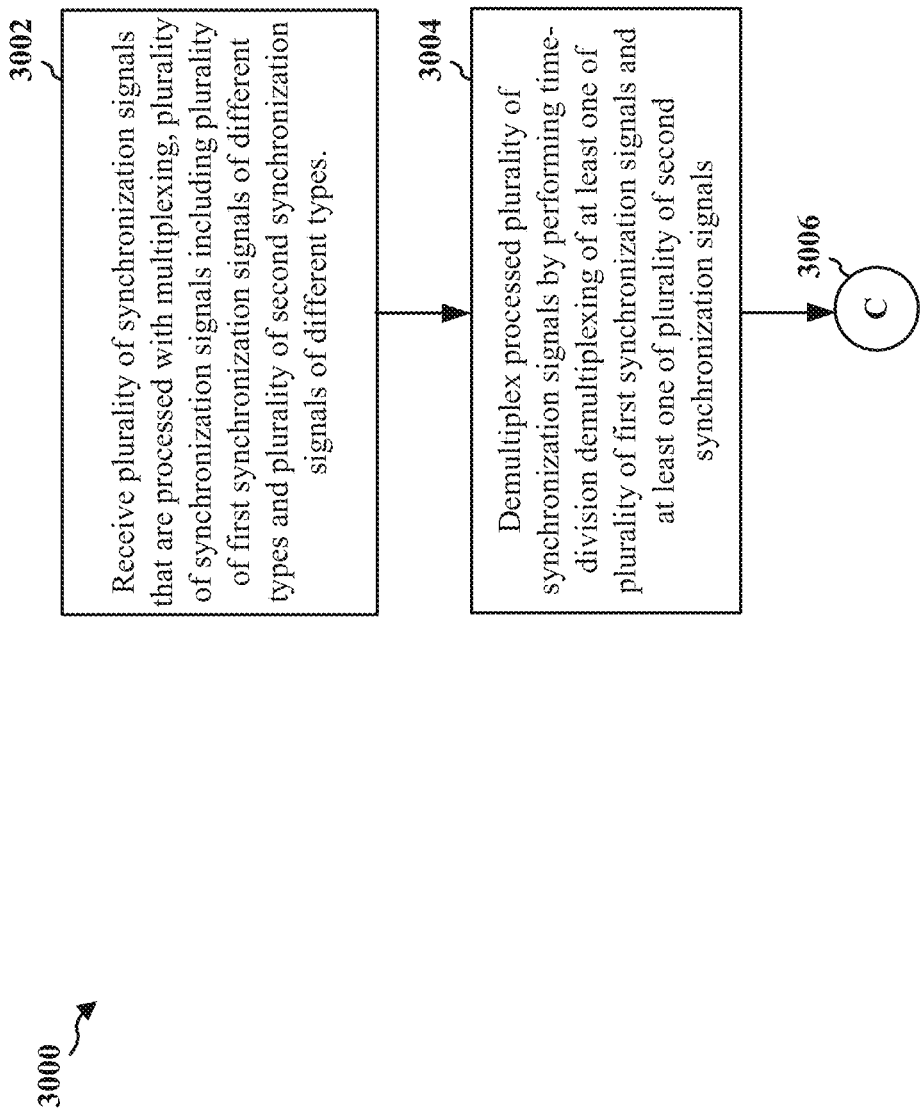
FIG. 30 is a flowchart of a method of wireless communication.

FIG. 30 is a flowchart 3000 of a method of wireless communication. The method may be performed by a UE (e.g., the UE 802, the apparatus 3902/3902'). At 3002, the UE receives a plurality of synchronization signals that are processed with multiplexing, the plurality of synchronization signals including a plurality of first synchronization signals of different types and a plurality of second synchronization signals of different types. For example, as discussed supra, the UE receives processed synchronization signals that have been processed with first synchronization signals and second synchronization signals. At 3004, the UE demultiplexes the processed plurality of synchronization signals by performing time-division demultiplexing of at least one of the plurality of first synchronization signals and at least one of the plurality of second synchronization signals. For example, as discussed supra, the UE may demultiplex the processed synchronization signals by time-division demultiplexing at least one synchronization signal from the first synchronization signals and at least one synchronization signal from the second synchronization signals.

In an aspect, the UE may demultiplex the processed plurality of synchronization signals by: performing the time-division demultiplexing of at least two of the plurality of first synchronization signals and at least two of the plurality of second synchronization signals, performing at least one of frequency-division demultiplexing of the at least two of the plurality of first synchronization signals or time-division demultiplexing of the at least two of the plurality of first synchronization signals, and performing at least one of frequency-division demultiplexing of at least two of the plurality of second synchronization signals or time-division demultiplexing of at least two of the plurality of second synchronization signals. For example, as discussed supra, the UE may demultiplex (e.g., time-division or frequency-division) first multiplexed synchronization signals that were multiplexed (e.g., time-division or frequency-division) within the first synchronization signals and demultiplex (e.g., time-division or frequency-division) second multiplexed synchronization signals that were multiplexed (e.g., time-division or frequency-division) within the second synchronization signals to produce a resulting synchronization signal, and may subsequently perform time-division demultiplex the resulting synchronization signals.

In an aspect, the plurality of the synchronization signals are processed without performing FDM of at least one of the plurality of synchronization signals with at least one of a plurality of data channel signals. In such an aspect, the plurality of data channel signals include one or more PDSCH signals. For example, as discussed supra, the frequency-division multiplexing one or more of the synchronization signals and one or more of data channel signals may be avoided (e.g., PDSCH signals, PUSCH signals).

In an aspect, the plurality of first synchronization signals include at least one of a PSS, an SSS, a BRS, an ESS, or a PBCH signal. In an aspect, the plurality of second synchronization signals include at least one of a PSS, an SSS, a BRS, an ESS, or a PBCH signal. For example, as discussed supra, the first group of the synchronization signals may include a PSS, an SSS, a BRS, an ESS, or a PBCH, and the second group of the synchronization signals may include a PSS, an SSS, a BRS, an ESS, or a PBCH.

In an aspect, the UE receives the plurality of synchronization signals by receiving a synchronization signal block transmitted via at least one beam of a plurality of beams of the base station, the synchronization signal block including two or more of the processed synchronization signals. For example, as discussed supra, the UE may receive the synchronization signals in a synchronization signal block (SS block), where each SS block corresponds to a respective direction of a beam of the base station.

In an aspect, the UE receives the plurality of synchronization signals by: receiving a first transmission of a first group of the plurality of synchronization signals, and receiving one or more repeat transmissions of the first transmission, wherein each of the one or more repeat transmissions of the first transmission includes a repetition of the first transmission, where the first transmission and the one or more repeat transmissions of the first transmission are received within a first synchronization subframe. In an aspect, the first transmission and the one or more repeat transmissions are received using at least one of different beams of the UE in different directions. In such an aspect, within the first synchronization subframe, each of the first transmission and the one or more repeat transmissions are received using at least one of a plurality of antenna subarrays of the UE. For example, as discussed supra, after the base station 804 processes a group of synchronization signals, the UE 802 may receive the group of the processed synchronization signals and repeat the transmission of the group of the processed synchronization signals within a synchronization subframe (e.g., at 814-820 of FIG. 8). For example, as discussed supra, the UE may have multiple antenna subarrays and may be capable of beamforming, and thus may utilize one or more beams to receive transmissions in different directions from the base station that are transmitted in the direction of the UE. In an aspect, reception of at least one of the processed first synchronization signals is repeated at least once during the first transmission. For example, as illustrated in FIGS. 18A and 17B, within the first synchronization subframe, a PBCH may be repeated at least once during each transmission.

In an aspect, the UE receives the plurality of synchronization signals further by: receiving a second transmission by receiving a second group of the plurality of synchronization signals, and receiving one or more repeat transmissions of the second transmission, wherein each of the one or more repeat transmissions of the second transmission includes a repetition of the second transmission, where the second transmission and the one or more repeat transmissions of the second transmission are received within a second synchronization subframe. In an aspect, the first transmission and the one or more repeat transmissions of the first transmission are received using at least one of a plurality of beams at a plurality of directions and the second transmission and the one or more repeat transmissions of the second transmission are received using at least one of the plurality of beams at the plurality of directions. For example, as discussed supra, after the base station 804 processes a second group of synchronization signals, the UE 802 may receive the second group of the processed synchronization signals and repeat the transmission of the second group of the processed synchronization signals within the subsequent synchronization subframe. For example, as discussed supra, the UE may have multiple antenna subarrays and may be capable of beamforming, and thus may utilize one or more beams to receive the transmissions from the base station. In an aspect, the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe. For example, as illustrated in FIGS. 18A and 17B, within the first synchronization subframe, a PBCH may be repeated at least once during each transmission. For example, as illustrated in FIGS. 18A and 18B, during the second synchronization subframe, a BRS may be repeated at least once during each transmission. In an aspect, the first group of the processed synchronization signals includes a PBCH signal, a PSS, an SSS, and a duplicate of the PBCH signal, and the second group of the processed synchronization signals includes a BRS, a PSS, an SSS, and a duplicate of the BRS. For example, as illustrated in FIGS. 18A and 18B, the processed synchronization signals include a PBCH, a PSS, an SSS, and a duplicate of the PBCH, and the processed synchronization signal 1852 include a BRS, a PSS, an SSS, and a duplicate of the BRS In an aspect, the UE receives the plurality of synchronization signals further by: determining whether the UE is receiving in the first subframe or the second subframe, decoding a PBCH signal from the first transmission if the UE is receiving in the first subframe, and decoding a BRS from the second transmission if the UE is receiving in the second subframe. For example, as discussed supra, if the UE determines that the UE is receiving a signal in the first synchronization subframe, the UE may receive and decode the PBCH from the signal. For example, as discussed supra, if the UE determines that the UE is receiving a signal in the second synchronization subframe, the UE may receive and decode the BRS from the signal.

In an aspect, the second group may include a BRS, and the BRS may be frequency-division multiplexed with at least one of a PBCH signal, a PSS, a SSS. In such an aspect, the BRS may be frequency-division multiplexed based on at least one of a location of the BRS or a location of the at least one of the PBCH signal, the PSS, and the SSS. For example, as illustrated in FIG. 18, the first group of the synchronization signals may include a PBCH, a PSS, a SSS, and a repetition of the PBCH and the second group of the synchronization signals may include a BRS, a PSS, an SSS, and a repetition of the BRS.

At 3006, the UE may perform additional features, as discussed infra.

Figure 31:
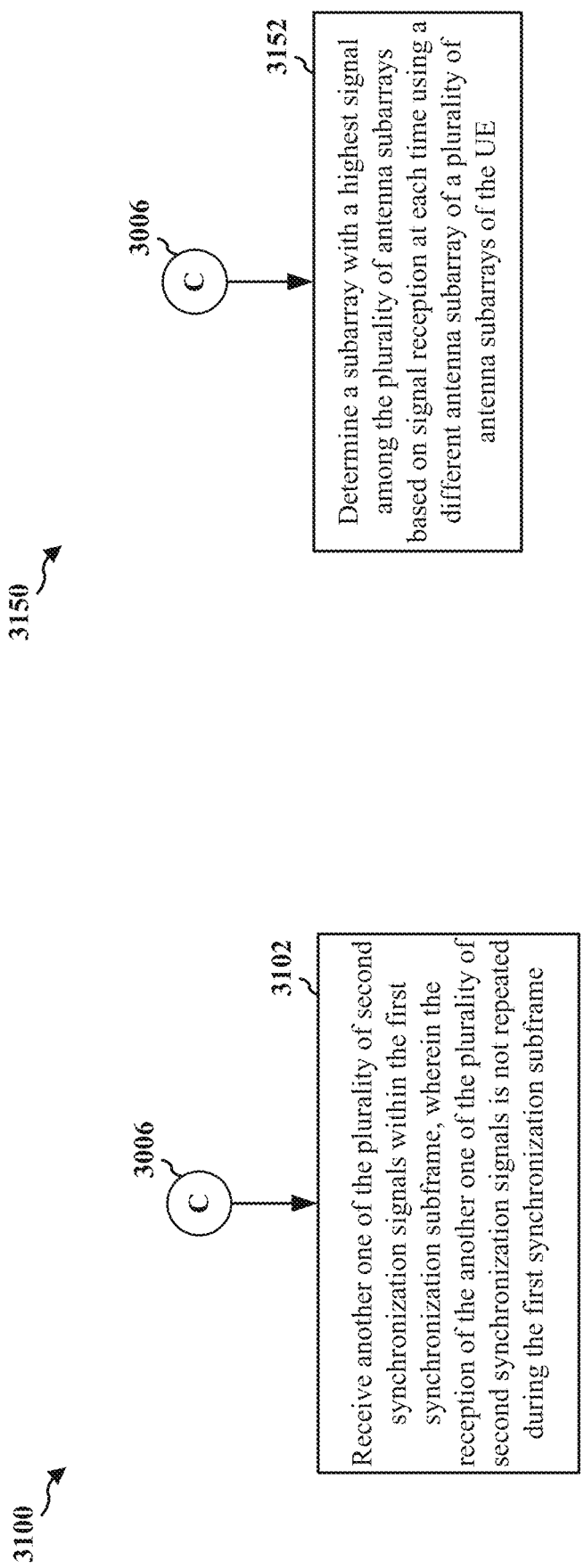
FIG. 31A is a flowchart of a method of wireless communication, expanding from the flowchart of FIG. 30.
FIG. 31B is a flowchart of a method of wireless communication, expanding from the flowchart of FIG. 30.

FIG. 31A is a flowchart 3100 of a method of wireless communication, expanding from the flowchart 3000 of FIG. 30. The method may be performed by a UE (e.g., the UE 802, the apparatus 3902/3902'). At 3006, the UE continues from the flowchart 3000 of FIG. 30. At 3102, the UE may receive another one of the plurality of second synchronization signals within the first synchronization subframe, wherein the reception of the another one of the plurality of second synchronization signals is not repeated during the first synchronization subframe. For example, as discussed supra, the UE may receive in a synchronization channel subframe a synchronization signal that is not repeated. For example, as discussed supra, the non-repeated synchronization signal may be an ESS.

FIG. 31B is a flowchart 3150 of a method of wireless communication, expanding from the flowchart 3000 of FIG. 30. The method may be performed by a UE (e.g., the UE 802, the apparatus 3902/3902'). At 3006, the UE continues from the flowchart 3000 of FIG. 30. At 3152, the UE may determine a subarray with a highest signal among the plurality of antenna subarrays based on signal reception at each time using a different antenna subarray of a plurality of antenna subarrays of the UE. For example, as discussed supra, the UE may receive the processed synchronization signal 1052 in different antenna subarrays (e.g., 4 subarrays) of the UE, and may determine an antenna subarray that provides an optimal result (e.g., best signal-to-noise ratio.

Figure 32:
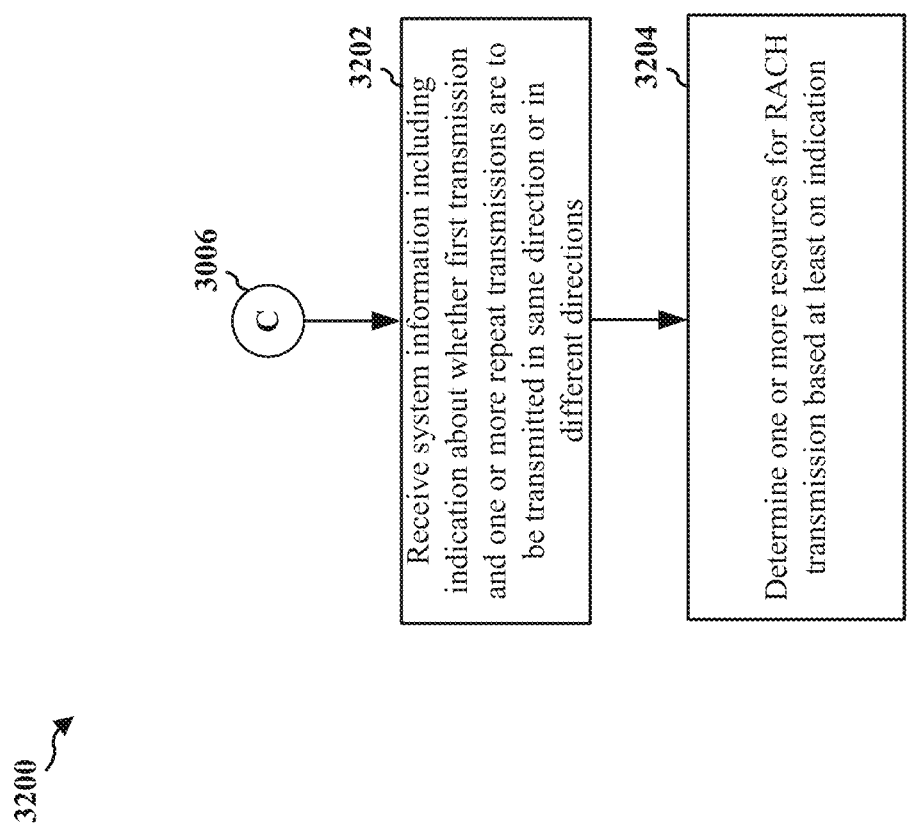
FIG. 32 is a flowchart of a method of wireless communication, expanding from the flowchart of FIG. 30.

FIG. 32 is a flowchart 3200 of a method of wireless communication, expanding from the flowchart 3000 of FIG. 30. The method may be performed by a UE (e.g., the UE 802, the apparatus 3902/3902'). At 3006, the UE continues from the flowchart 3000 of FIG. 30. At 3202, the UE may receive system information including an indication about whether the first transmission and the one or more repeat transmissions are to be transmitted in a same direction or in different directions. For example, as discussed supra, the base station may transmit system information to the UE to indicate whether the processed synchronization signals are transmitted multiple times in different directions or multiple times in the same direction. At 3204, the UE may determine one or more resources for a RACH transmission based at least on the indication. For example, as discussed supra, the UE may determine which resources to use for the UE's RACH transmission based on the system information and/or the received synchronization signals.

Figure 33:
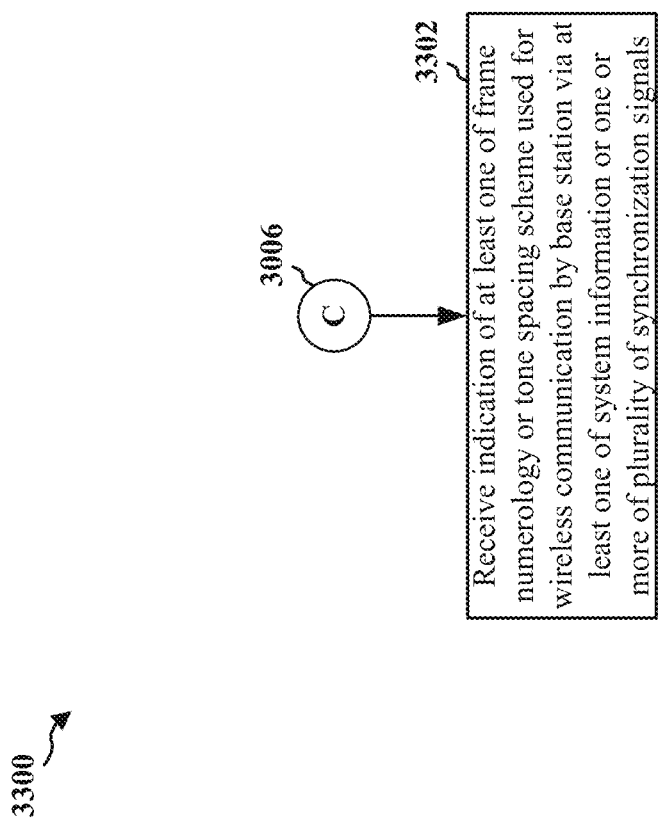
FIG. 33 is a flowchart of a method of wireless communication, expanding from the flowchart of FIG. 30.

FIG. 33 is a flowchart 3300 of a method of wireless communication, expanding from the flowchart 3000 of FIG. 30. The method may be performed by a UE (e.g., the UE 802, the apparatus 3902/3902'). At 3006, the UE continues from the flowchart 3000 of FIG. 30. In an aspect, a duration of the first transmission and a duration of the at least one repeat transmission are determined based at least on a frame numerology of the wireless communication or are fixed values independent of the frame numerology. For example, as discussed supra, in an aspect, a duration of a transmission of a processed synchronization signal may be a function of numerology used. For example, as discussed supra, in an aspect, a duration for the transmission may be fixed regardless of a numerology used. At 3302, the UE may receive an indication of at least one of the frame numerology or a tone spacing scheme used for the wireless communication by a base station via at least one of system information or one or more of the plurality of synchronization signals. For example, as discussed supra, the UE may receive numerology information and/or tone spacing in the system information transmitted to the UE. In an aspect, the system information may be included in at least one of a MIB or a SIB. For example, as discussed supra, the system information may be a master information block (MIB) and/or a system information block (SIB), etc. In an aspect, the SIB may be received via at least one of RMSI or OSI. For example, as discussed supra, the SIB may be conveyed via RMSI and/or OSI.

Figure 34:
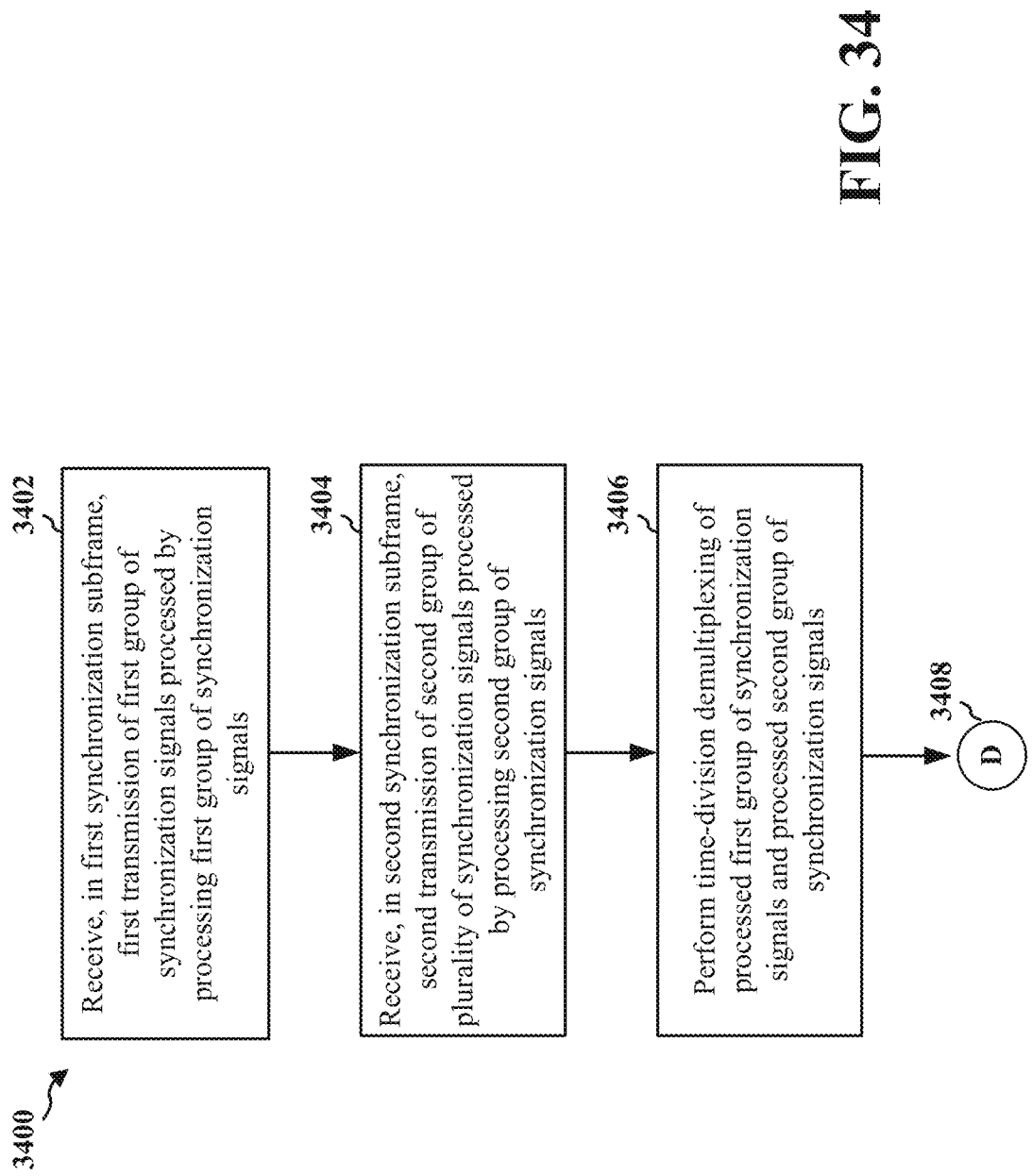
FIG. 34 is a flowchart of a method of wireless communication.

FIG. 34 is a flowchart 3400 of a method of wireless communication. The method may be performed by a UE (e.g., the UE 802, the apparatus 3902/3902'). At 3402, the UE receives, in a first synchronization subframe, a first transmission of a first group of synchronization signals processed by processing the first group of synchronization signals. For example, as illustrated in FIG. 18, during the first synchronization subframe, the UE may receive, from the base station, the first group of processed synchronization signals multiple times (e.g., 14 times) using multiple beams in different directions. At 3404, the UE receives, in a second synchronization subframe, a second transmission of a second group of synchronization signals processed by processing the second group of synchronization signals. For example, as illustrated in FIG. 18, during the second synchronization subframe, the UE may receive, from the base station, the second group of processed synchronization signals multiple times (e.g., 14 times) using the multiple beams in different directions. In an aspect, the first group of synchronization signals may be processed by TDM of the first group of synchronization signals, and the second group of synchronization signals may be processed by TDM of the second group of synchronization signals. At 3406, the UE performs time-division demultiplexing of the processed first group of synchronization signals and the processed second group of synchronization signals. For example, as discussed supra, when the UE receives the processed synchronization signals from the base station, the UE demultiplexes the processed synchronization signals for synchronization with the base station.

In an aspect, the first group of the synchronization signals may include a PBCH signal, and the second group of the synchronization signals includes a BRS. For example, as illustrated in FIG. 18, the first group of the synchronization signals may include a PBCH and the second group of the synchronization signals may include a BRS. In an aspect, the first group of the synchronization signals may further include one or more of a PSS, an SSS, and another PBCH signal, and the second group of the synchronization signals may further include one or more of a PSS, an SSS, and another BRS. In such an aspect, the another PBCH signal may be a duplicate of the PBCH signal and the another BRS may be a duplicate of the BRS. For example, as illustrated in FIG. 18, the first group of the synchronization signals may include a PBCH, a PSS, an SSS, and a repetition of the PBCH and the second group of the synchronization signals may include a BRS, a PSS, an SSS, and a repetition of the BRS.

At 3408, the UE may perform additional features, as discussed infra.

Figure 35:
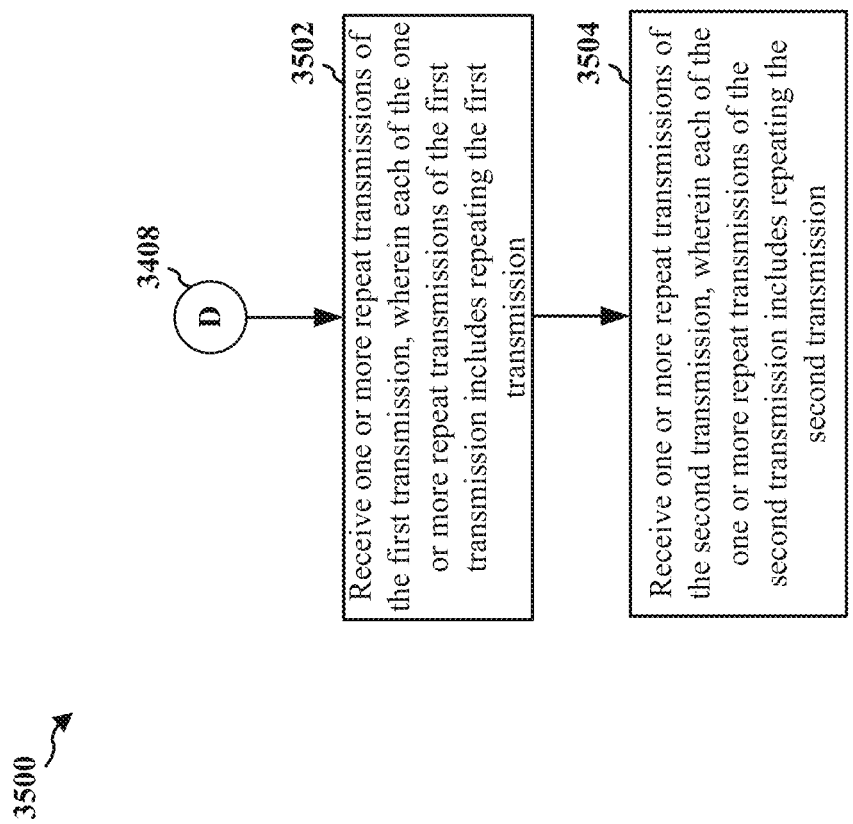
FIG. 35 is a flowchart of a method of wireless communication, expanding from the flowchart of FIG. 34.

FIG. 35 is a flowchart 3500 of a method of wireless communication, expanding from the flowchart 3400 of FIG. 34. The method may be performed by a UE (e.g., the UE 802, the apparatus 3902/3902'). At 3408, the UE continues from the flowchart 3400 of FIG. 34. At 3502, the UE receives one or more repeat transmissions of the first transmission, where each of the one or more repeat transmissions of the first transmission includes a repetition of the first transmission, where the first transmission and the one or more repeat transmissions of the first transmission are received within a first synchronization subframe. For example, as illustrated in FIG. 18, during the first synchronization subframe, the UE may receive, from the base station, the first group of processed synchronization signals multiple times. At 3504, the UE receives one or more repeat transmissions of the second transmission, wherein each of the one or more repeat transmissions of the second transmission includes a repetition of the second transmission, where the second transmission and the one or more repeat transmissions of the second transmission are received within a second synchronization subframe. For example, as illustrated in FIG. 18, during the second synchronization subframe, the UE may receive, from the base station, the second group of processed synchronization signals multiple times.

In an aspect, the first transmission and the one or more repeat transmissions of the first transmission may be received using at least one of a plurality of beams at a plurality of directions and the second transmission and the one or more repeat transmissions of the second transmission may be received using at least one of the plurality of beams at the plurality of directions. For example, as discussed supra, a UE may be able to utilize beamforming to utilize multiple beams in multiple directions, and thus the UE may be able to receive transmissions from the base station using at least one of the multiple beams transmitted in the direction of the UE. In an aspect, the first group of the processed synchronization signals may include a first one of the processed second synchronization signals and the second group of the processed synchronization signals may include a second one of the processed second synchronization signals. For example, as illustrated in FIG. 18, the first group of the processed synchronization signals may include a PBCH, and the second group of the processed synchronization signals may include a BRS.

Figure 16:
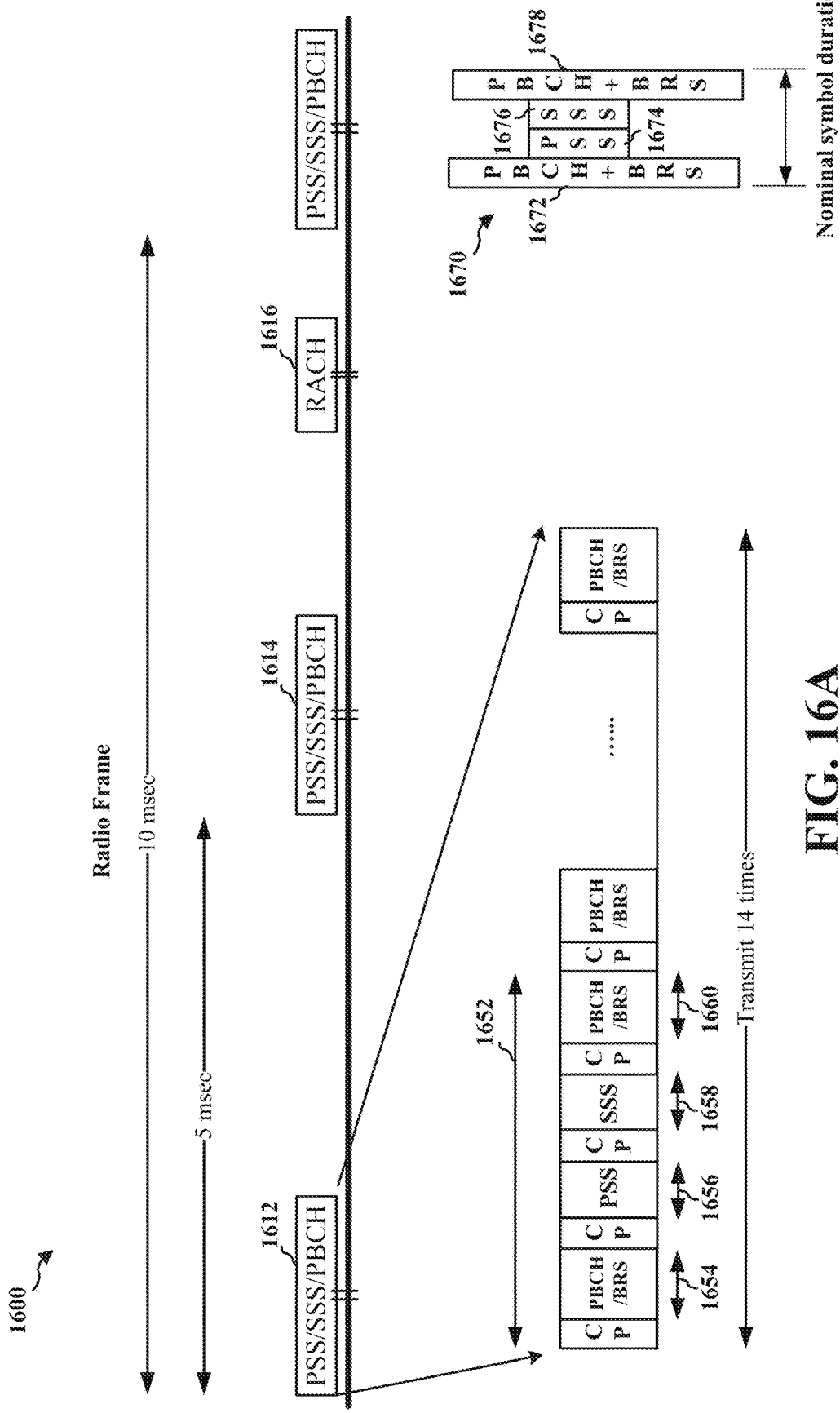
FIGS. 16A and 16B are example diagrams illustrating transmission of synchronization signals, according to an aspect of the disclosure.
Figure 36:
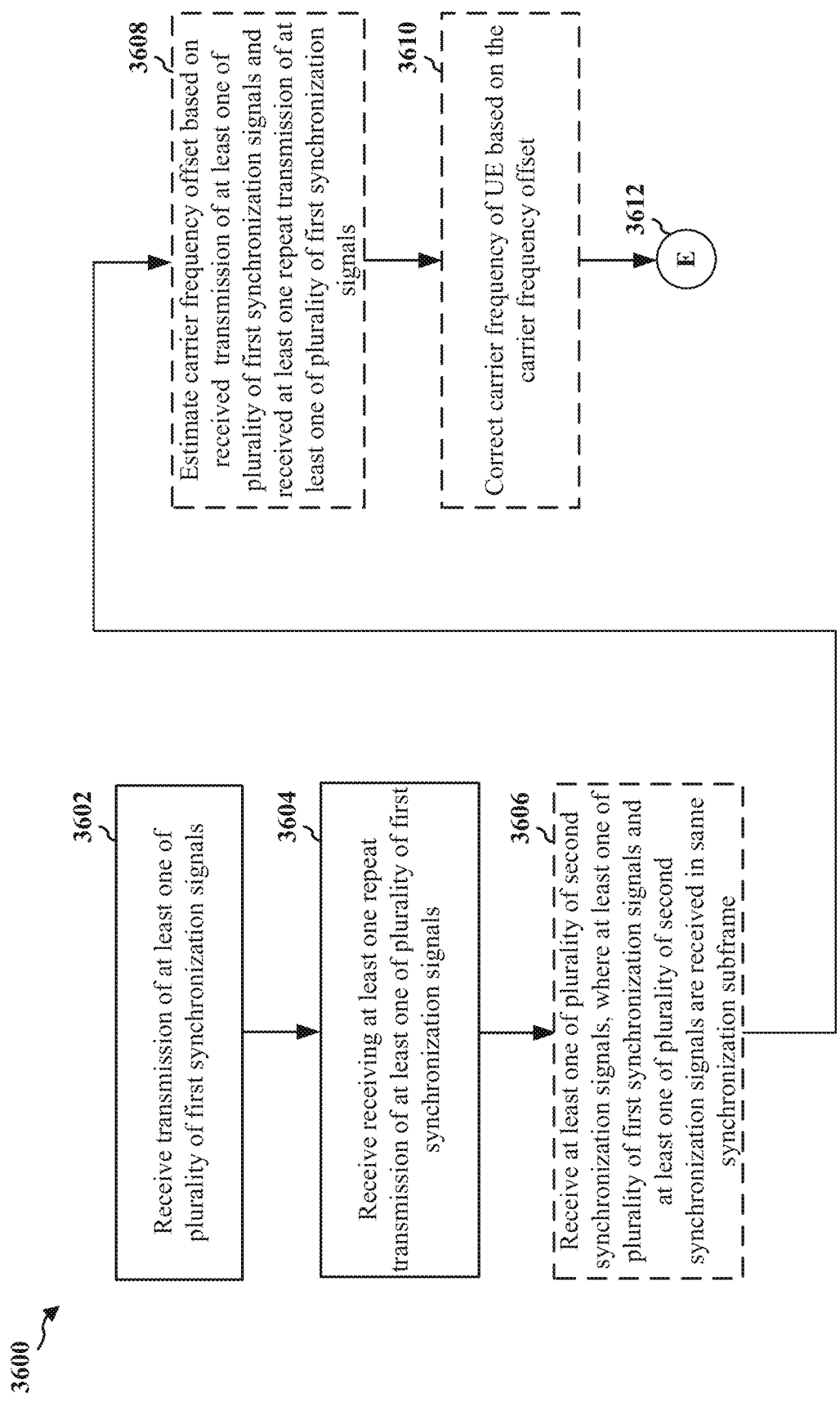
FIG. 36 is a flowchart of a method of wireless communication.

FIG. 36 is a flowchart 3600 of a method of wireless communication. The method may be performed by a UE (e.g., the UE 802, the apparatus 3902/3902'). At 3602, the UE receives a transmission of at least one of a plurality of first synchronization signals. At 3604, the UE receives at least one repeat transmission of the at least one of the plurality of first synchronization signals. In an aspect, the transmission (e.g., at 3602) and the at least one repeat transmission (e.g., at 3604) are received in a same synchronization signal block. In an aspect, the plurality of first synchronization signals may include at least one of a BRS, an ESS, a PSS, an SSS, or a PBCH signal. In an aspect, the at least one of plurality of first synchronization signals may include at least one of a PBCH signal or a DMRS for a PBCH signal. For example, as illustrated in FIG. 16, the UE may receive a PBCH 1672 and a repetition of the PBCH 1678 in the same synchronization block. For example, as illustrated in FIG. 16, the UE may receive a BRS and a PBCH signal during the first synchronization subframe, and as discussed supra, the PBCH signal may be frequency-division multiplexed with a BRS and/or an ESS.

At 3606, the UE may receive at least one of plurality of second synchronization signals, wherein the at least one of the plurality of first synchronization signals and the at least one of the plurality of second synchronization signals are received in a same synchronization subframe. In an aspect, the plurality of second synchronization signals may include at least one of a PSS or an SSS. For example, as illustrated in FIG. 16, the UE may receive a PSS and an SSS in addition to receiving a PBCH and a repetition of the PBCH. In an aspect, the UE may receive at least one of plurality of second synchronization signals by: receiving the at least one of the plurality of second synchronization signals after receiving the transmission of the at least one/of the plurality of first synchronization signals and before receiving the at least one repeat transmission of the at least one of the plurality of first synchronization signals. For example, as illustrated in FIG. 16, a PSS and an SSS are received after receiving the PBCH and before receiving the repetition of the PBCH.

At 3608, the UE may estimate a carrier frequency offset based on the received transmission of the at least one of the plurality of first synchronization signals and the received at least one repeat transmission of the at least one of the plurality of first synchronization signals. For example, as discussed supra, the UE may estimate a carrier frequency offset (CFO) based on the synchronization signal and the repeated synchronization signal before the UE decodes the synchronization signal. In an aspect, the carrier frequency offset may be estimated based on a difference between the reception of the transmission of the at least one of the plurality of first synchronization signals and the reception of the at least one repeat transmission of the at least one of the plurality of first synchronization signals, the difference being at least one of a time difference or a frequency difference. For example, as discussed supra, because the PBCH and the repeated PBCH should be identical, the UE may estimate a CFO based on a difference (e.g., in frequency and/or time) between a received transmission of PBCH and a received repeated transmission of the PBCH. In an aspect, the at least one of the plurality of second synchronization signals may include a PSS, where the carrier frequency offset may be estimated further based on the PSS. For example, as discussed supra, when the UE receives the PSS, the UE may make a coarse estimation of the CFO based on the received PSS and an expected transmission of the PSS, and may refine the estimation of the CFO based on the coarse estimation and a difference between the PBCH signal and the repeated PBCH signal.

At 3610, the UE may correct a carrier frequency of the UE based on the carrier frequency offset. For example, as discussed supra, the UE may correct the carrier frequency of the UE over time based on the estimated CFO (e.g., so as to minimize the CFO).

At 3612, the UE perform additional features described infra.

Figure 37:
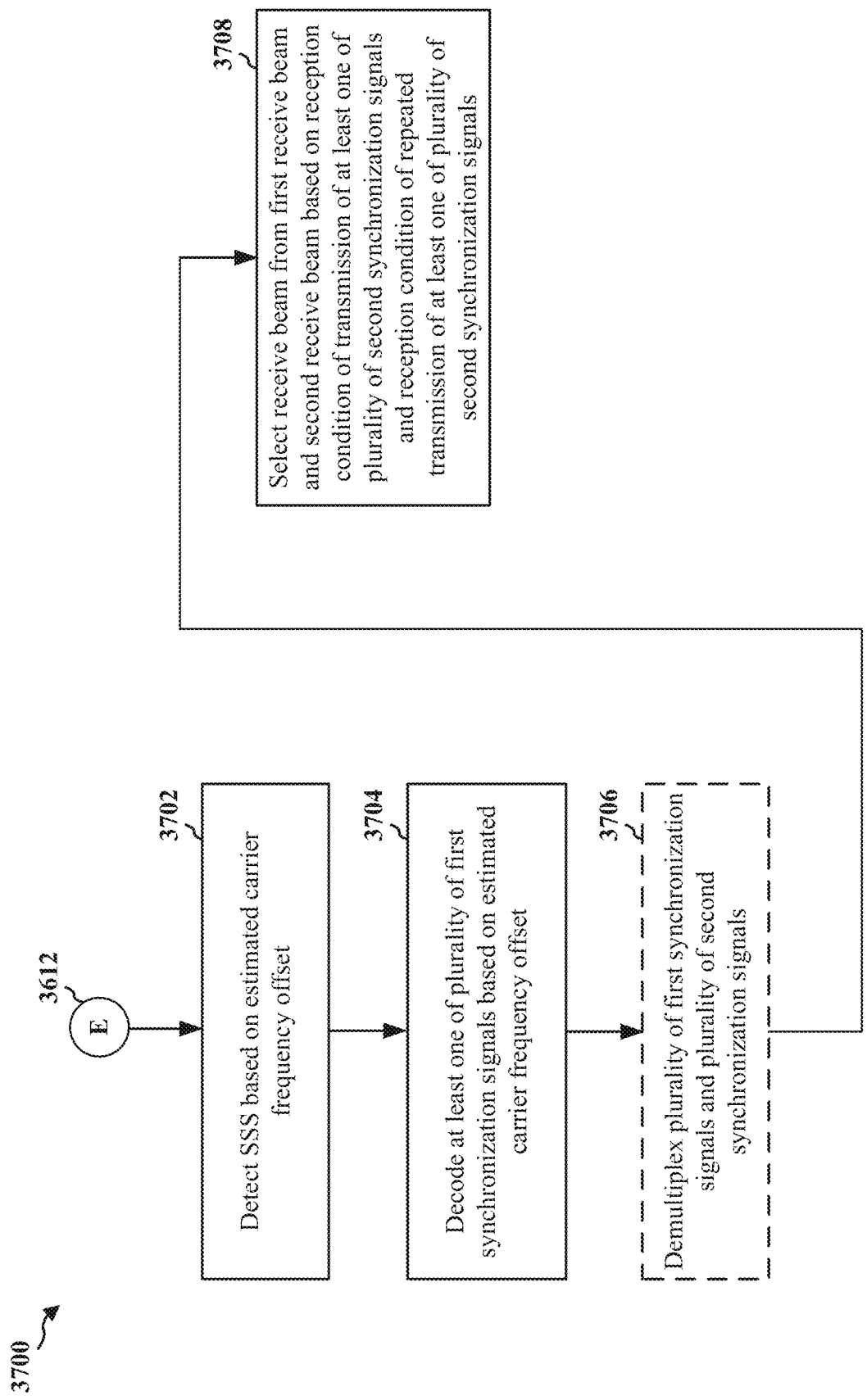
FIG. 37 is a flowchart of a method of wireless communication, expanding from the flowchart of FIG. 36.

FIG. 37 is a flowchart 3700 of a method of wireless communication, expanding from the flowchart 3600 of FIG. 36. The method may be performed by a UE (e.g., the UE 802, the apparatus 3902/3902'). At 3612, the UE may continue from the flowchart 3600 of FIG. 36. At 3702, the UE may detect an SSS based on the estimated carrier frequency offset, where the at least one of the plurality of second synchronization signals includes the SSS. For example, as discussed supra, at 2006, the UE may detect an SSS using the estimated CFO, and may receive the detected SSS. At 3704, the UE may decode the at least one of the plurality of first synchronization signals based on the estimated carrier frequency offset. For example, as discussed supra, at 2008, the UE may decode a PBCH using the estimated CFO.

At 3706, in an aspect where the plurality of first synchronization signals and the plurality of second synchronization signals are processed by time-division multiplexing the plurality of first synchronization signals and the plurality of second synchronization signals, the UE may demultiplex the plurality of first synchronization signals and the plurality of second synchronization signals. For example, as discussed supra, when the UE receives the processed synchronization signals from the base station, the UE demultiplexes the processed synchronization signals for synchronization with the base station.

At 3708, in an aspect where the transmission of the at least one of the plurality of second synchronization signals is received via a first receive beam and the repeat transmission of the at least one of the plurality of second synchronization signals is received via a second receive beam, the UE may select a receive beam from the first receive beam and the second receive beam based on a reception condition of the transmission of the at least one of the plurality of second synchronization signals and a reception condition of the repeated transmission of the at least one of the plurality of second synchronization signals. For example, as discussed supra, at 2010, the UE may select a receive beam out of multiple receive beams based on the two BPCH received at the UE. For example, as discussed supra, when the UE receives the two PBCHs in two OFDM symbols, the UE may use different receive beams to receive the two PBCHs respectively.

Figure 38:
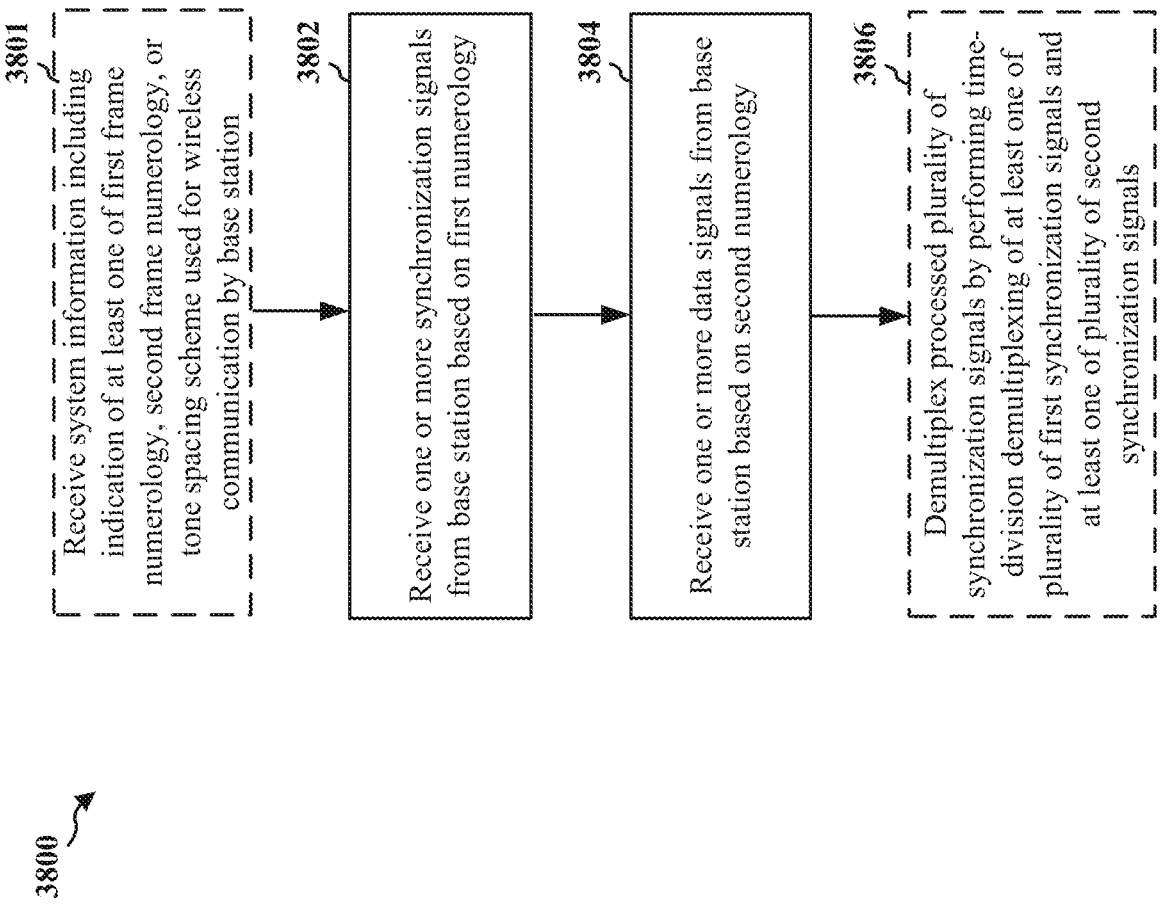
FIG. 38 is a flowchart of a method of wireless communication.

FIG. 38 is a flowchart 3800 of a method of wireless communication. The method may be performed by a UE (e.g., the UE 802, the apparatus 3902/3902'). At 3801, the UE may receive system information including an indication of at least one of the first numerology, the second numerology, or a tone spacing scheme used for wireless communication by the base station. In an aspect, the system information may be included in at least one of a MIB or a SIB. For example, as discussed supra, a numerology and/or tone spacing may be declared in the system information (e.g., in a MIB and/or a SIB) transmitted from the base station to the UE. In an aspect, the second numerology may indicate a numerology of at least one of RMSI or OSI. For example, as discussed supra, the numerology for the data signal may indicate the numerology of RMSI and/or OSI.

At 3802, the UE receives one or more synchronization signals from a base station based on a first numerology. For example, as discussed supra, because the numerology information is provided to the UE (e.g., via the system information), when the UE receives a synchronization signal, the UE may consider a corresponding numerology to receive the synchronization signal. In an aspect, the one or more synchronization signals may include one or more of a PSS, an SSS, a BRS, an ESS, or a PBCH signal. For example, as discussed supra, the synchronization signal may include one or more of a PSS, an SSS, a BRS, an ESS, and a PBCH.

At 3804, the UE receives one or more data signals from the base station based on a second numerology. For example, as discussed supra, when the UE receives a data signal, the UE may consider a corresponding numerology to receive the data signal. In an aspect, the second numerology may be different from the first numerology. In an aspect, the one or more data signals may include one or more PDSCH signals. For example, as discussed supra, the data signal may include one or more of a PDSCH and a PUSCH.

In an aspect, the first numerology of the at least one synchronization signal defines a first tone spacing and the second numerology of the at least one data signal defines a second tone spacing. For example, as discussed supra, the numerology for a synchronization signal may be tone spacing different from tone spacing for a data signal. In such an aspect, the at least one synchronization signal is received at a first periodicity based on the first tone spacing and the at least one data signal is received at a second periodicity based on the second tone spacing. For example, as discussed supra, a duration of a transmission (e.g., periodicity) of a processed synchronization signal may be a function of a numerology and/or tone spacing for the processed synchronization signal. For example, as discussed supra, a duration of a transmission (e.g., periodicity) of a data signal may be a function of a numerology and/or tone spacing for the data signal. In such an aspect, the first tone spacing for the at least one synchronization signal is greater than the second spacing for the at least one data signal. For example, as discussed supra, the numerology (e.g., tone spacing) for the synchronization signal may be greater than the numerology (e.g., tone spacing) for the data signal.

In an aspect, the UE may receive one or more synchronization signals by receiving a plurality of synchronization signals that have been processed, the plurality of synchronization signals including a plurality of first synchronization signals of different types and a plurality of second synchronization signals of different types. In such an aspect, the UE may receive the plurality of synchronization signals by: receiving a first transmission by receiving a first group of the plurality of synchronization signals, and receiving one or more repeat transmissions of the first transmission, wherein each of the one or more repeat transmissions of the first transmission includes a repetition of the first transmission, where the first transmission and the one or more repeat transmissions of the first transmission are received within a first synchronization subframe. In an aspect, the first transmission and the one or more repeat transmissions are received using at least one of different beams of the UE in different directions. For example, as discussed supra, after the base station 804 processes a group of synchronization signals, the UE 802 may receive the group of the processed synchronization signals and repeat the transmission of the group of the processed synchronization signals within a synchronization subframe (e.g., at 814-820 of FIG. 8). For example, as discussed supra, the UE may have multiple antenna subarrays and may be capable of beamforming, and thus may utilize one or more beams to receive the transmissions from the base station. In such an aspect, the UE may receive the plurality of synchronization signals further by: receiving a second transmission by receiving a second group of the plurality of synchronization signals, receiving one or more repeat transmissions of the second transmission, wherein each of the one or more repeat transmissions of the second transmission includes a repetition of the second transmission, where the second transmission and the one or more repeat transmissions of the second transmission are received within a second synchronization subframe. In an aspect, the second transmission and the one or more repeat transmissions of the second transmission are received using at least one of a plurality of beams of the UE in different directions, respectively. For example, as discussed supra, after the base station 804 processes a second group of synchronization signals, the UE 802 may receive the second group of the processed synchronization signals and repeat the transmission of the second group of the processed synchronization signals within the subsequent synchronization subframe. For example, as discussed supra, the UE may have multiple antenna subarrays and may be capable of beamforming, and thus may utilize one or more beams to receive the transmissions from the base station.

At 3806, the UE may demultiplex the processed plurality of synchronization signals by performing time-division demultiplexing of at least one of the plurality of first synchronization signals and at least one of the plurality of second synchronization signals. In such an aspect, the UE may demultiplex the processed plurality of synchronization signals by: performing the time-division demultiplexing of at least two of the plurality of first synchronization signals and at least two of the plurality of second synchronization signals, performing at least one of frequency-division demultiplexing of the at least two of the plurality of first synchronization signals or time-division demultiplexing of the at least two of the plurality of first synchronization signals, and performing at least one of frequency-division demultiplexing of at least two of the plurality of second synchronization signals or time-division demultiplexing of at least two of the plurality of second synchronization signals. In an aspect, the UE may demultiplex (e.g., time-division or frequency-division) first multiplexed synchronization signals that were multiplexed (e.g., time-division or frequency-division) within the first synchronization signals and demultiplex (e.g., time-division or frequency-division) second multiplexed synchronization signals that were multiplexed (e.g., time-division or frequency-division) within the second synchronization signals to produce a resulting synchronization signal, and may subsequently perform time-division demultiplex the resulting synchronization signals. In such an aspect, the plurality of the synchronization signals are processed without performing FDM of at least one of the plurality of synchronization signals with at least one of a plurality of data channel signals. For example, as discussed supra, the frequency-division multiplexing one or more of the synchronization signals and one or more of data channel signals may be avoided (e.g., PDSCH signals, PUSCH signals).

Figure 39:
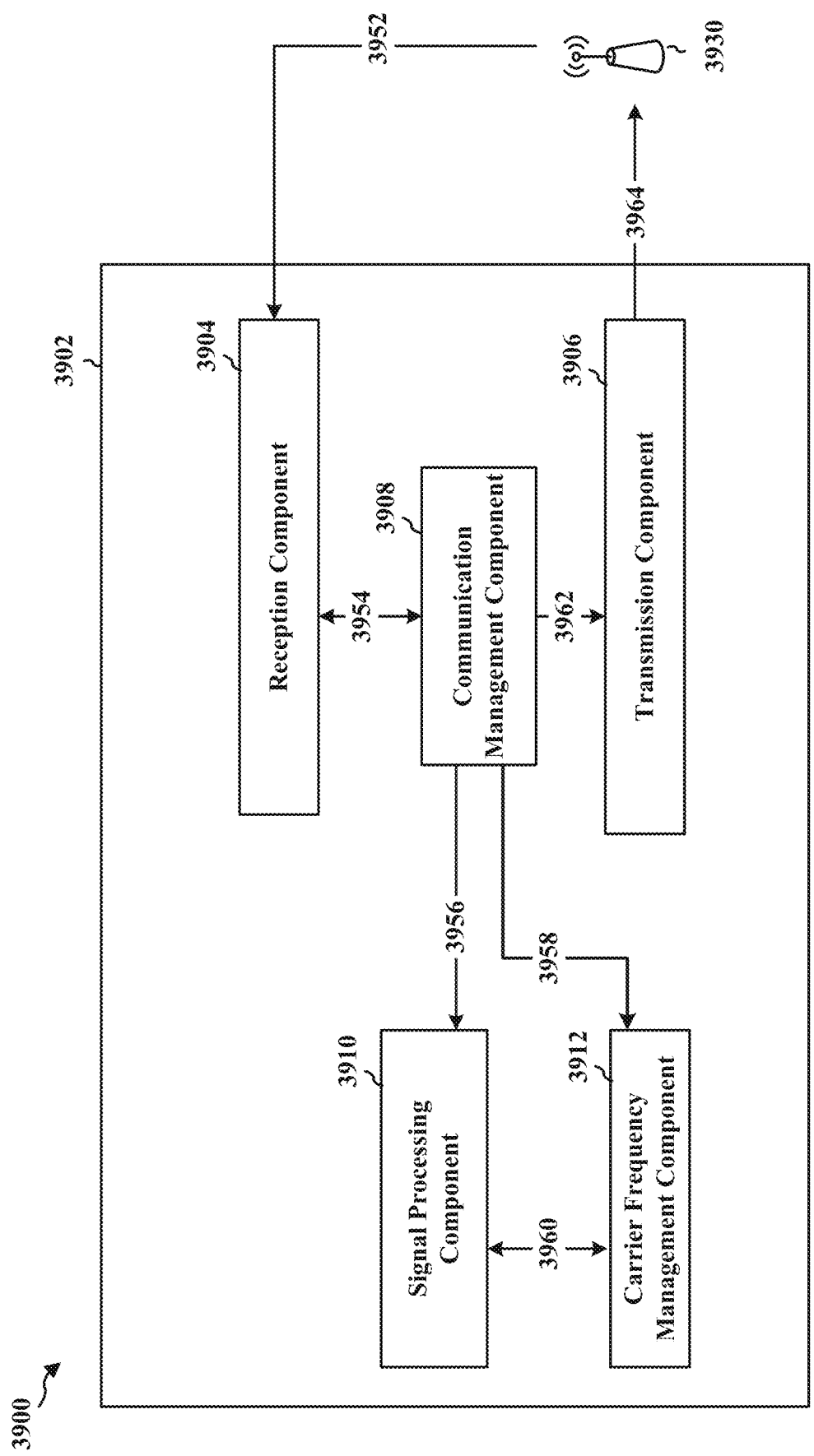
FIG. 39 is a conceptual data flow diagram illustrating the data flow between different means/components in an exemplary apparatus.

FIG. 39 is a conceptual data flow diagram 3900 illustrating the data flow between different means/components in an exemplary apparatus 3902. The apparatus may be a UE. The apparatus includes a reception component 3904, a transmission component 3906, a communication management component 3908, a signal processing component 3910, and a carrier frequency management component 3912.

According to an aspect of the disclosure, the apparatus may perform the following features. The communication management component 3908 receives a plurality of synchronization signals that are processed with multiplexing, via the reception component 3904 at 3952 and 3954, the plurality of synchronization signals including a plurality of first synchronization signals of different types and a plurality of second synchronization signals of different types. The communication management component 3908 may communicate the plurality of synchronization signals to the signal processing component 3910, at 3956. The signal processing component 3910 demultiplexes the processed plurality of synchronization signals by performing time-division demultiplexing of at least one of the plurality of first synchronization signals and at least one of the plurality of second synchronization signals.

In an aspect, the signal processing component 3910 may demultiplex the processed plurality of synchronization signals by: performing the time-division demultiplexing of at least two of the plurality of first synchronization signals and at least two of the plurality of second synchronization signals, performing at least one of frequency-division demultiplexing of the at least two of the plurality of first synchronization signals or time-division demultiplexing of the at least two of the plurality of first synchronization signals, and performing at least one of frequency-division demultiplexing of at least two of the plurality of second synchronization signals or time-division demultiplexing of at least two of the plurality of second synchronization signals.

In an aspect, the plurality of the synchronization signals are processed without performing FDM of at least one of the plurality of synchronization signals with at least one of a plurality of data channel signals. In such an aspect, the plurality of data channel signals include one or more PDSCH signals.

In an aspect, the plurality of first synchronization signals include at least one of a PSS, an SSS, a BRS, an ESS, or a PBCH signal. In an aspect, the plurality of second synchronization signals include at least one of a PSS, an SSS, a BRS, an ESS, or a PBCH signal.

In an aspect, the communication management component 3908 may receive the plurality of synchronization signals by receiving a synchronization signal block transmitted via at least one beam of a plurality of beams of the base station (e.g., base station 3930), the synchronization signal block including two or more of the processed synchronization signals.

In an aspect, the communication management component 3908 may receive the plurality of synchronization signals by: receiving a first transmission of a first group of the plurality of synchronization signals, and receiving one or more repeat transmissions of the first transmission, wherein each of the one or more repeat transmissions of the first transmission includes a repetition of the first transmission, where the first transmission and the one or more repeat transmissions of the first transmission are received within a first synchronization subframe. In an aspect, the first transmission and the one or more repeat transmissions are received using at least one of different beams of the UE in different directions. In such an aspect, within the first synchronization subframe, each of the first transmission and the one or more repeat transmissions are received using at least one of a plurality of antenna subarrays of the UE. In an aspect, reception of at least one of the processed first synchronization signals is repeated at least once during the first transmission.

In an aspect, the communication management component 3908 may receive the plurality of synchronization signals further by: receiving a second transmission by receiving a second group of the plurality of synchronization signals, and receiving one or more repeat transmissions of the second transmission, wherein each of the one or more repeat transmissions of the second transmission includes a repetition of the second transmission, where the second transmission and the one or more repeat transmissions of the second transmission are received within a second synchronization subframe. In an aspect, the first transmission and the one or more repeat transmissions of the first transmission are received using at least one of a plurality of beams at a plurality of directions and the second transmission and the one or more repeat transmissions of the second transmission are received using at least one of the plurality of beams at the plurality of directions. In an aspect, the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe. In an aspect, the first group of the processed synchronization signals includes a PBCH signal, a PSS, an SSS, and a duplicate of the PBCH signal, and the second group of the processed synchronization signals includes a BRS, a PSS, an SSS, and a duplicate of the BRS.

In an aspect, the communication management component 3908 may receive the plurality of synchronization signals further by: determining whether the UE is receiving in the first subframe or the second subframe, decoding a PBCH signal from the first transmission if the UE is receiving in the first subframe, and decoding a BRS from the second transmission if the UE is receiving in the second subframe.

In an aspect, the second group may include a BRS, and the BRS may be frequency-division multiplexed with at least one of a PBCH signal, a PSS, a SSS. In such an aspect, the BRS may be frequency-division multiplexed based on at least one of a location of the BRS or a location of the at least one of the PBCH signal, the PSS, and the SSS.

In an aspect, the communication management component 3908 may receive another one of the plurality of second synchronization signals within the first synchronization subframe, via the reception component at 3952 and 3954, where the reception of the another one of the plurality of second synchronization signals is not repeated during the first synchronization subframe.

In an aspect, the communication management component 3908 may determine a subarray with a highest signal among the plurality of antenna subarrays based on signal reception at each time using a different antenna subarray of a plurality of antenna subarrays of the UE. The communication management component 3908 may communicate such information to the reception component at 3904, at 3954.

In an aspect, the communication management component 3908 may receive system information including an indication about whether the first transmission and the one or more repeat transmissions are to be transmitted in a same direction or in different directions, via the reception component at 3952 and 3954. The communication management component 3908 may determine one or more resources for a RACH transmission based at least on the indication.

In an aspect, a duration of the first transmission and a duration of the at least one repeat transmission are determined based at least on a frame numerology of the wireless communication or are fixed values independent of the frame numerology. In such an aspect, the communication management component 3908 may receive an indication of at least one of the frame numerology or a tone spacing scheme used for the wireless communication by a base station via at least one of system information or one or more of the plurality of synchronization signals, via the reception component at 3952 and 3954. In an aspect, the system information may be included in at least one of a MIB or a SIB. In an aspect, the SIB may be received via at least one of RMSI or OSI.

In another aspect of the disclosure, the apparatus may perform the following features. The communication management component 3908 receives, in a first synchronization subframe, a first transmission of a first group of synchronization signals processed by processing the first group of synchronization signals, via the reception component at 3952 and 3954. The communication management component 3908 receives, in a second synchronization subframe, a second transmission of a second group of synchronization signals processed by processing the second group of synchronization signals, via the reception component at 3952 and 3954. In an aspect, the first group of synchronization signals may be processed by TDM of the first group of synchronization signals, and the second group of synchronization signals may be processed by TDM of the second group of synchronization signals. The communication management component 3908 may communicate the processed first group of synchronization signals and the second group of synchronization signals to the signal processing component 3910, at 3956. The signal processing component 3910 performs time-division demultiplexing of the processed first group of synchronization signals and the processed second group of synchronization signals.

In an aspect, the first group of the synchronization signals may include a PBCH signal, and the second group of the synchronization signals includes a BRS. In an aspect, the first group of the synchronization signals may further include one or more of a PSS, an SSS, and another PBCH signal, and the second group of the synchronization signals may further include one or more of a PSS, an SSS, and another BRS. In such an aspect, the another PBCH signal may be a duplicate of the PBCH signal and the another BRS may be a duplicate of the BRS.

In an aspect, the communication management component 3908 may receive one or more repeat transmissions of the first transmission, via the reception component 3904 at 3952 and 3954, where each of the one or more repeat transmissions of the first transmission includes a repetition of the first transmission, where the first transmission and the one or more repeat transmissions of the first transmission are received within a first synchronization subframe. The communication management component 3908 may receive one or more repeat transmissions of the second transmission, via the reception component 3904 at 3952 and 3954, where each of the one or more repeat transmissions of the second transmission includes a repetition of the second transmission, where the second transmission and the one or more repeat transmissions of the second transmission are received within a second synchronization subframe.

In an aspect, the first transmission and the one or more repeat transmissions of the first transmission may be received using at least one of a plurality of beams at a plurality of directions and the second transmission and the one or more repeat transmissions of the second transmission may be received using at least one of the plurality of beams at the plurality of directions. In an aspect, the first group of the processed synchronization signals may include a first one of the processed second synchronization signals and the second group of the processed synchronization signals may include a second one of the processed second synchronization signals.

In another aspect of the disclosure, the apparatus may perform the following features. The communication management component 3908 receives a transmission of at least one of a plurality of first synchronization signals, via the reception component 3904 at 3952 and 3954. The communication management component 3908 receives at least one repeat transmission of the at least one of the plurality of first synchronization signals, via the reception component 3904 at 3952 and 3954. In an aspect, the transmission and the at least one repeat transmission are received in a same synchronization signal block. The communication management component 3908 may communicate the at least one of a plurality of first synchronization signals and the at least one repeat transmission of the at least one of the plurality of first synchronization signals to the carrier frequency management component 3912, at 3958. In an aspect, the plurality of first synchronization signals may include at least one of a BRS, an ESS, a PSS, an SSS, or a PBCH signal. In an aspect, the at least one of plurality of first synchronization signals may include a PBCH signal or a DMRS for a PBCH signal.

The communication management component 3908 may receive at least one of plurality of second synchronization signals, via the reception component 3904 at 3952 and 3954, where the at least one of the plurality of first synchronization signals and the at least one of the plurality of second synchronization signals are received in a same synchronization subframe. In an aspect, the plurality of second synchronization signals may include at least one of a PSS or an SSS. In an aspect, the communication management component 3908 may receive at least one of plurality of second synchronization signals by: receiving the at least one of the plurality of second synchronization signals after receiving the transmission of the at least one of the plurality of first synchronization signals and before receiving the at least one repeat transmission of the at least one of the plurality of first synchronization signals.

The carrier frequency management component 3912 may estimate a carrier frequency offset based on the received transmission of the at least one of the plurality of first synchronization signals and the received at least one repeat transmission of the at least one of the plurality of first synchronization signals. The carrier frequency management component 3912 may forward the estimated carrier frequency offset to the signal processing component 3910, at 3960. In an aspect, the carrier frequency offset may be estimated based on a difference between the reception of the transmission of the at least one of the plurality of first synchronization signals and the reception of the at least one repeat transmission of the at least one of the plurality of first synchronization signals, the difference being at least one of a time difference or a frequency difference. In an aspect, the at least one of the plurality of second synchronization signals may include a PSS, where the carrier frequency offset may be estimated further based on the PSS. The carrier frequency management component 3912 may correct a carrier frequency of the UE based on the carrier frequency offset.

The signal processing component 3910 may detect an SSS based on the estimated carrier frequency offset, where the at least one of the plurality of second synchronization signals includes the SSS. The signal processing component 3910 may decode the at least one of the plurality of first synchronization signals based on the estimated carrier frequency offset.

In an aspect where the plurality of first synchronization signals and the plurality of second synchronization signals are processed by time-division multiplexing the plurality of first synchronization signals and the plurality of second synchronization signals, the signal processing component 3910 may demultiplex the plurality of first synchronization signals and the plurality of second synchronization signals.

In an aspect where the transmission of the at least one of the plurality of second synchronization signals is received via a first receive beam and the repeat transmission of the at least one of the plurality of second synchronization signals is received via a second receive beam, the communication management component 3908 may select a receive beam from the first receive beam and the second receive beam based on a reception condition of the transmission of the at least one of the plurality of second synchronization signals and a reception condition of the repeated transmission of the at least one of the plurality of second synchronization signals.

According to another aspect of the disclosure, the apparatus may perform the following features. The communication management component 3908 may receive system information including an indication of at least one of the first numerology, the second numerology, or a tone spacing scheme used for wireless communication, via the reception component 3904 at 3952 and 3954. In an aspect, the system information may be included in at least one of a MIB or a SIB. In an aspect, the second numerology may indicate a numerology of at least one of RMSI or OSI.

The communication management component 3908 receives one or more synchronization signals from a base station based on a first numerology, via the reception component 3904 at 3952 and 3954. In an aspect, the one or more synchronization signals may include one or more of a PSS, an SSS, a BRS, an ESS, or a PBCH signal. The communication management component 3908 may communicate the one or more synchronization signals to the signal processing component 3910 at 3956.

The communication management component 3908 receives one or more data signals from the base station based on a second numerology, via the reception component 3904 at 3952 and 3954. In an aspect, the second numerology may be different from the first numerology. In an aspect, the one or more data signals may include one or more PDSCH signals.

In an aspect, the first numerology of the at least one synchronization signal defines a first tone spacing and the second numerology of the at least one data signal defines a second tone spacing. In such an aspect, the at least one synchronization signal is received at a first periodicity based on the first tone spacing and the at least one data signal is received at a second periodicity based on the second tone spacing. In such an aspect, the first tone spacing for the at least one synchronization signal is greater than the second spacing for the at least one data signal.

In an aspect, the communication management component 3908 may receive one or more synchronization signals by receiving a plurality of synchronization signals that have been processed, the plurality of synchronization signals including a plurality of first synchronization signals of different types and a plurality of second synchronization signals of different types. In such an aspect, the communication management component 3908 may receive the plurality of synchronization signals by: receiving a first transmission by receiving a first group of the plurality of synchronization signals, and receiving one or more repeat transmissions of the first transmission, wherein each of the one or more repeat transmissions of the first transmission includes a repetition of the first transmission, where the first transmission and the one or more repeat transmissions of the first transmission are received within a first synchronization subframe. In an aspect, the first transmission and the one or more repeat transmissions are received using at least one of different beams of the UE in different directions. In such an aspect, the communication management component 3908 may receive the plurality of synchronization signals further by: receiving a second transmission by receiving a second group of the plurality of synchronization signals, receiving one or more repeat transmissions of the second transmission, wherein each of the one or more repeat transmissions of the second transmission includes a repetition of the second transmission, where the second transmission and the one or more repeat transmissions of the second transmission are received within a second synchronization subframe. In an aspect, the second transmission and the one or more repeat transmissions of the second transmission are received using at least one of a plurality of beams of the UE in different directions, respectively.

The signal processing component 3910 may demultiplex the processed plurality of synchronization signals by performing time-division demultiplexing of at least one of the plurality of first synchronization signals and at least one of the plurality of second synchronization signals. In such an aspect, the signal processing component 3910 may demultiplex the processed plurality of synchronization signals by: performing the time-division demultiplexing of at least two of the plurality of first synchronization signals and at least two of the plurality of second synchronization signals, performing at least one of frequency-division demultiplexing of the at least two of the plurality of first synchronization signals or time-division demultiplexing of the at least two of the plurality of first synchronization signals, and performing at least one of frequency-division demultiplexing of at least two of the plurality of second synchronization signals or time-division demultiplexing of at least two of the plurality of second synchronization signals. In such an aspect, the plurality of the synchronization signals are processed without performing FDM of at least one of the plurality of synchronization signals with at least one of a plurality of data channel signals.

The communication management component 3908 may further transmit signals to the base station 3930 via the transmission component 3906, at 3962 and 3964.

The apparatus may include additional components that perform each of the blocks of the algorithm in the aforementioned flowcharts of FIGS. 30-38. As such, each block in the aforementioned flowcharts of FIGS. 30-38 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 40:
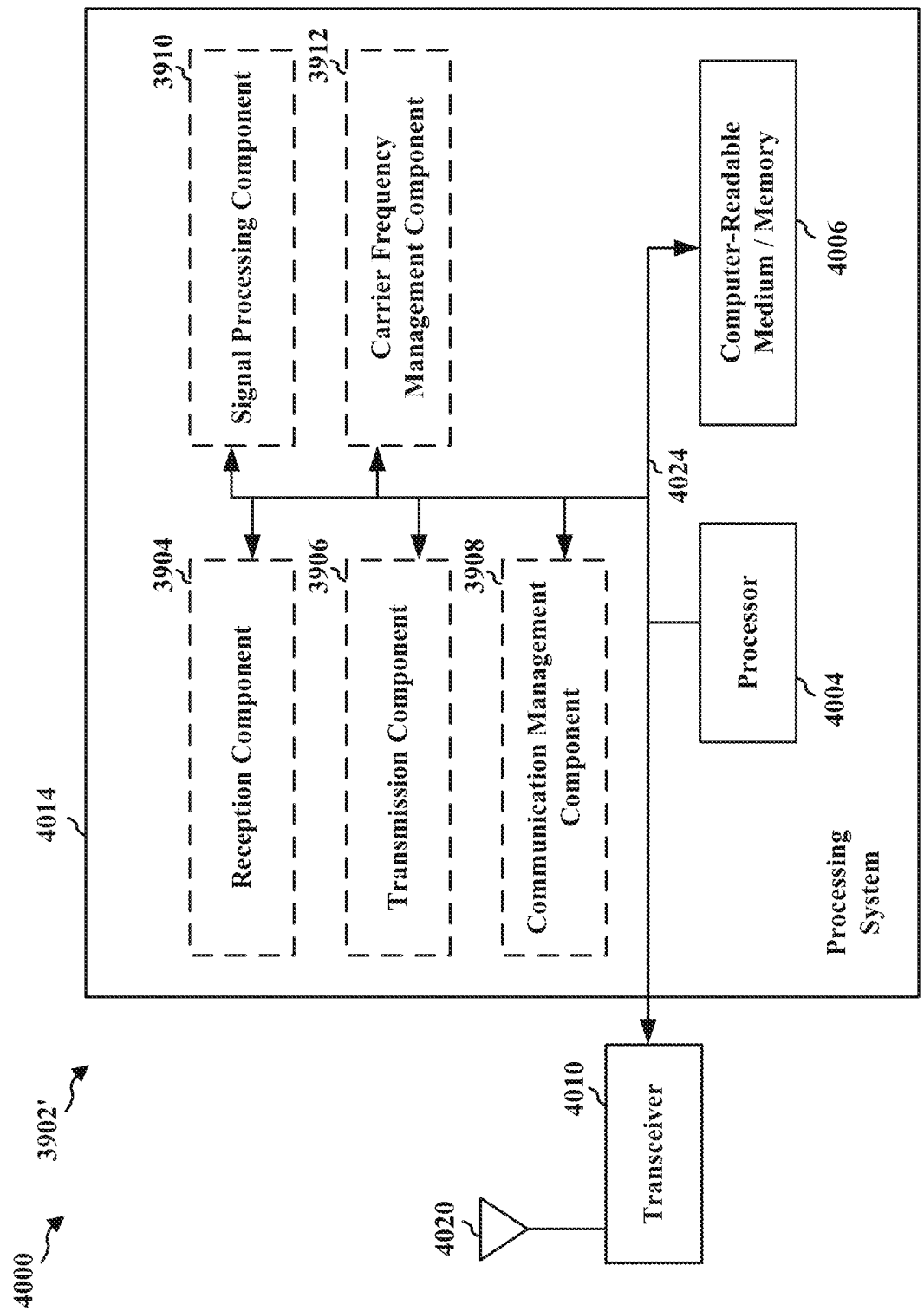
FIG. 40 is a diagram illustrating an example of a hardware implementation for an apparatus employing a processing system.

FIG. 40 is a diagram 4000 illustrating an example of a hardware implementation for an apparatus 3902' employing a processing system 4014. The processing system 4014 may be implemented with a bus architecture, represented generally by the bus 4024. The bus 4024 may include any number of interconnecting buses and bridges depending on the specific application of the processing system 4014 and the overall design constraints. The bus 4024 links together various circuits including one or more processors and/or hardware components, represented by the processor 4004, the components 3904, 3906, 3908, 3910, 3912, and the computer-readable medium/memory 4006. The bus 4024 may also link various other circuits such as timing sources, peripherals, voltage regulators, and power management circuits, which are well known in the art, and therefore, will not be described any further.

The processing system 4014 may be coupled to a transceiver 4010. The transceiver 4010 is coupled to one or more antennas 4020. The transceiver 4010 provides a means for communicating with various other apparatus over a transmission medium. The transceiver 4010 receives a signal from the one or more antennas 4020, extracts information from the received signal, and provides the extracted information to the processing system 4014, specifically the reception component 3904. In addition, the transceiver 4010 receives information from the processing system 4014, specifically the transmission component 3906, and based on the received information, generates a signal to be applied to the one or more antennas 4020. The processing system 4014 includes a processor 4004 coupled to a computer-readable medium/memory 4006. The processor 4004 is responsible for general processing, including the execution of software stored on the computer-readable medium/memory 4006. The software, when executed by the processor 4004, causes the processing system 4014 to perform the various functions described supra for any particular apparatus. The computer-readable medium/memory 4006 may also be used for storing data that is manipulated by the processor 4004 when executing software. The processing system 4014 further includes at least one of the components 3904, 3906, 3908, 3910, 3912. The components may be software components running in the processor 4004, resident/stored in the computer readable medium/memory 4006, one or more hardware components coupled to the processor 4004, or some combination thereof. The processing system 4014 may be a component of the UE 350 and may include the memory 360 and/or at least one of the TX processor 368, the RX processor 356, and the controller/processor 359.

In one configuration, the apparatus 3902/3902' for wireless communication includes means for receiving a plurality of synchronization signals that are processed with multiplexing, the plurality of synchronization signals including a plurality of first synchronization signals of different types and a plurality of second synchronization signals of different types, and means for demultiplexing the processed plurality of synchronization signals by performing time-division demultiplexing of at least one of the plurality of first synchronization signals and at least one of the plurality of second synchronization signals. In an aspect, the means for demultiplexing the processed plurality of synchronization signals is configured to: perform the time-division demultiplexing of at least two of the plurality of first synchronization signals and at least two of the plurality of second synchronization signals, perform at least one of frequency-division demultiplexing of the at least two of the plurality of first synchronization signals or time-division demultiplexing of the at least two of the plurality of first synchronization signals, and perform at least one of frequency-division demultiplexing of at least two of the plurality of second synchronization signals or time-division demultiplexing of at least two of the plurality of second synchronization signals.

In an aspect, the means for receiving the plurality of synchronization signals is configured to: receive a first transmission by receiving a first group of the plurality of synchronization signals, and receive one or more repeat transmissions of the first transmission, wherein each of the one or more repeat transmissions of the first transmission includes a repetition the first transmission, wherein the first transmission and the one or more repeat transmissions of the first transmission are received within a first synchronization subframe. In an aspect, the apparatus 3902/3902' further includes means for receiving another one of the plurality of second synchronization signals within the first synchronization subframe, wherein the reception of the another one of the plurality of second synchronization signals is not repeated during the first synchronization subframe. In an aspect, the means for receiving the plurality of synchronization signals is further configured to: receive a second transmission by receiving a second group of the plurality of synchronization signals, and receive one or more repeat transmissions of the second transmission, wherein each of the one or more repeat transmissions of the second transmission includes a repetition the second transmission, wherein the second transmission and the one or more repeat transmissions of the second transmission are received within a second synchronization subframe. In an aspect, the means for receiving the plurality of synchronization signals is further configured to: determine whether the UE is receiving in the first subframe or the second subframe, decode a PBCH signal from the first transmission if the UE is receiving in the first subframe, and decode a BRS from the second transmission if the UE is receiving in the second subframe. In an aspect, the apparatus 3902/3902' further includes means for determining a subarray with a highest signal among a plurality of antenna subarrays based on signal reception at each time using a different antenna subarray of a plurality of antenna subarrays of the UE.

In an aspect, the apparatus 3902/3902' further includes means for receiving system information including an indication about whether the first transmission and the one or more repeat transmissions are to be transmitted in a same direction or in different directions, and means for determining one or more resources for a RACH transmission based at least on the indication. In an aspect, the apparatus 3902/3902' further includes means for receiving an indication of at least one of the frame numerology or a tone spacing scheme used for the wireless communication by a base station via at least one of system information or one or more of the plurality of synchronization signals.

In one configuration, the apparatus 3902/3902' for wireless communication includes means for receiving, in a first synchronization subframe, a first transmission of a first group of synchronization signals processed by processing the first group of synchronization signals, means for receiving, in a second synchronization subframe, a second transmission of a second group of synchronization signals processed by processing the second group of synchronization signals, and means for performing time-division demultiplexing of the processed first group of synchronization signals and the processed second group of synchronization signals. In an aspect, the apparatus 3902/3902' further includes means for receiving one or more repeat transmissions of the first transmission, wherein each of the one or more repeat transmissions of the first transmission includes a repetition of the first transmission, wherein the first transmission and the one or more repeat transmissions of the first transmission are received within a first synchronization subframe. In an aspect, the apparatus 3902/3902' further includes means for receiving one or more repeat transmissions of the second transmission, wherein each of the one or more repeat transmissions of the second transmission includes a repetition the second transmission, wherein the second transmission and the one or more repeat transmissions of the second transmission are received within a second synchronization subframe.

In one configuration, the apparatus 3902/3902' for wireless communication includes means for receiving a transmission of at least one of a plurality of first synchronization signals, means for receiving at least one repeat transmission of the at least one of the plurality of first synchronization signals, where the transmission and the at least one repeat transmission are received in a same synchronization signal block. In an aspect, the apparatus 3902/3902' may further include means for estimating a carrier frequency offset based on the received transmission of the at least one of the plurality of first synchronization signals and the received at least one repeat transmission of the at least one of the plurality of first synchronization signals. In an aspect, the apparatus 3902/3902' further includes means for correcting a carrier frequency of the UE based on the carrier frequency offset. In an aspect, the apparatus 3902/3902' further includes means for receiving at least one of plurality of second synchronization signals, wherein the at least one of the plurality of first synchronization signals and the at least one of the plurality of second synchronization signals are received in a same synchronization subframe. In an aspect, the means for receiving the at least one of the plurality of second synchronization signals is configured to receive the at least one of the plurality of second synchronization signals after receiving the transmission of the at least one/of the plurality of first synchronization signals and before receiving the at least one repeat transmission of the at least one of the plurality of first synchronization signals. In an aspect, the apparatus 3902/3902' further includes means for detecting an SSS based on the estimated carrier frequency offset, wherein the at least one of the plurality of second synchronization signals includes the SSS. In an aspect, the apparatus 3902/3902' further includes means for decoding the at least one of the plurality of first synchronization signals based on the estimated carrier frequency offset.

In an aspect where the transmission of the at least one of the plurality of second synchronization signals is received via a first receive beam and the repeat transmission of the at least one of the plurality of second synchronization signals is received via a second receive beam, the apparatus 3902/3902' further includes means for selecting a receive beam from the first receive beam and the second receive beam based on a reception condition of the transmission of the at least one of the plurality of second synchronization signals and a reception condition of the repeated transmission of the at least one of the plurality of second synchronization signals. In an aspect where the plurality of first synchronization signals and the plurality of second synchronization signals are processed by time-division multiplexing the plurality of first synchronization signals and the plurality of second synchronization signals, the apparatus 3902/3902' further includes means for demultiplexing the plurality of first synchronization signals and the plurality of second synchronization signals.

In one configuration, the apparatus 3902/3902' for wireless communication includes means for receiving one or more synchronization signals from a base station based on a first numerology, and means for receiving one or more data signals from the base station based on a second numerology, wherein the second numerology is different from the first numerology. In an aspect, the apparatus 3902/3902' further includes means for receiving system information including an indication of at least one of the first numerology, the second numerology, or a tone spacing scheme used for the wireless communication by the base station.

In an aspect, the means for receiving one or more synchronization signals is configured to receive a plurality of synchronization signals that are processed with multiplexing, the plurality of synchronization signals including a plurality of first synchronization signals of different types and a plurality of second synchronization signals of different types. In an aspect, the apparatus 3902/3902' further includes means for demultiplexing the processed plurality of synchronization signals by performing time-division demultiplexing of at least one of the plurality of first synchronization signals and at least one of the plurality of second synchronization signals. In an aspect, the means for demultiplexing the processed plurality of synchronization signals is configured to: perform the time-division demultiplexing of at least two of the plurality of first synchronization signals and at least two of the plurality of second synchronization signals, perform at least one of frequency-division demultiplexing of the at least two of the plurality of first synchronization signals or time-division demultiplexing of the at least two of the plurality of first synchronization signals, and perform at least one of frequency-division demultiplexing of at least two of the plurality of second synchronization signals or time-division demultiplexing of at least two of the plurality of second synchronization signals. In an aspect, the means for receiving the plurality of synchronization signals is configured to: receive a first transmission by receiving a first group of the plurality of synchronization signals, and receive one or more repeat transmissions of the first transmission, wherein each of the one or more repeat transmissions of the first transmission includes a repetition of the first transmission, wherein the first transmission and the one or more repeat transmissions of the first transmission are received within a first synchronization subframe. In an aspect, the means for receiving the plurality of synchronization signals further is configured to: receive a second transmission by receiving a second group of the plurality of synchronization signals, and receive one or more repeat transmissions of the second transmission, wherein each of the one or more repeat transmissions of the second transmission includes a repetition of the second transmission, wherein the second transmission and the one or more repeat transmissions of the second transmission are received within a second synchronization subframe.

The aforementioned means may be one or more of the aforementioned components of the apparatus 3902 and/or the processing system 4014 of the apparatus 3902' configured to perform the functions recited by the aforementioned means. As described supra, the processing system 4014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
    processing a first group of synchronization signals;
    processing a second group of synchronization signals;
    performing a first transmission by transmitting the processed first group of the synchronization signals in a first synchronization subframe that includes a primary synchronization signal (PSS), a secondary synchronization signal (SSS), and a beam reference signal (BRS); and
    performing a second transmission by transmitting the processed second group of the synchronization signals in a second synchronization subframe that includes a PSS, a SSS, and a BRS, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

2. The method of claim 1, wherein the second group of the synchronization signals includes a beam reference signal (BRS).

3. The method of claim 2 wherein the first group of the synchronization signals further includes one or more of a primary synchronization signal (PSS), a secondary synchronization signal (SSS), and the second group of the synchronization signals further includes one or more of a PSS, an SSS, and another BRS.

4. The method of claim 3, wherein the another BRS is a duplicate of the BRS.

5. The method of claim 1, further comprising:
    performing one or more repeat transmissions of the first transmission, wherein each of the one or more repeat transmissions of the first transmission includes a repetition of the first transmission,
    wherein the first transmission and the one or more repeat transmission of the first transmission are performed within the first synchronization subframe.

6. The method of claim 5, wherein the first transmission includes a transmission of at least one of the processed first synchronization signals in the first group being repeated at least once during each of the first transmission and the one or more repeat transmissions in the first synchronization subframe.

7. The method of claim 5, further comprising:
    performing one or more repeat transmissions of the second transmission, wherein each of the one or more repeat transmissions of the second transmission includes a repetition of the second transmission,
    wherein the second transmission and the one or more repeat transmissions of the second transmission are performed within the second synchronization subframe.

8. The method of claim 7, wherein the first transmission and the one or more repeat transmissions of the first transmission are each performed using a respective one of plurality of beams in respective direction of a plurality of directions and the second transmission and the one or more repeat transmissions of the second transmission are each performed using a respective beam of the plurality of beams in a respective direction of the plurality of directions.

9. The method of claim 7, wherein the processing the first group of synchronization signals comprises performing time-division multiplexing (TDM) of at least one of a plurality of first synchronization signals of different types and at least one of the plurality of second synchronization signals of different types, the first group of synchronization signals including the plurality of first synchronization signals and the plurality of second synchronization signals, and
wherein the first group of the processed synchronization signals includes a first one of the second synchronization signals and the second group of the processed synchronization signals includes a second one of the second synchronization signals.

10. The method of claim 9, wherein the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

11. The method of claim 9, wherein the plurality of first synchronization signals include at least one of a primary synchronization signal (PSS) or a secondary synchronization signal (SSS), and wherein the plurality of second synchronization signals include at least one of a beam reference signal (BRS), an extended synchronization signal (ESS), or a physical broadcast channel (PBCH) signal.

12. A method of wireless communication by a user equipment (UE), comprising:
receiving, in a first synchronization subframe that includes a primary synchronization signal (PSS), a secondary synchronization signal (SSS), and a beam reference signal (BRS), a first transmission of a first group of synchronization signals processed by processing the first group of synchronization signals;
receiving, in a second synchronization subframe that includes a PSS, a SSS, and a BRS, a second transmission of a second group of synchronization signals processed by processing the second group of synchronization signals; and
performing time-division demultiplexing of the processed first group of synchronization signals and the processed second group of synchronization signals, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

13. The method of claim 12, wherein the second group of the synchronization signals includes a beam reference signal (BRS).

14. The method of claim 13, wherein the first group of the synchronization signals further includes one or more of a primary synchronization signal (PSS), a secondary synchronization signal (SSS), and the second group of the synchronization signals further includes one or more of a PSS, an SSS, and another BRS.

15. The method of claim 14, wherein the another BRS is a duplicate of the BRS.

16. The method of claim 12, further comprising:
receiving one or more repeat transmissions of the first transmission, wherein each of the one or more repeat transmissions of the first transmission includes a repetition of the first transmission,
wherein the first transmission and the one or more repeat transmissions of the first transmission are received within a first synchronization subframe.

17. The method of claim 16, wherein the first transmission includes a transmission of at least one of the processed first synchronization signals in the first group being repeated at least once during each of the first transmission and the one or more repeat transmissions in the first synchronization subframe.

18. The method of claim 16, further comprising:
receiving one or more repeat transmissions of the second transmission, wherein each of the one or more repeat transmissions of the second transmission includes a repetition the second transmission,
wherein the second transmission and the one or more repeat transmissions of the second transmission are received within a second synchronization subframe.

19. The method of claim 18, wherein the first transmission and the one or more repeat transmissions of the first transmission are received using at least one of a plurality of beams at a plurality of directions and the second transmission and the one or more repeat transmissions of the second transmission are received using at least one of the plurality of beams at the plurality of directions.

20. The method of claim 18, wherein the first group of synchronization signals are processed by performing time-division multiplexing (TDM) of at least one of a plurality of first synchronization signals of different types and at least one of the plurality of second synchronization signals of different types, the first group of synchronization signals including the plurality of first synchronization signals and the plurality of second synchronization signals, and
wherein the first group of the processed synchronization signals includes a first one of the second synchronization signals and the second group of the processed synchronization signals includes a second one of the second synchronization signals.

21. The method of claim 20, wherein the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

22. The method of claim 20, wherein the plurality of first synchronization signals include at least one of a primary synchronization signal (PSS) or a secondary synchronization signal (SSS), and wherein the plurality of second synchronization signals include at least one of a beam reference signal (BRS), an extended synchronization signal (ESS), or a physical broadcast channel (PBCH) signal.

23. A base station for wireless communication, comprising:
- means for processing a first group of synchronization signals;
- means for processing a second group of synchronization signals;
- means for performing a first transmission by transmitting the processed first group of the synchronization signals in a first synchronization subframe that includes a primary synchronization signal (PSS), a secondary synchronization signal (SSS), and a beam reference signal (BRS); and
- means for performing a second transmission by transmitting the processed second group of the synchronization signals in a second synchronization subframe that includes a PSS, a SSS, and a BRS, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

24. The base station of claim 23, wherein the second group of the synchronization signals includes a beam reference signal (BRS).

25. The base station of claim 24, wherein the first group of the synchronization signals further includes a primary synchronization signal (PSS), a secondary synchronization signal (SSS), and the second group of the synchronization signals further includes a PSS, an SSS, and another BRS.

26. The base station of claim 25, wherein the another BRS is a duplicate of the BRS.

27. The base station of claim 23, further comprising:
- means for performing one or more repeat transmissions of the first transmission, wherein each of the one or more repeat transmissions of the first transmission includes a repetition of the first transmission,
- wherein the first transmission and the one or more repeat transmission of the first transmission are performed within the first synchronization subframe.

28. The base station of claim 27, wherein the first transmission includes a transmission of at least one of the processed first synchronization signals in the first group being repeated at least once during each of the first transmission and the one or more repeat transmissions in the first synchronization subframe.

29. The base station of claim 27, further comprising:
- means for performing one or more repeat transmissions of the second transmission, wherein each of the one or more repeat transmissions of the second transmission includes a repetition of the second transmission,
- wherein the second transmission and the one or more repeat transmissions of the second transmission are performed within the second synchronization subframe.

30. The base station of claim 29, wherein the first transmission and the one or more repeat transmissions of the first transmission are each performed using a respective one of plurality of beams in respective direction of a plurality of directions and the second transmission and the one or more repeat transmissions of the second transmission are each performed using a respective beam of the plurality of beams in a respective direction of the plurality of directions.

31. The base station of claim 29, wherein the means for processing the first group of synchronization signals is configured to perform time-division multiplexing (TDM) of at least one of a plurality of first synchronization signals of different types and at least one of the plurality of second synchronization signals of different types, the first group of synchronization signals including the plurality of first synchronization signals and the plurality of second synchronization signals, and
- wherein the first group of the processed synchronization signals includes a first one of the second synchronization signals and the second group of the processed synchronization signals includes a second one of the second synchronization signals.

32. The base station of claim 31, wherein the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

33. The base station of claim 31, wherein the plurality of first synchronization signals include at least one of a primary synchronization signal (PSS) or a secondary synchronization signal (SSS), and wherein the plurality of second synchronization signals include at least one of a beam reference signal (BRS), an extended synchronization signal (ESS), or a physical broadcast channel (PBCH) signal.

34. A user equipment (UE) for wireless communication, comprising:
- means for receiving, in a first synchronization subframe that includes a primary synchronization signal (PSS), a secondary synchronization signal (SSS), and a beam reference signal (BRS), a first transmission of a first group of synchronization signals processed by processing the first group of synchronization signals;
- means for receiving, in a second synchronization subframe that includes a PSS, a SSS, and a BRS, a second transmission of a second group of synchronization signals processed by processing the second group of synchronization signals; and
- means for performing time-division demultiplexing of the processed first group of synchronization signals and the processed second group of synchronization signals, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

35. The UE of claim 34, wherein the second group of the synchronization signals includes a beam reference signal (BRS).

36. The UE of claim 35, wherein the first group of the synchronization signals further includes a primary synchronization signal (PSS), a secondary synchronization signal (SSS), and the second group of the synchronization signals further includes a PSS, an SSS, and another BRS.

37. The UE of claim 36, wherein the another BRS is a duplicate of the BRS.

38. The UE of claim 34, further comprising:
means for receiving one or more repeat transmissions of the first transmission, wherein each of the one or more repeat transmissions of the first transmission includes a repetition of the first transmission,
wherein the first transmission and the one or more repeat transmissions of the first transmission are received within a first synchronization subframe.

39. The UE of claim 38, wherein the first transmission includes a transmission of at least one of the processed first synchronization signals in the first group being repeated at least once during each of the first transmission and the one or more repeat transmissions in the first synchronization subframe.

40. The UE of claim 38, further comprising:
means for receiving one or more repeat transmissions of the second transmission, wherein each of the one or more repeat transmissions of the second transmission includes a repetition the second transmission,
wherein the second transmission and the one or more repeat transmissions of the second transmission are received within a second synchronization subframe.

41. The UE of claim 40, wherein the first transmission and the one or more repeat transmissions of the first transmission are received using at least one of a plurality of beams at a plurality of directions and the second transmission and the one or more repeat transmissions of the second transmission are received using at least one of the plurality of beams at the plurality of directions.

42. The UE of claim 40, wherein the first group of synchronization signals are processed by performing time-division multiplexing (TDM) of at least one of a plurality of first synchronization signals of different types and at least one of the plurality of second synchronization signals of different types, the first group of synchronization signals including the plurality of first synchronization signals and the plurality of second synchronization signals, and
wherein the first group of the processed synchronization signals includes a first one of the second synchronization signals and the second group of the processed synchronization signals includes a second one of the second synchronization signals.

43. The UE of claim 42, wherein the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

44. The UE of claim 42, wherein the plurality of first synchronization signals include at least one of a primary synchronization signal (PSS) or a secondary synchronization signal (SSS), and wherein the plurality of second synchronization signals include at least one of a beam reference signal (BRS), an extended synchronization signal (ESS), or a physical broadcast channel (PBCH) signal.

45. A base station for wireless communication, comprising:
a memory; and
at least one processor coupled to the memory and configured to:
process a first group of synchronization signals;
process a second group of synchronization signals;
perform a first transmission by transmitting the processed first group of the synchronization signals in a first synchronization subframe that includes a primary synchronization signal (PSS), a secondary synchronization signal (SSS), and a beam reference signal (BRS); and
perform a second transmission by transmitting the processed second group of the synchronization signals in a second synchronization subframe that includes a PSS, a SSS, and a BRS, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

46. The base station of claim 45, wherein the second group of the synchronization signals includes a beam reference signal (BRS).

47. The base station of claim 46, wherein the first group of the synchronization signals further includes a primary synchronization signal (PSS), a secondary synchronization signal (SSS), and the second group of the synchronization signals further includes a PSS, an SSS, and another BRS.

48. The base station of claim 47, wherein the another BRS is a duplicate of the BRS.

49. The base station of claim 45, wherein the at least one processor is further configured to:
perform one or more repeat transmissions of the first transmission, wherein each of the one or more repeat transmissions of the first transmission includes a repetition of the first transmission,
wherein the first transmission and the one or more repeat transmission of the first transmission are performed within the first synchronization subframe.

50. The base station of claim 49, wherein the first transmission includes a transmission of at least one of the processed first synchronization signals in the first group being repeated at least once during each of the first transmission and the one or more repeat transmissions in the first synchronization subframe.

51. The base station of claim 49, wherein the at least one processor is further configured to:
perform one or more repeat transmissions of the second transmission, wherein each of the one or more repeat transmissions of the second transmission includes a repetition of the second transmission,
wherein the second transmission and the one or more repeat transmissions of the second transmission are performed within the second synchronization subframe.

52. The base station of claim 51, wherein the first transmission and the one or more repeat transmissions of the first transmission are each performed using a respective one of plurality of beams in respective direction of a plurality of directions and the second transmission and the one or more repeat transmissions of the second transmission are each performed using a respective beam of the plurality of beams in a respective direction of the plurality of directions.

53. The base station of claim 51, wherein the at least one processor configured to process the first group of synchronization signals is configured to perform time-division multiplexing (TDM) of at least one of a plurality of first synchronization signals of different types and at least one of the plurality of second synchronization signals of different types, the first group of synchronization signals including the plurality of first synchronization signals and the plurality of second synchronization signals, and wherein the first group of the processed synchronization signals includes a first one of the second synchronization signals and the second group of the processed synchronization signals includes a second one of the second synchronization signals.

54. The base station of claim 53, wherein the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

55. The base station of claim 53, wherein the plurality of first synchronization signals include at least one of a primary synchronization signal (PSS) or a secondary synchronization signal (SSS), and wherein the plurality of second synchronization signals include at least one of a beam reference signal (BRS), an extended synchronization signal (ESS), or a physical broadcast channel (PBCH) signal.

56. A user equipment (UE) for wireless communication, comprising:
a memory; and
at least one processor coupled to the memory and configured to:
receive, in a first synchronization subframe that includes a primary synchronization signal (PSS), a secondary synchronization signal (SSS), and a beam reference signal (BRS), a first transmission of a first group of synchronization signals processed by processing the first group of synchronization signals;
receive, in a second synchronization subframe that includes a PSS, a SSS, and a BRS, a second transmission of a second group of synchronization signals processed by processing the second group of synchronization signals; and
perform time-division demultiplexing of the processed first group of synchronization signals and the processed second group of synchronization signals, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

57. The UE of claim 51, wherein the second group of the synchronization signals includes a beam reference signal (BRS).

58. The UE of claim 57, wherein the first group of the synchronization signals further includes a primary synchronization signal (PSS), a secondary synchronization signal (SSS), and the second group of the synchronization signals further includes a PSS, an SSS, and another BRS.

59. The UE of claim 58, wherein the another BRS is a duplicate of the BRS.

60. The UE of claim 56, wherein the at least one processor is further configured to:
receive one or more repeat transmissions of the first transmission, wherein each of the one or more repeat transmissions of the first transmission includes a repetition of the first transmission,
wherein the first transmission and the one or more repeat transmissions of the first transmission are received within a first synchronization subframe.

61. The UE of claim 60, wherein the first transmission includes a transmission of at least one of the processed first synchronization signals in the first group being repeated at least once during each of the first transmission and the one or more repeat transmissions in the first synchronization subframe.

62. The UE of claim 60, wherein the at least one processor is further configured to:
receive one or more repeat transmissions of the second transmission, wherein each of the one or more repeat transmissions of the second transmission includes a repetition the second transmission,
wherein the second transmission and the one or more repeat transmissions of the second transmission are received within a second synchronization subframe.

63. The UE of claim 62, wherein the first transmission and the one or more repeat transmissions of the first transmission are received using at least one of a plurality of beams at a plurality of directions and the second transmission and the one or more repeat transmissions of the second transmission are received using at least one of the plurality of beams at the plurality of directions.

64. The UE of claim 62, wherein the first group of synchronization signals are processed by performing time-division multiplexing (TDM) of at least one of a plurality of first synchronization signals of different types and at least one of the plurality of second synchronization signals of different types, the first group of synchronization signals including the plurality of first synchronization signals and the plurality of second synchronization signals, and
wherein the first group of the processed synchronization signals includes a first one of the second synchronization signals and the second group of the processed synchronization signals includes a second one of the second synchronization signals.

65. The UE of claim 64, wherein the first transmission includes a transmission of the first one of the processed second synchronization signals in the first group being repeated at least once during each of the first transmission and the one or more repeat transmissions of the first transmission in the first synchronization subframe, and the second transmission includes a transmission of the second one of the processed second synchronization signals in the second group being repeated at least once during each of the second transmission and the one or more repeat transmissions of the second transmission in the second synchronization subframe.

66. The UE of claim 64, wherein the plurality of first synchronization signals include at least one of a primary synchronization signal (PSS) or a secondary synchronization signal (SSS), and wherein the plurality of second synchronization signals include at least one of a beam reference signal (BRS), an extended synchronization signal (ESS), or a physical broadcast channel (PBCH) signal.

67. A non-transitory computer-readable medium storing computer executable code for wireless communication by a base station, comprising code to:

process a first group of synchronization signals;
process a second group of synchronization signals;
perform a first transmission by transmitting the processed first group of the synchronization signals in a first synchronization subframe that includes a primary synchronization signal (PSS), a secondary synchronization signal (SSS), and a beam reference signal (BRS); and
perform a second transmission by transmitting the processed second group of the synchronization signals in a second synchronization subframe that includes a PSS, a SSS, and a BRS, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

68. A non-transitory computer-readable medium storing computer executable code for wireless communication by a user equipment (UE), comprising code to:
receive, in a first synchronization subframe that includes a primary synchronization signal (PSS), a secondary synchronization signal (SSS), and a beam reference signal (BRS), a first transmission of a first group of synchronization signals processed by processing the first group of synchronization signals;
receive, in a second synchronization subframe that includes a PSS, a SSS, and a BRS, a second transmission of a second group of synchronization signals processed by processing the second group of synchronization signals; and
perform time-division demultiplexing of the processed first group of synchronization signals and the processed second group of synchronization signals, wherein the first group of synchronization signals are processed by performing time-division multiplexing (TDM) of the first group of synchronization signals, and the second group of synchronization signals are processed by performing TDM of the second group of synchronization signals, wherein the first group of synchronization signals includes a physical broadcast channel (PBCH) signal and a duplicate of the PBCH signal.

69. A method of wireless communication by a base station, comprising:
processing one or more first synchronization signals and one or more second synchronization signals;
transmitting the one or more first synchronization signals in a first synchronization subframe that includes a primary synchronization signal (PSS), a secondary synchronization signal (SSS), and a beam reference signal (BRS); and
transmitting the one or more second synchronization signals in a second synchronization subframe,
wherein at least one first synchronization signal of the one or more first synchronization signals has a greater bandwidth than a bandwidth of each of the one or more second synchronization signals.

70. The method of claim 69, wherein the processing the one or more first synchronization signals and the one or more second synchronization signals comprises:
performing time-division multiplexing (TDM) of the one or more first synchronization signals and the one or more second synchronization signals.

71. The method of claim 69, wherein the at least one first synchronization signal includes at least one physical broadcast channel (PBCH) signal carried in at least one PBCH symbol.

72. The method of claim 71, wherein the one or more second synchronization signals include a primary synchronization signal (PSS) and a secondary synchronization signal (SSS).

73. The method of claim 71, wherein the at least one PBCH symbol carries a reference signal to demodulate the at least one PBCH signal, and
wherein the bandwidth of the reference signal is greater than a bandwidth of a primary synchronization signal (PSS) and is greater than a bandwidth of a secondary synchronization signal (SSS).

74. The method of claim 73, wherein the reference signal is a beam reference signal (BRS).

75. The method of claim 71, wherein the transmitting the one or more first synchronization signals comprises transmitting at least two PBCH signals in at least two PBCH symbols respectively.

76. The method of claim 75, wherein one PBCH symbol of the at least two PBCH symbols is located at one side of a secondary synchronization signal (SSS) symbol for an SSS and another PBCH symbol of the at least two PBCH symbols is located at another side of the SSS symbol.

77. The method of claim 72, wherein a frequency band for the at least one PBCH signal is centered around a frequency band for the PSS and a frequency band for the SSS.

78. The method of claim 77, wherein a bandwidth of the PSS and a bandwidth of the SSS are same.

79. The method of claim 73, wherein the reference signal to demodulate the at least one PBCH signal further includes information to derive a symbol index of at least one of the one or more first synchronization signals and the one or more second synchronization signals within a slot.

* * * * *